US012771170B2

(12) United States Patent
Moon et al.

(10) Patent No.: US 12,771,170 B2
(45) Date of Patent: Oct. 20, 2026

(54) MAGNETIC CORE DESATURATION METHODS FOR MAGNETIC ENERGY HARVESTING

(71) Applicant: Florida State University Research Foundation, Inc., Tallahassee, FL (US)

(72) Inventors: Jinyeong Moon, Tallahassee, FL (US); Min Gao, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 18/930,521

(22) Filed: Oct. 29, 2024

(65) Prior Publication Data

US 2025/0141263 A1 May 1, 2025

Related U.S. Application Data

(60) Provisional application No. 63/594,587, filed on Oct. 31, 2023.

(51) Int. Cl.
*H02J 50/00* (2016.01)
*H02J 50/12* (2016.01)

(52) U.S. Cl.
CPC ............ *H02J 50/001* (2020.01); *H02J 50/12* (2016.02)

(58) Field of Classification Search
CPC .......... H02J 50/001; H02J 50/12; H01F 27/34
See application file for complete search history.

(56) References Cited

U.S. PATENT DOCUMENTS

| | | | | |
|---|---|---|---|---|
| 3,725,769 A * | 4/1973 | DePuy | G05F 1/20 | 363/53 |
| 4,262,259 A * | 4/1981 | Frosch | H03F 9/02 | 330/8 |
| 4,584,635 A * | 4/1986 | MacInnis | H02M 7/53806 | 363/25 |
| 5,168,223 A * | 12/1992 | Le Thiec | G01R 33/045 | 324/253 |
| 6,984,979 B1 * | 1/2006 | Edel | G01R 15/185 | 324/253 |
| 2009/0219009 A1 * | 9/2009 | Jansen | G01R 15/183 | 324/127 |
| 2014/0049262 A1 * | 2/2014 | Murphy | G01R 31/40 | 336/110 |
| 2021/0119543 A1 * | 4/2021 | Hamada | H02M 1/40 | |
| 2022/0187343 A1 * | 6/2022 | Gabrielsson | G01R 15/185 | |

* cited by examiner

*Primary Examiner* — Rexford N Barnie
*Assistant Examiner* — Joseph N Inge
(74) *Attorney, Agent, or Firm* — SALIWANCHIK, LLOYD & EISENSCHENK

(57) ABSTRACT

Methods and systems for mid-cycle desaturation during magnetic energy harvesting (MEH) are provided. Four different mid-cycle desaturation strategies can be employed, each of which generates multiple power transfer windows within an alternating current (AC) half-cycle. All four strategies enable much higher energy extraction compared to MEH without utilizing any of the four strategies.

4 Claims, 55 Drawing Sheets

| | Symbol | Value |
|---|---|---|
| Peak value of primary current | $I_P$ | 5.6 A |
| Frequency of primary current | $f_{pri}$ | 50 Hz |
| Primary-winding turns of gapped core | $N_1$ | 2 |
| Secondary-winding turns of gapped core | $N_2$ | 78 |
| Primary-winding turns of gapped core | $N_3$ | 50 |
| Secondary-winding turns of gapped core | $N_4$ | 108 |
| Winding resistance | $R_{wire}$ | 2Ω |
| Voltage ratio between additional desaturation voltage source and load voltage | $k_v$ | 2 |
| Desaturation capacitor | $C_{des}$ | 7.2nF |
| Voltage of TVS diode | $V_{TVS}$ | 30 V |

FIG. 30

| References | [23] | [24] | Explicit Reverse Voltage | LC Resonance | TVS |
|---|---|---|---|---|---|
| Harvesting Core Volume ($\text{Vol}_{core}$) | $12.1\ \text{cm}^3$ | N/A | $8.8\ \text{cm}^3$ | $8.8\ \text{cm}^3$ | $8.8\ \text{cm}^3$ |
| Line Current ($I_{P,RMS}$@Hz) | $10\ \text{A}_{\text{RMS}}$ @ 50 Hz | $25\ \text{A}_{\text{RMS}}$ @ 60 Hz | $4\ \text{A}_{\text{RMS}}$ @ 50 Hz | $4\ \text{A}_{\text{RMS}}$ @ 50 Hz | $4\ \text{A}_{\text{RMS}}$ @ 50 Hz |
| Load Voltage or resistance | 67 Ω | 1.2 kΩ | 5 V | 5 V | 5 V |
| Harvested Energy ($P_{har}$) | 283 mW | 65.8 mW | 126 mW | 148 mW | 152 mW |
| Loss Energy ($P_{loss}$) | N/A | 23.14 mW | 7.86 mW | 9.88 mW | 9.68 mW |
| Energy Harvesting Density $\left(\frac{P_{har}}{I_{P,RMS} \cdot N_1 \cdot f_{pri} \cdot \text{Vol}_{core}}\right)$ $[\text{mW}/\text{A}_{\text{RMS}}/\text{Hz}/\text{cm}^3]$ | 0.047 | N/A | 0.036 | 0.042 | 0.043 |
| Enhanced Energy Density over No Desaturation Case | +46% | +76% | +58% | +85% | +90% |

FIG. 31

| References | [22] | [22] | [14] | LC Resonance | TVS |
|---|---|---|---|---|---|
| Enhancement scheme | N/A (passive rectifier only) | MPPT control | High impedance branch | Reverse flux desaturation | Reverse flux desaturation |
| Harvesting Core Volume ($Vol_{core}$) | 40.84 $cm^3$ | 40.84 $cm^3$ | 5.45 $cm^3$ | 8.8 $cm^3$ | 8.8 $cm^3$ |
| Line Current ($I_{P,RMS}$@Hz) | 30 $A_{RMS}$ @ 50 Hz | 30 $A_{RMS}$ @ 50 Hz | 5.3 $A_{RMS}$ @ 60 Hz | 4 $A_{RMS}$ @ 50 Hz | 4 $A_{RMS}$ @ 50 Hz |
| Load Voltage or resistance | 200 Ω | 600 Ω | 3.2 V | 5 V | 5 V |
| Harvested Energy ($P_{har}$) | 640 mW | 930 mW | 67 mW | 148 mW | 152 mW |
| Energy Harvesting Density $\left(\frac{P_{har}}{I_{P,RMS} \cdot N_1 \cdot f_{pri} \cdot Vol_{core}}\right)$ $[mW/A_{RMS}/Hz/cm^3]$ | 0.010 | 0.016 | 0.020 | 0.042 | 0.043 |
| Scaled Harvested Power @ $I_P$ =4 $A_{RMS}$, 50 Hz $Vol_{core}$=8.8 $cm^3$ | 18.4 mW (Base) | 26.93 mW (+46%) | 68 mW (+270%) | 148 mW (+704%) | 152 mW (+726%) |
| Number of passive switches | 4 | 2 | 4 | 4 | 4 |
| Number of active switches | N/A | 2 | N/A | 2 | 2 |
| Cost | Low | Medium | Low | High | High |
| Installation Intrusiveness | High | High | Low | Low | Low |

FIG. 32

| Physical Meaning | Symbol | Value |
|---|---|---|
| Peak value of primary current | $I_P$ | 2.8 A, 5.6 A, 8.5 A, 11.3 A |
| Frequency of primary current | $f_{\mathrm{pri}}$ | 50 Hz |
| Primary-winding turns of clampable core | $N_1$ | 2 |
| Secondary-winding turns of clampable core | $N_2$ | 78 |
| Primary-winding turns of clampable core | $N_3$ | 50 |
| Secondary-winding turns of clampable core | $N_4$ | 108 |
| Winding resistance | $R_{\mathrm{wire}}$ | 2 Ω |
| Number of energy harvesting windows | $N_{\mathrm{win}}$ | 3 ~10 |
| Load voltage | $V_{LOAD}$ | 1 V ~18 V |

FIG. 33

| References | [7] | [26] | [22] | [11] | [12] | [16] | [23] | [24] | This work | |
|---|---|---|---|---|---|---|---|---|---|---|
| Enhancement scheme | N/A (Passive rect.) | Series capacitor | MPPT control | High-Z branch | Impedance matching | Transfer Window Alignment | Desaturation | | | |
| Line Current ($I_{P,RMS}$@Hz) | 11.89 $A_{RMS}$ @ 60 Hz | 4 $A_{RMS}$ @ 50 Hz | 30 $A_{RMS}$ @ 50 Hz | 5.3 $A_{RMS}$ @ 60 Hz | 30 $A_{RMS}$ @ 50 Hz | 4 $A_{RMS}$ @ 60 Hz | 10 $A_{RMS}$ @ 50 Hz | 30 $A_{RMS}$ @ 50 Hz | 8 $A_{RMS}$ @ 50 Hz | |
| Core Structure | Single | Single | Single | Single | Single | Single | Single | Single | Dual | |
| Core Volume ($Vol_{core}$) | 2.3 $cm^3$ | 17.05 $cm^3$ | 40.84 $cm^3$ | 5.45 $cm^3$ | 120.1 $cm^3$ | 2.3 $cm^3$ | 12.1 $cm^3$ | 76.6 $cm^3$ | 212 $cm^3$ (clampable) | 8.8 $cm^3$ (clampable) |
| | | | | | | | | | 8.8 $cm^3$ (harvesting core) | |
| Load Voltage or resistance | 5 V | 200 Ω | 600 Ω | 3.2 V | 2500 Ω | 5 V | 67 Ω | 30 Ω | 15 V | |
| Maximum Harvested Energy ($P_{harv}$) w/ Enhancement Scheme | 78.62 mW | 115.49 mW | 930 mW | 67 mW | 2250 mW | 42.7 mW | 283 mW | 393 mW | 848 mW | |
| Energy Harvesting Density $\left(\frac{P_{harv}}{I_{P,RMS} \cdot N_1 \cdot f_{pri} \cdot Vol_{core}}\right)$ Unit: $[\mu W/A_{RMS}/Hz/cm^3]$ | 48.0 | 34.0 | 15.0 | 39.0 | 12.0 | 77.0 | 47.0 | 3.4 | 3.8 | 60.0 |
| Number of switches | 4 | 6 | 4 | 4 | 5 | 6 | 5 | 12 | 8 | |
| Build Cost | Low | Medium | Low | Low | Low | Medium | Medium | High | High | |
| Installation Intrusiveness | Yes | Yes | Yes | No | Yes | Yes | Yes | Yes | No | |
| Harvesting @ Identical Settings $I_P = 15\ A_{RMS}$, 50 Hz $Vol_{core} = 17.6\ cm^3$, $N_1 = 1$ | 632.5 mW | 447 mW | 200.4 mW | 510.3 mW | 164.9 mW | 1021 mW | 617.5 mW | 45.1 mW | 1490 mW | |
| Energy Harvesting Density Unit: $[\mu W/A_{RMS}/Hz/cm^3]$ | 48.0 | 34.0 | 15.0 | 39.0 | 12.0 | 77.0 | 47.0 | 3.4 | 110.0 | |

FIG. 34

MAGNETIC CORE DESATURATION METHODS FOR MAGNETIC ENERGY HARVESTING

CROSS-REFERENCE TO RELATED APPLICATION

This application claims the benefit of U.S. Provisional Application Ser. No. 63/594,587, filed Oct. 31, 2023, the disclosure of which is hereby incorporated by reference in its entirety, including all figures, tables, and drawings.

BACKGROUND

Magnetic energy harvesting (MEH) extracts energy from magnetic fields generated by alternating current (AC) wire that is carrying current. This type of energy harvesting produces a relatively high power density, compared to other ambient energy harvesting methods, traditionally sufficient for self-powering low-power devices like embedded systems, sensor nodes, Internet-of-Things (IoT), and cyber-physical systems (CPS).

BRIEF SUMMARY

Embodiments of the subject invention provide novel and advantageous methods and systems for mid-cycle desaturation during magnetic energy harvesting (MEH). Any of four different mid-cycle desaturation strategies can be employed, each of which generates multiple power transfer windows within one alternating current (AC) half-cycle.

A first strategy employs an additional control voltage (e.g., a power converter, such as a capacitor or a batter) to desaturate the magnetic core once the core goes into saturation. A second strategy utilizes inductor-capacitor (LC) resonance to generate opposite load voltage and desaturate the magnetic core without an additional control voltage. A third strategy utilizes a plurality of bidirectional switches (e.g., four bidirectional switches) to achieve current commutation and reverse the voltage imposed on the magnetic core. A fourth strategy utilizes a plurality of unidirectional switches (e.g., four unidirectional switches) and one additional magnetic stage to achieve current commutation and reverse the voltage of the magnetic core for desaturation. All four strategies enable much higher energy extraction compared to MEH without utilizing any of the four strategies.

In an embodiment, a method for mid-cycle desaturation of an MEH system can comprise desaturating a magnetic core of the MEH system such that the MEH system has a plurality of power transfer windows within one AC half-cycle of the MEH system. Desaturating the magnetic core of the MEH system can comprise: providing an additional control voltage to MEH system; and utilizing the additional control voltage to desaturate the magnetic core of the MEH system once the magnetic core goes into saturation. Desaturating the magnetic core of the MEH system can comprise utilizing LC resonance within the MEH system to generate an opposite load voltage and desaturate the magnetic core, and no additional control voltage may be provided to the MEH system. Desaturating the magnetic core of the MEH system can comprise utilizing a transient voltage suppressor (TVS) diode within the MEH system to generate an opposite load voltage and desaturate the magnetic core, and no additional control voltage may be provided to the MEH system. Desaturating the magnetic core of the MEH system can comprise providing a plurality of bidirectional switches (e.g., at least four bidirectional switches, such as exactly four bidirectional switches) to the MEH system to achieve current commutation and reverse a voltage imposed on the magnetic core. The current commutation can be achieved and the voltage imposed on the magnetic core is reversed through a passive rectifier. Desaturating the magnetic core of the MEH system can comprise providing a plurality of unidirectional switches (e.g., at least four unidirectional switches, such as exactly four unidirectional switches) and an additional magnetic stage to the MEH system to achieve current commutation and reverse a voltage of the magnetic core.

In another embodiment, an MEH system configured for mid-cycle desaturation of the MEH system can comprise a magnetic core, and the system can be configured such that the magnetic core is desaturated such that the MEH system has a plurality of power transfer windows within one AC half-cycle of the MEH system. The MEH system can further comprise an additional control voltage configured to be utilized to desaturate the magnetic core of the MEH system once the magnetic core goes into saturation. The MEH system can further comprise an inductor-capacitor pair, and the MEH system can be configured such that LC resonance within the MEH system is utilized to generate an opposite load voltage and desaturate the magnetic core (no additional control voltage may be provided in the MEH system). The MEH system can further comprise a TVS diode configured to generate an opposite load voltage and desaturate the magnetic core, and no additional control voltage may be provided in the MEH system. The MEH system can further comprise a plurality of bidirectional switches (e.g., at least four bidirectional switches, such as exactly four bidirectional switches) configured to achieve current commutation and reverse a voltage imposed on the magnetic core. The MEH system can further comprise a passive rectifier, and the current commutation can be achieved and the voltage imposed on the magnetic core is reversed through the passive rectifier. The MEH system can further comprise a plurality of unidirectional switches (e.g., at least four unidirectional switches, such as exactly four unidirectional switches) and an additional magnetic stage configured to achieve current commutation and reverse a voltage of the magnetic core.

BRIEF DESCRIPTION OF DRAWINGS

FIG. 1A shows energy harvesting, and FIG. 1B shows desaturation.

FIG. 2A shows the case with the desaturation scheme, and FIG. 2B shows the case without the desaturation scheme.

FIG. 2C shows the case with the desaturation scheme, and FIG. 2D shows the case without the desaturation scheme.

FIG. 2E shows the case with the desaturation scheme, and FIG. 2F shows the case without the desaturation scheme.

FIG. 3A shows energy harvesting, and FIG. 3B shows desaturation. FIG. 3C shows the overall system.

FIG. 4A shows energy harvesting, and FIG. 4B shows desaturation.

FIG. 5A-5D show four different states, respectively.

FIGS. 8A-8D show four different states, respectively.

FIG. 30 shows a table of experimental parameters.

FIG. 31 shows a table comparing performance of different desaturation methods. The column labeled "[23]" is for the method disclosed in Zhuang et al. (Improving current transformer-based energy extraction from AC power lines by manipulating magnetic field, IEEE Trans. Ind. Electron., vol. 67, no. 11, pp. 9471-9479 November 2020; which is hereby incorporated by reference herein in its entirety); the column labeled "[24]" is for the method disclosed in Wang et al. (Powerline energy harvesting circuit with a desaturation controller for a magnetic core, in Proc. IEEE Int. Midwest Symp. Circuits Syst. (MWSCAS), pp. 220-223, August 2021; which is hereby incorporated by reference herein in its entirety); the column labeled "Explicit Reverse Voltage is for the additional control voltage (or explicit reverse voltage) method according to an embodiment of the subject invention; the column labeled "LC Resonance" is for the LC resonance method according to an embodiment of the subject invention; and the column labeled "TVS" is for the TVS (or plurality of bidirectional switches) method according to an embodiment of the subject invention.

FIG. 32 shows a table comparing performance of various energy harvesting strategies. The column labeled "[22]" is for the strategy disclosed in Li et al. (Impedance-matching-based maximum power tracking for magnetic field energy harvesters using active rectifiers, IEEE Trans. Ind. Electron., vol. 70, no. 10, pp. 10730-10739, October 2023; which is hereby incorporated by reference herein in its entirety); the column labeled "[23]" is for the strategy disclosed in Zhuang et al. (supra.); the column labeled "[24]" is for the strategy disclosed in Wang et al. (supra.); the column labeled "LC Resonance" is for the LC resonance method according to an embodiment of the subject invention; and the column labeled "TVS" is for the TVS (or plurality of bidirectional switches) method according to an embodiment of the subject invention.

FIG. 33 shows a table of experimental parameters.

FIG. 34 shows a table comparing performance of various energy harvesting strategies. The column labeled "[7]" is for the strategy disclosed in (; the column labeled "[26]" is for the strategy disclosed in (Moon et al. (Analysis model for magnetic energy harvesters, IEEE Trans. Power Electron., vol. 30, no. 8, pp. 4302-4311 August 2015, doi: 10.1109/TPEL.2014.2357448; which is hereby incorporated by reference herein in its entirety); the column labeled "[22]" is for the strategy disclosed in Li et al. (supra.); the column labeled "[11]" is for the strategy disclosed in Monagle et al. (Resonant circuits for split-core magnetic energy harvesters," IEEE Trans. Ind. Electron., vol. 71, no. 8, pp. 1-10, August 2024, doi: 10.1109/TIE.2023.3323728; which is hereby incorporated by reference herein in its entirety); the column labeled "[12]" is for the strategy disclosed in Qian et al. (Power maximised and antisaturation power conditioning circuit for current transformer harvester on overhead lines," IET Power Electron., vol. 11, no. 14, pp. 2271-2278, 2018; which is hereby incorporated by reference herein in its entirety); the column labeled "[16]" is for the strategy disclosed in Leeb et al. (Power electronic circuits for magnetic energy harvesters, IEEE Trans. Power Electron., vol. 31, no. 1, pp. 270-279, April 2016, doi: 10.1109/TPEL.2015.2401336; which is hereby incorporated by reference herein in its entirety); the column labeled "[23]" is for the strategy disclosed in Zhuang et al. (supra.); the column labeled "[24]" is for the strategy disclosed in Xu et al. (Antisaturation and power decoupling control of multiwinding energy harvester based on magnetomotive force compensation," IEEE Trans. Ind. Inform., vol. 19, no. 10, pp. 10555-10563, October 2023, doi: 10.1109/TII.2023.3240688; which is hereby incorporated by reference herein in its entirety); and the column labeled "This work" is for a TVS method according to an embodiment of the subject invention.

DETAILED DESCRIPTION

Embodiments of the subject invention provide novel and advantageous methods and systems for mid-cycle desaturation during magnetic energy harvesting (MEH). Any of four different mid-cycle desaturation strategies can be employed, each of which generates multiple power transfer windows within one (or each) alternating current (AC) half-cycle. All four strategies enable much higher energy extraction compared to MEH without utilizing any of the four strategies.

In related art MEH methods and systems, a magnetic core traditionally operates in an appropriately saturated state to obtain the maximum power output. However, the power transfer ceases once the core reaches full saturation. In order to enable higher energy extraction, embodiments of the subject invention provide methods and systems for mid-cycle desaturation in order to provide multiple (e.g., at least 2) power transfer windows within one AC half-cycle.

In an embodiment, an additional control voltage (beyond what may be present as part of the typical MEH system) can be provided to a MEH system to desaturate the magnetic core once the core goes into saturation. This prevents or inhibits the core from reaching full saturation (or at least minimizes the time the core is in full saturation), thereby preventing or inhibiting the power transfer from ceasing (or at least minimizing the time the power transfer is ceased). The control voltage can be a power converter, such as a capacitor and/or a battery.

Figure 1A:
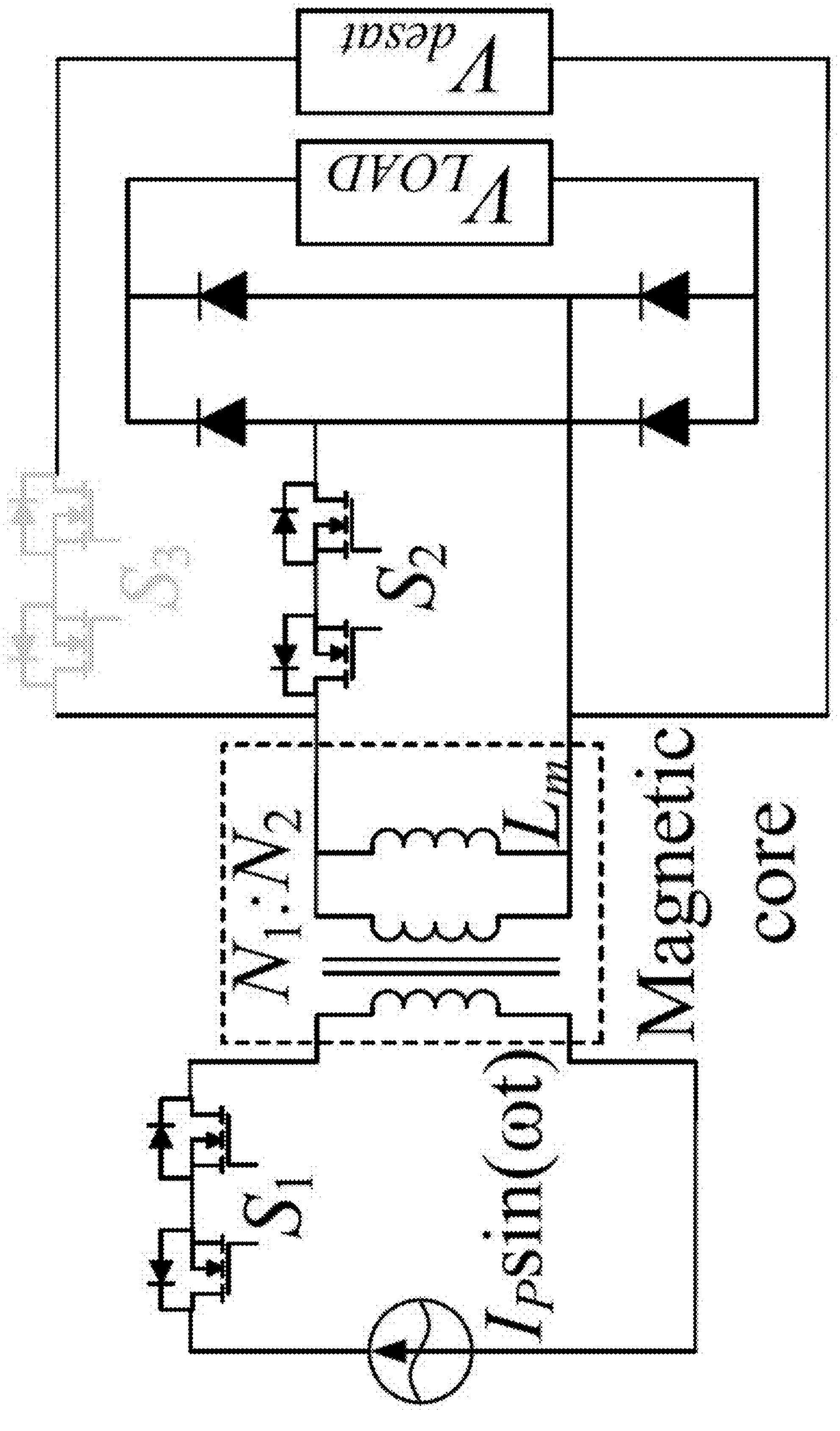
FIGS. 1A and 1B show schematic views of a system/method of desaturation via an additional control voltage, according to an embodiment of the subject invention.
Figure 1B:
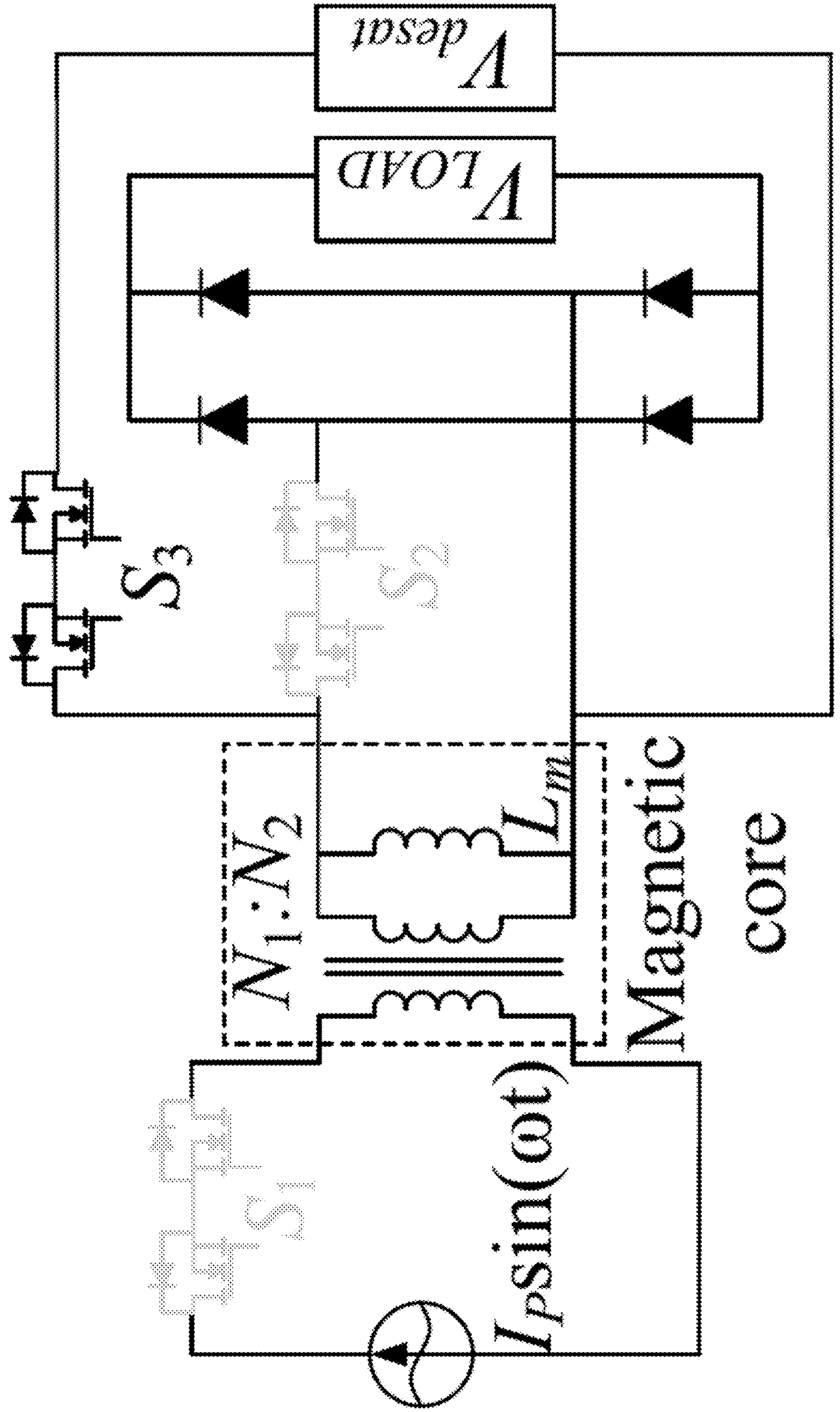

FIGS. 1A and 1B show equivalent circuit models of a system/method utilizing an additional control voltage. The system can include four bidirectional switches, two magnetic cores, a constant voltage load ($V_{LOAD}$), and an additional desaturation voltage source ($V_{des}$), which may be referred to as a (n additional) control voltage. As depicted in FIG. 1A, during the energy harvesting phase, switches $S_1$ and $S_3$ (note that each comprises two transistors for bidirectional blocking) are turned on, while switches $S_2$ and $S_4$ are turned off. This configuration enables an AC to flow through the primary wire, to generate time-varying magnetic fields within the magnetic cores, thereby facilitating power delivery to the load side. The use of a clampable core aims to minimize the disruption during installation, thereby reducing downtime of the primary system. Additionally, the ungapped core ensures efficient energy harvesting. According to Faraday's law, the magnetic flux density within the core progressively increases over time. However, once the flux density reaches its upper limit, the magnetizing inductance significantly decreases, causing all current to flow through it and cessation of power delivery. Consequently, the power transfer process nearly ceases after core saturation. In order to overcome this issue, a desaturation stage is incorporated. As shown in FIG. 1B, during the desaturation process, switches $S_1$ and $S_3$ are turned off, while switches $S_2$ and $S_4$ are turned on. This configuration disconnects both the primary current and the load from the magnetic core. Subsequently, a control voltage, which provides an opposite voltage polarity, is applied to induce a reverse magnetic field density (B field) that counteracts the core saturation. This desaturation process enables the occurrence of multiple power transfer windows within each half period, as depicted in FIGS. 2A-2D.

In an embodiment, inductor-capacitor (LC) resonance can be used to generate an opposite load voltage and desaturate the magnetic core without an additional control voltage. That is, the system does not require any additional control voltage (beyond what may be present as part of the typical MEH system) but still desaturates the core. This prevents or inhibits the core from reaching full saturation (or at least minimizes the time the core is in full saturation), thereby preventing or inhibiting the power transfer from ceasing (or at least minimizing the time the power transfer is ceased).

Figure 3A:
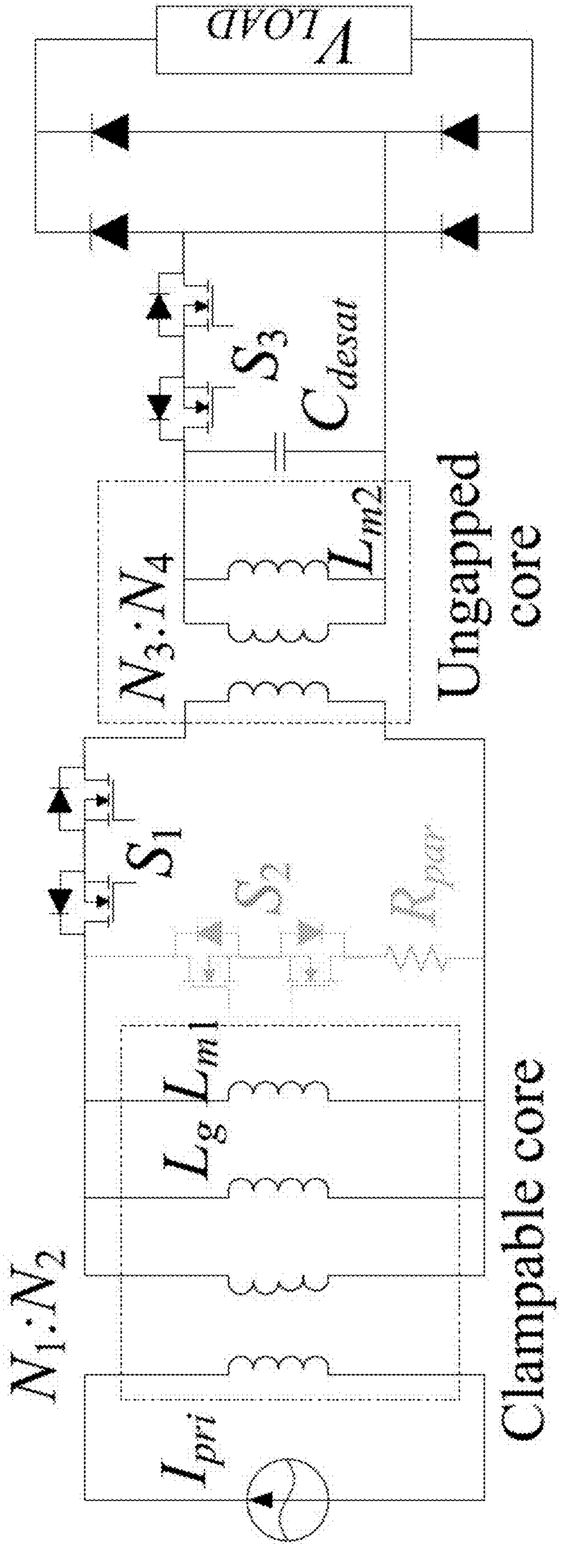
FIGS. 3A-3C show schematic views of a system/method of desaturation via an inductor-capacitor (LC) resonance, according to an embodiment of the subject invention.
Figure 3B:
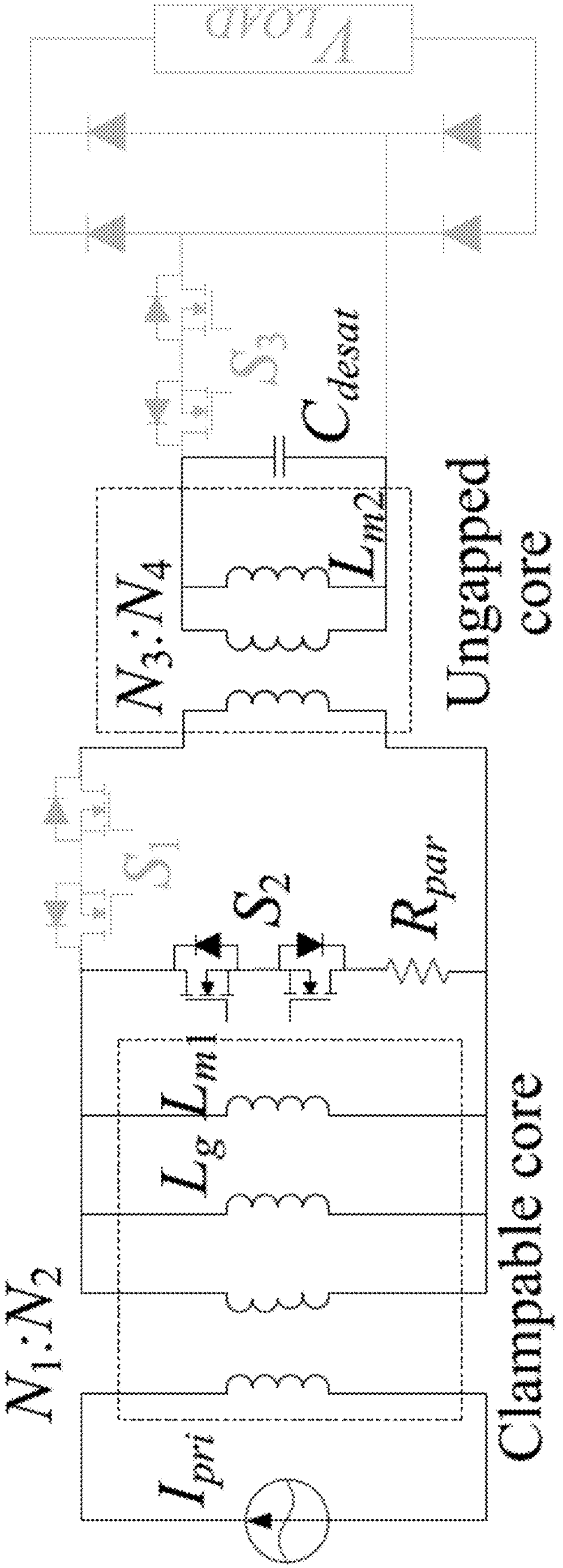

FIGS. 3A and 3B show equivalent circuit models of a system/method utilizing LC resonance to generate an opposite load voltage and desaturate the magnetic core. In comparison to the method depicted in FIGS. 1A and 1B, the capacitor, $C_{des}$, replaces the branch of switch $S_4$ and the additional desaturation voltage source. FIG. 3A illustrates the energy harvesting process, where switches $S_1$ and $S_3$ are turned on, while switch $S_2$ is turned off. Conversely, FIG. 3B shows the desaturation process, where switches $S_1$ and $S_3$ are turned off, and switch $S_2$ is turned on. In this configuration, both the primary current and the load are disconnected from the magnetic core. In order to ensure a smooth transition in the current of inductor $L_3$ that corresponds to the winding of $N_3$ when switch $S_1$ is turned off, the current previously flowing through $S_1$ is redirected through $C_{des}$, forming an LC resonance. During the LC resonance process, the current through $L_3$ gradually decreases towards zero, leading to the induction of a reverse voltage across it. This reverse voltage alters the direction of the B field within the magnetic core, shifting it away from the saturation polarity at the time toward the other polarity. The desaturation period can be set at the half of the resonance period to prevent or inhibit energy storage in the capacitor and minimize the reduction of energy delivered to the load.

Figure 4A:
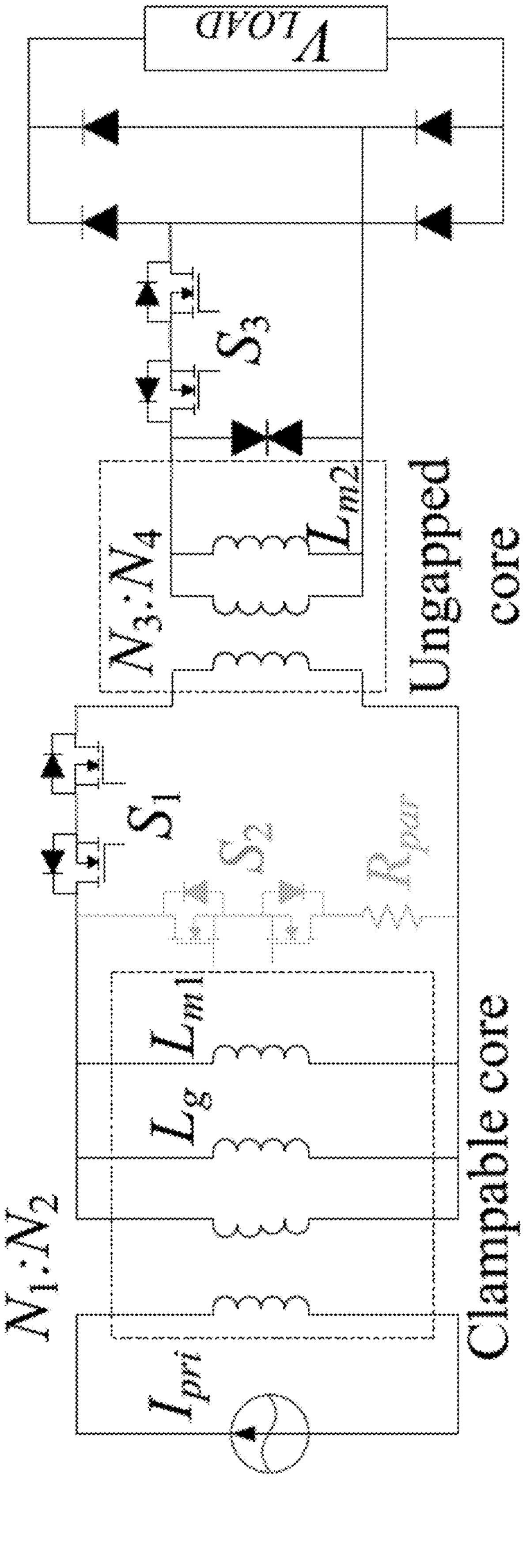
FIGS. 4A and 4B show schematic views of a system/method of desaturation via a transient voltage suppressor (TVS) diode, according to an embodiment of the subject invention.
Figure 4B:
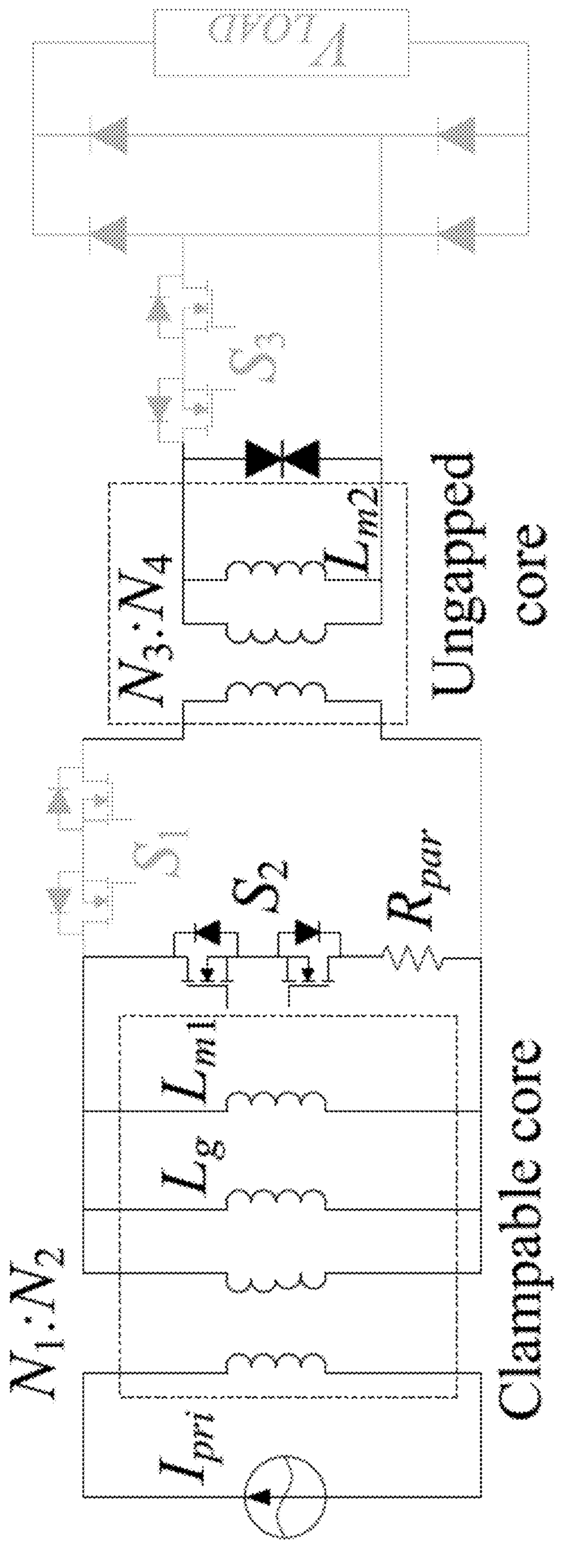

Likewise, the utilization of a transient voltage suppressor (TVS) diode presents another approach to generate an opposite load voltage and desaturate the magnetic core, as depicted in FIGS. 4A and 4B. This can reduce voltage spikes. In comparison to the LC resonance desaturation method, the capacitor is replaced by a TVS diode. FIG. 4A demonstrates the energy harvesting process, where switches $S_1$ and $S_3$ are turned on, while switch $S_2$ is turned off. Similarly, FIG. 4B illustrates the desaturation process, where switches $S_1$ and $S_3$ are turned off, and switch $S_2$ is turned on. In this configuration, both the primary current and the load are disconnected from the magnetic core. Following the turn-off of switch $S_1$, the current through L3 that corresponds to the winding of $N_3$ gradually decreases towards zero, inducing a reverse voltage across the TVS diode. The reverse voltage is limited to a constant value determined by the TVS diode and modifies the direction of the B field to the opposite saturation polarity. The execution of this method is much easier than that of the LC induction method as it does not need complicated calculations on capacitance and resonance timings; however, this method is more lossy than the LC induction method as the TVS diode dissipates power.

In an embodiment, a plurality of switches (e.g., bidirectional switches) can be provided to achieve current commutation and reverse the voltage imposed on the magnetic core through a passive rectifier. This prevents or inhibits the core from reaching full saturation (or at least minimizes the time the core is in full saturation), thereby preventing or inhibiting the power transfer from ceasing (or at least minimizing the time the power transfer is ceased). For example, the plurality of switches can comprise at least four switches or exactly four switches (e.g., four bidirectional switches), and the four switches can be disposed in a crisscross manner.

Figure 5A:
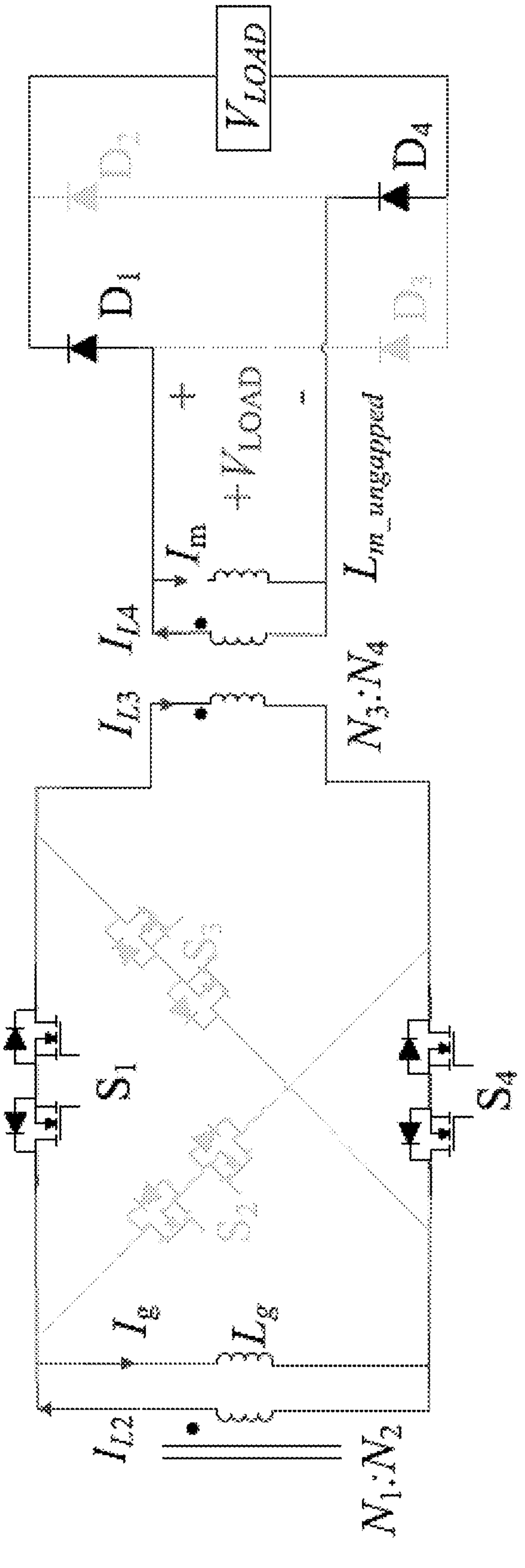
FIGS. 5A-5D show schematic views of a system/method of desaturation via a plurality of bidirectional switches (four crisscross bidirectional switches), according to an embodiment of the subject invention.
Figure 5B:
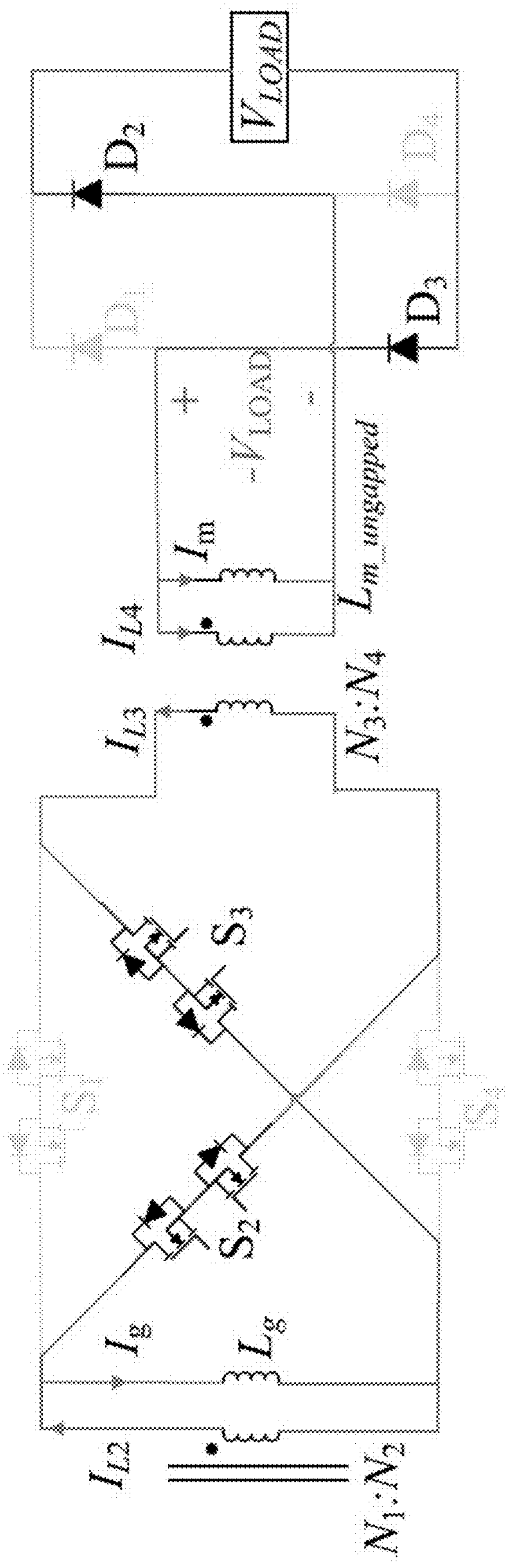

FIGS. 5A-5D show schematic views of a system/method of desaturation via a plurality of bidirectional switches (four crisscross bidirectional switches). This is approach entails the utilization of four crisscross bidirectional switches between two magnetic cores to facilitate current commutation and modify the voltage experienced by the magnetic core via a passive rectifier mechanism. The four different states (first state, second state, third state, and fourth state) of the circuit are depicted in FIGS. 5A-5D, respectively. The first state, presented in FIG. 5A, illustrates the scenario where the primary current is positive, and switches $S_1$ and $S_4$ are activated, resulting in the flow of current $I_{L4}$ through diodes $D_1$ and $D_4$. The core voltage observed from the load side is denoted as $+V_{LOAD}$. In contrast, during the second state, as shown in FIG. 5B, the primary current remains positive, and switches $S_2$ and $S_3$ are activated, causing the flow of current $I_{L4}$ in the opposite direction through diodes $D_2$ and $D_3$. Consequently, the core voltage seen from the load side is represented as $-V_{LOAD}$. In the third state, depicted in FIG. 5C, the primary current becomes negative, and switches $S_1$ and $S_4$ are activated, leading to current $I_{L4}$ flowing through diodes $D_2$ and $D_3$. In this third state, the core voltage observed from the load side is $-V_{LOAD}$. The fourth state, illustrated in FIG. 5D, corresponds to a negative primary current with switches $S_2$ and $S_3$ being activated, causing the flow of current $I_{L4}$ in the opposite direction through diodes $D_1$ and $D_4$. As a result, the core voltage seen from the load side is $+V_{LOAD}$. This alternating core voltage configuration recovers the core from saturation or prevents or inhibits it from going into deep saturation. FIG. 6 shows the corresponding variations in the load current and the B field during the first through fourth states.

In an embodiment, a plurality of switches (e.g., unidirectional switches) and at least one additional magnetic stage (beyond what may be present as part of the typical MEH system) (e.g., exactly one additional magnetic stage) can be provided to achieve current commutation and reverse the voltage of the magnetic core for desaturation. This prevents or inhibits the core from reaching full saturation (or at least minimizes the time the core is in full saturation), thereby preventing or inhibiting the power transfer from ceasing (or at least minimizing the time the power transfer is ceased). For example, the plurality of switches can comprise at least four switches or exactly four switches (e.g., four unidirectional switches).

Figure 7:
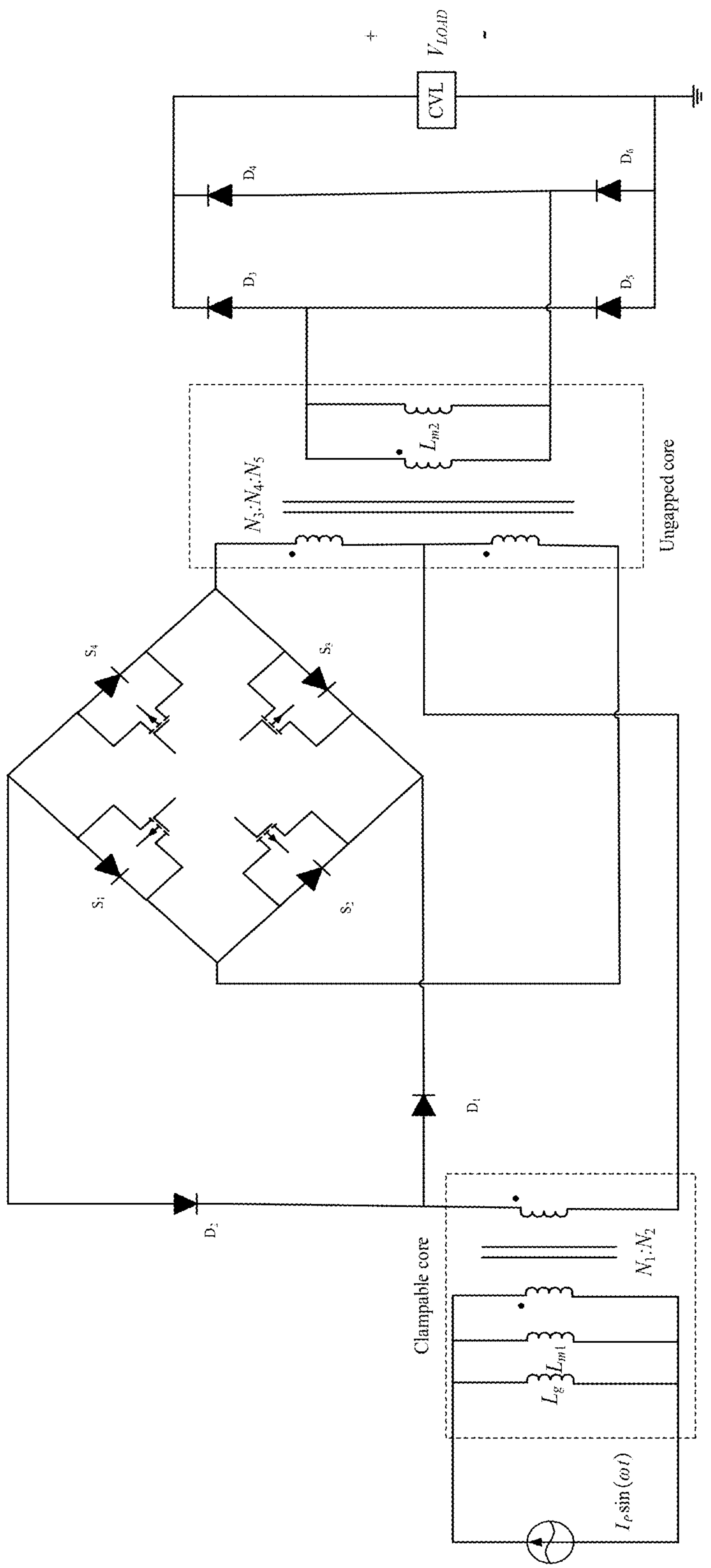
FIG. 7 shows a schematic view of a system/method of desaturation via a plurality of unidirectional switches (four unidirectional switches, six diodes, and a central-tapped transformer), according to an embodiment of the subject invention.
Figure 8A:
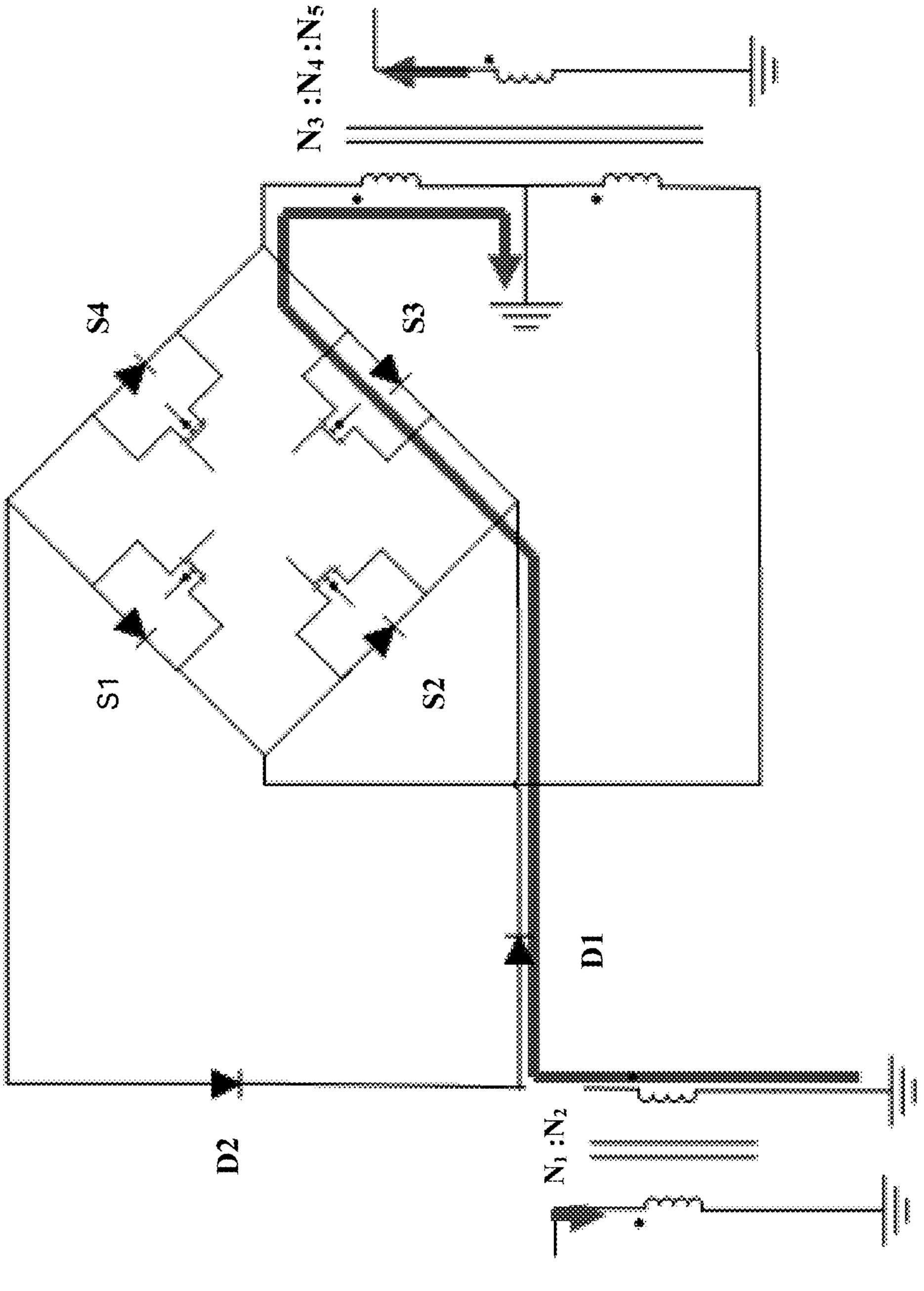
FIGS. 8A-8D show schematic views illustrating principles of desaturation via the system/method depicted in FIG. 7.
Figure 8B:
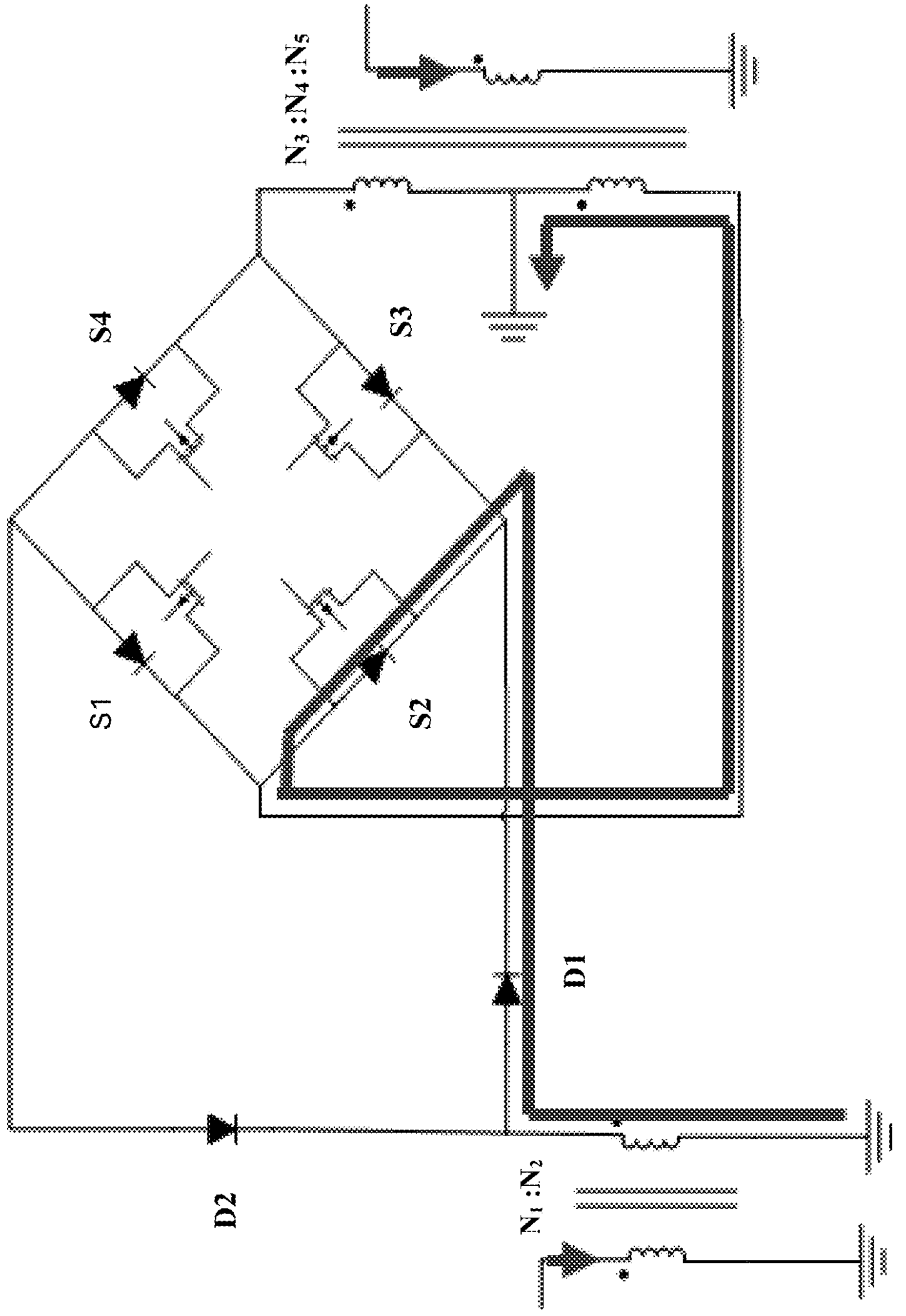
Figure 8C:
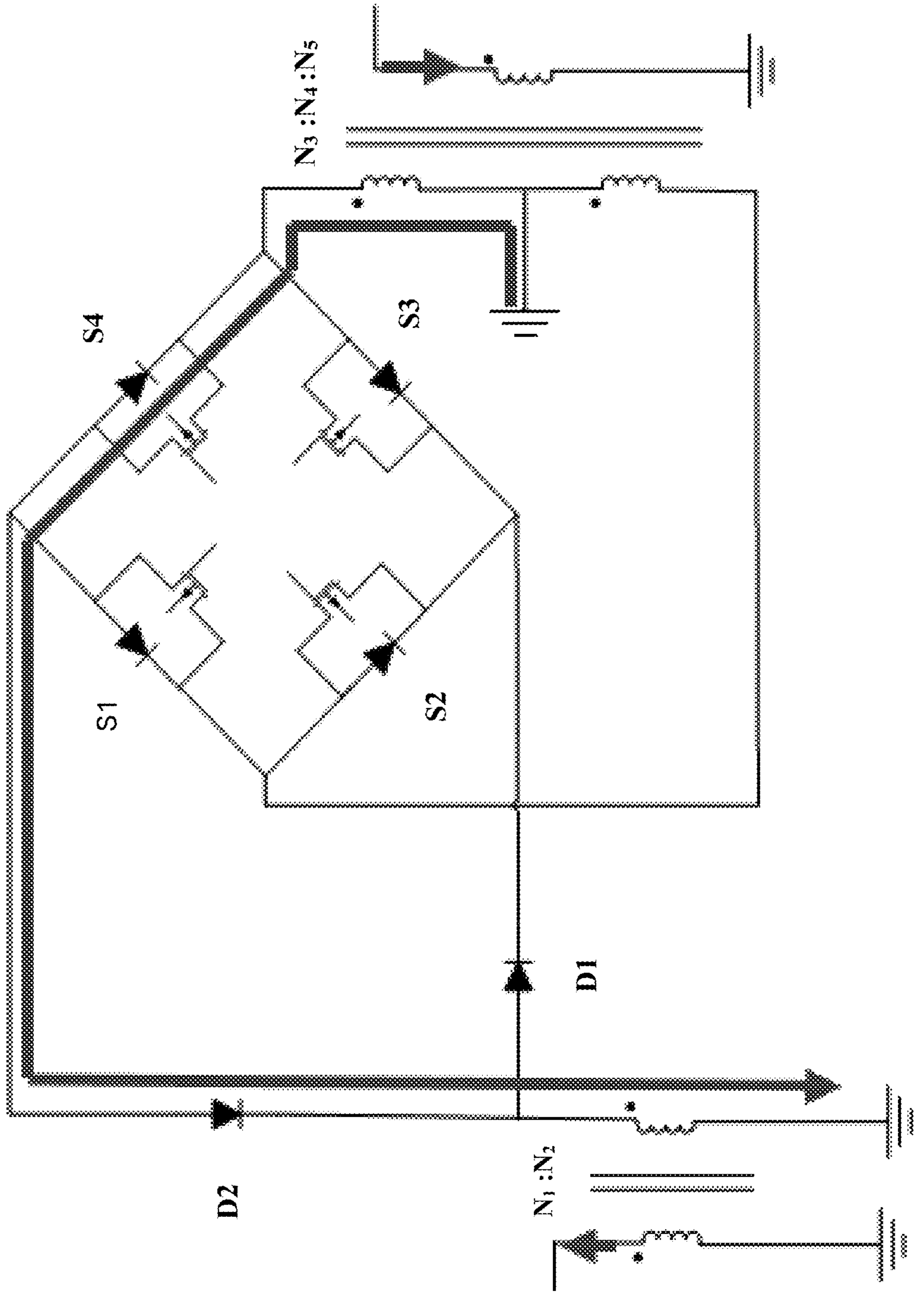
Figure 8D:
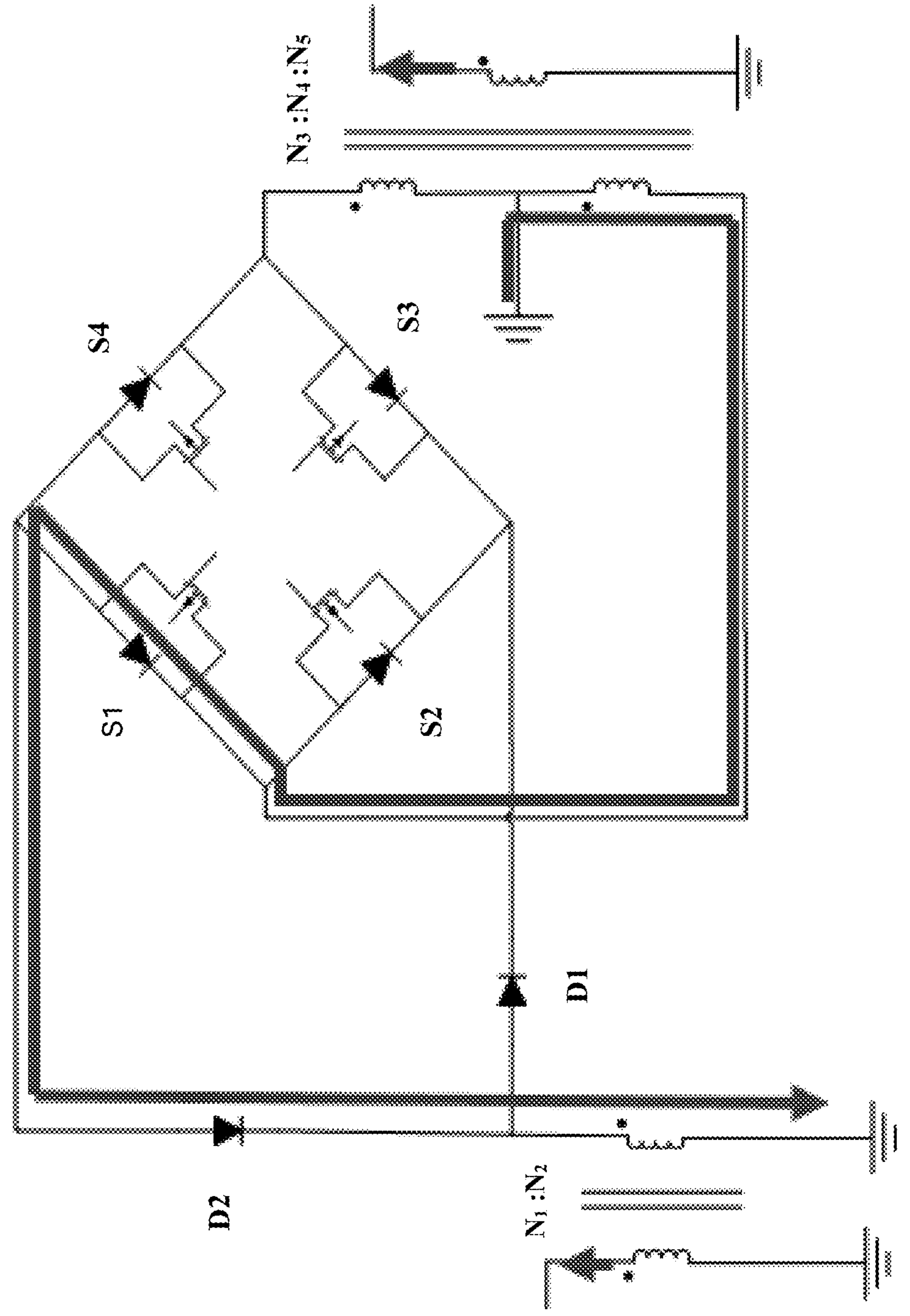
Figure 9:
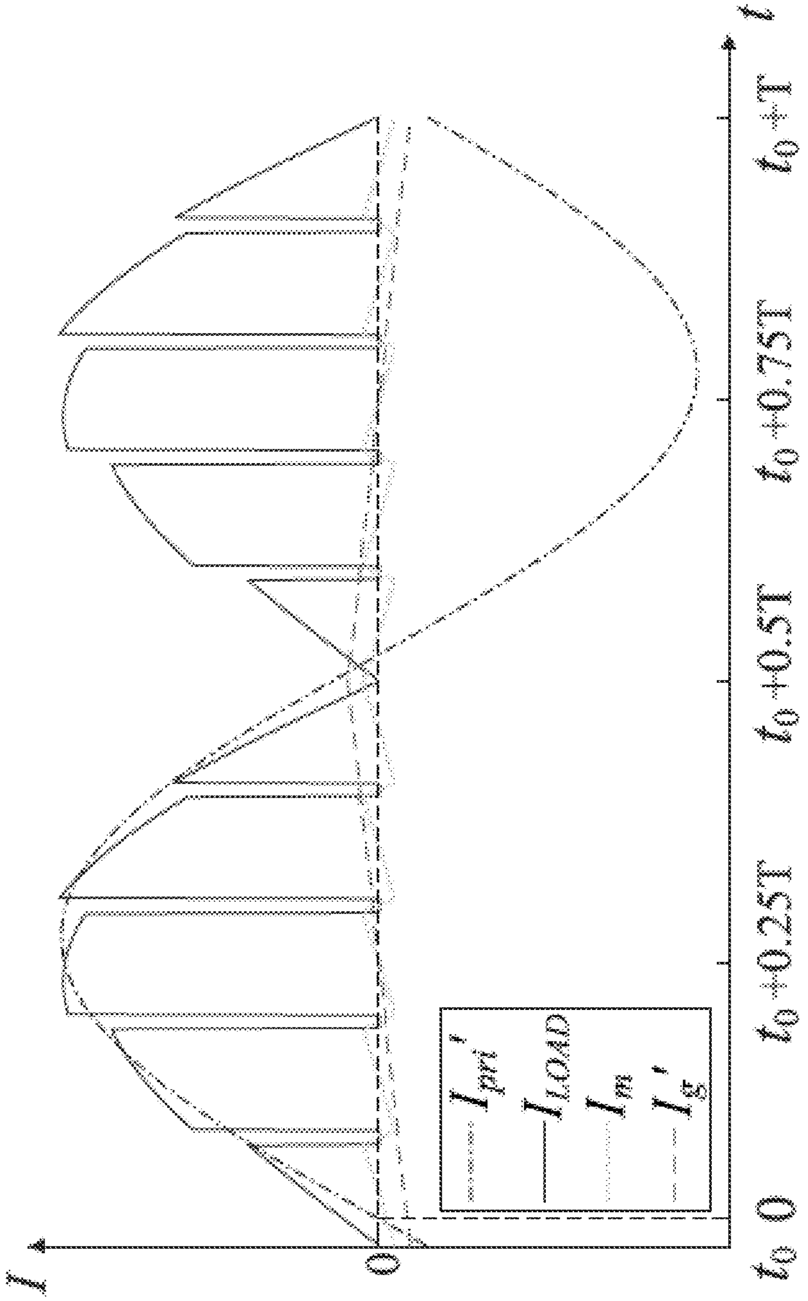
FIG. 9 shows current waveforms seen from the load side, for the system shown in FIG. 3C.

FIG. 7 shows a circuit model of a system/method of desaturation via a plurality of unidirectional switches (four unidirectional switches, six diodes, and a central-tapped transformer) to modify the voltage experienced by the magnetic core through a passive rectifier, thereby maintaining the core in an unsaturated state. FIGS. 8A-8D show four different states (first state, second state, third state, and fourth state), respectively, of the circuit. In the first state (FIG. 8A), having a positive primary current, the current flows through the upper primary winding of the ungapped core via diode $D_1$ and switch $S_3$. This configuration leads to the current $I_{L4}$ flowing through diodes $D_3$ and $D_6$. The core voltage observed from the load side is denoted as $+V_{LOAD}$. In the second state (FIG. 8B), while the primary current remains positive, the current now flows through the lower primary winding of the ungapped core via diode $D_1$ and switch $S_2$. Consequently, an opposing current $I_{L4}$ flows through diodes $D_4$ and $D_5$. The core voltage observed from the load side is represented as $-V_{LOAD}$. In the third state (FIG. 8C), having a negative primary current, the current flows through the upper primary winding of the ungapped core via diode $D_2$ and switch $S_4$. This configuration results in current $I_{L4}$ flowing through diodes $D_4$ and $D_5$. The core voltage observed from the load side remains as $-V_{LOAD}$. In the fourth state (FIG. 8D), while the primary current is negative, the current now flows through the lower primary winding of the ungapped core via diode $D_2$ and switch $S_2$. This generates an opposing current $I_{L4}$ flowing through diodes $D_3$ and $D_6$. The core voltage observed from the load side is $+V_{LOAD}$. This alternating core voltage configuration recovers the core from saturation or prevents it from going into deep saturation.

In embodiments, a system can include an MEH system having implemented thereon any of the four strategies disclosed herein.

Some methods of embodiments of the subject invention (power converter method, LC resonance method, TVS method) will be discussed in more detail below. A single-core case can be considered. First, an auxiliary control voltage ($V_{desat}$) can be introduced as a reverse flux source for the desaturation scheme, as illustrated in FIGS. 1A and 1B. The magnetic core can be modeled as an ideal transformer in parallel with a nonlinear, saturating magnetizing inductance ($L_m$). The numbers of turns in the primary and secondary windings are $N_1$ and $N_2$, respectively, and are denoted on the ideal transformers. Usually, $N_1=1$, and it can be assumed so to minimize the intrusiveness to the primary system and perform fair comparisons. The three switches can all be bidirectional to conduct and block AC currents. As shown in FIG. 1A, during energy harvesting, $S_1$ and $S_2$ are turned on, whereas $S_3$ is turned off. Once the core goes into saturation during the energy harvesting phase, $S_1$ and $S_2$ are turned off, whereas $S_3$ is turned on. As a result, the primary current and load are both disconnected from the magnetic core, unable to interact with the saturated core.

It can be assumed that the primary current has another way of routing the ongoing current as $S_1$ opens, and this is part of the problem in a single-core scenario. Subsequently, the control voltage, $V_{desat}$, whose direction is opposite to that of the load voltage, applies the magnetic flux density (B field) in a reverse direction with respect to the current saturation polarity. As the core is solely connected to $V_{desat}$ only, the toll that must be paid to reverse the magnetic saturation polarity is only a core loss. If the core still sees the primary side and/or load, $V_{desat}$ will interact with the connected sides, dissipating much higher energy than a core loss. This process enables the occurrence of multiple energy harvesting windows in a periodic cycle (i.e., a half AC period), as depicted in FIGS. 2A-2F. The secondary current, $I_{sec}$, secondary voltage, $V_{core}$, and B field of the magnetic core are illustrated for scenarios without (FIGS. 2B, 2D, and 2F) and with (FIGS. 2A, 2C, and 2E) the desaturation scheme using an auxiliary control voltage, $V_{desat}$. Without the desaturation technique, when the B-field in the core reaches the saturation value ($B_{SAT}$) as the core's volt-second accumulates over time, it can no longer deliver the transformer current to the load because the transformer current only flows through the "shorted" and saturated magnetizing inductance, exhibiting negligible voltage across the magnetic core. However, when the desaturation method is used, the core voltage oscillates, as in FIGS. 2A, 2C, and 2E, between the load voltage and the reverse desaturation voltage. This ensures that the magnetic flux density in the core always stays beneath its maximum value and allows multiple energy harvesting windows within a half AC line cycle.

Figure 2A:
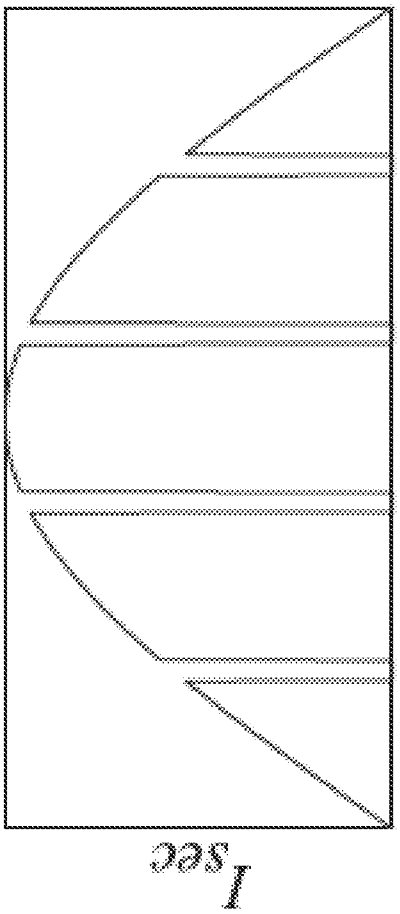
FIGS. 2A and 2B show plots of secondary current ($I_{SEC}$) versus time for the system/method depicted in FIGS. 1A and 1B.
Figure 2B:
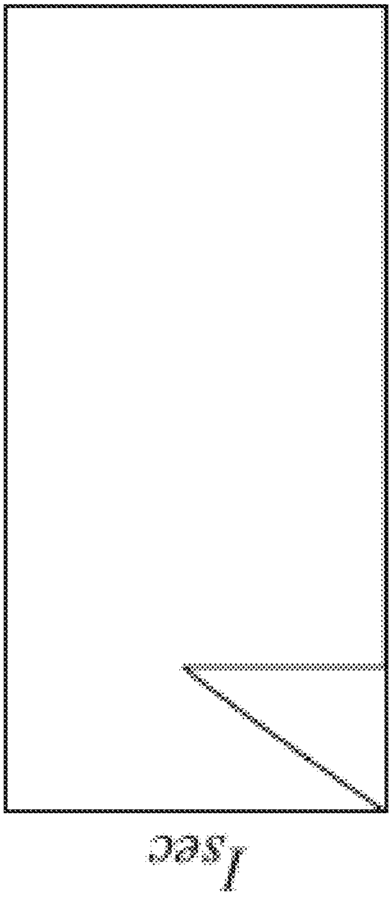
Figure 2C:
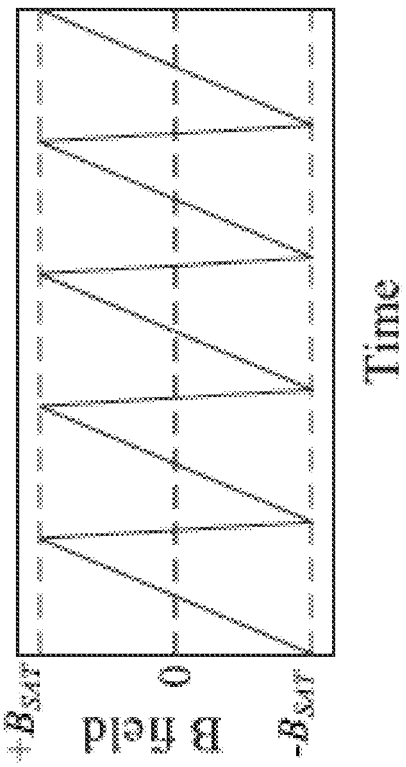
FIGS. 2C and 2D show plots of magnetic field (B field) versus time for the system/method depicted in FIGS. 1A and 1B.
Figure 2D:
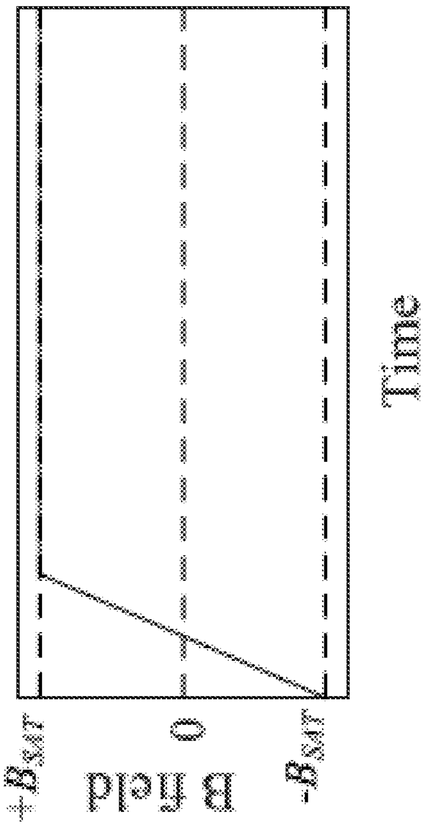
Figure 2E:
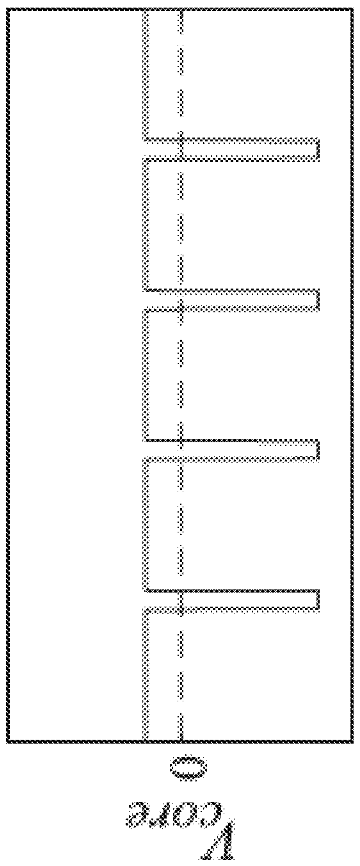
FIGS. 2E and 2F show plots of voltage of the core ($V_{CORE}$) versus time for the system/method depicted in FIGS. 1A and 1B.
Figure 2F:
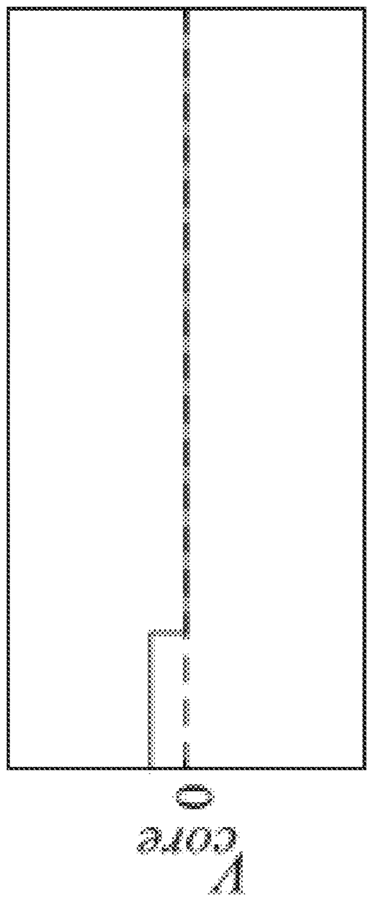
Figure 2G:
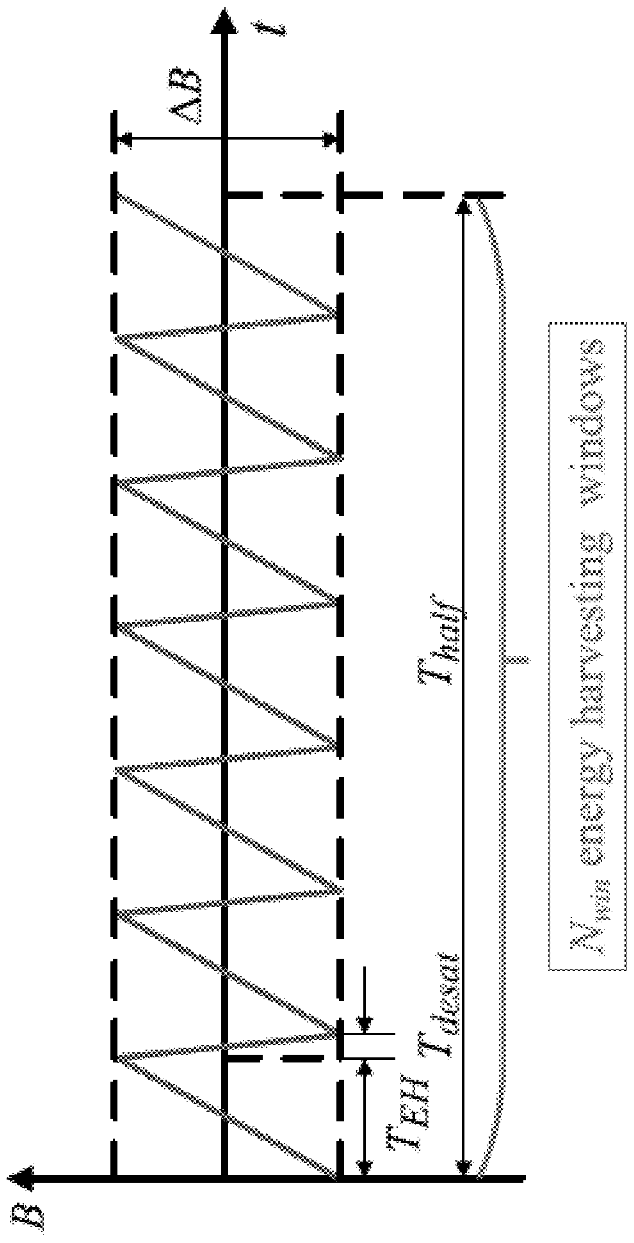
FIG. 2G shows a plot of B field versus time, showing energy harvesting and desaturation windows in half the alternating current (AC) line cycle ($T_{half}$)

The constant voltage load case can be focused on because the harvester will likely interface with an energy storage (e.g., battery, supercapacitor) or an input stage of subsequent power conversion. The durations of the energy harvesting and desaturation windows are symbolized as THE and $T_{desat}$, respectively, and are defined by Equations (1) and (2) based on Faraday's law. Here, $V_{LOAD}$ represents the load voltage that receives the harvested energy. As depicted in FIG. 2G, the lengths of these windows must sum up to half the AC line cycle, represented by $T_{half}$. The durations and their constraint can be written as $$T_{EH} = \frac{\Delta B\, A_{CORE}\, N_2}{V_{LOAD}},\ (\Delta B \in [0,\ 2B_{SAT}]) \tag{1}$$

$$T_{desat} = \frac{\Delta B\, A_{CORE}\, N_2}{V_{desat}} = \frac{T_{EH}}{k_v},\ \text{and} \tag{2}$$

$$N_{win} T_{EH} + (N_{win} - 1)\ T_{desat} = T_{half} \tag{3}$$

where ΔB, $A_{CORE}$, and $N_{win}$ denote the fluctuation of the magnetic field density inside the core, the cross-sectional area of the magnetic core, and the number of energy harvesting windows in $T_{half}$, respectively. $B_{SAT}$ is the maximum value of magnetic flux density in the magnetic core. Further, $k_v$ is defined as the voltage ratio of $V_{desat}$ to $V_{LOAD}$. Substituting Equations (1) and (2) into Equation (3) yields $$\left(\frac{N_{win}}{V_{LOAD}} + \frac{N_{win} - 1}{V_{desat}}\right) \Delta B\ A_{CORE} N_2 = T_{half}. \tag{4}$$

It is noteworthy that among the four variables in Equation (4) (i.e., ΔB, $N_{win}$, $V_{LOAD}$, and $V_{desat}$), only three are independent. The fourth is determined from the other three. FIGS. 2A-2G illustrate how effective the desaturation concept can be with multiple energy harvesting windows within one period (i.e., $T_{half}$). However, it is important that during desaturation phases, the load disconnects from the magnetic core and does not receive any power, leading to a discontinued current waveform. In order to compute the total harvested energy in each window, it is important to first quantify the dip in the load current during each desaturation period compared with the sinusoidal waveform on the secondary side (i.e., $I_P \sin(\omega t)/N_2$). In order to calculate the reduction in the load current during the first desaturation phase, the integral of $I_{desat,1}$, in the unit of charge, is computed $$\int_{T_{EH}}^{T_{EH}+T_{desat}} I_{desat,1}(t)\,dt = \int_{T_{EH}}^{T_{EH}+T_{desat}} \frac{I_P \sin(\omega t)}{N_2}\,dt = \frac{I_P[\cos(\omega T_{EH}) - \cos(\omega T_{EH} + \omega T_{desat})]}{N_2\omega}. \tag{5}$$

Analogously, during the mth desaturation phase, the integral of $I_{desat,m}$ is $$\int_{m\cdot T_{EH}+(m-1)\cdot T_{desat}}^{m\cdot T_{EH}+m\cdot T_{desat}} I_{desat,m}(t)\,dt = \frac{I_P[\cos(m\omega T_{EH} + (m-1)\omega T_{desat}) - \cos(m\omega T_{EH} + m\omega T_{desat})]}{N_2\omega} = \sin\left(m\,\omega(T_{EH} + T_{desat}) - \frac{\omega T_{desat}}{2}\right)\cdot\frac{2\,I_P \sin\left(\frac{\omega T_{desat}}{2}\right)}{N_2\omega}. \tag{6}$$

The reduction in the load current due to these $N_{win}-1$ desaturation windows is $$I_{desat} = \frac{1}{T_{half}}\sum_{m=1}^{N_{win}-1}\int_{m\cdot T_{EH}+(m-1)\cdot T_{desat}}^{m\cdot T_{EH}+m\cdot T_{desat}} I_{desat,m}(t)\,dt = \frac{2\,I_P \sin\left(\frac{\omega T_{desat}}{2}\right)}{N_2\pi}\sum_{m=1}^{N_{win}-1}\sin\left(m\cdot\frac{\pi-\omega T_{EH}}{N_{win}-1} - \frac{\omega T_{desat}}{2}\right). \tag{7}$$

The summation term in Equation (7) simplifies to $$\sum_{m=1}^{N_{win}-1}\sin\left(m\cdot\frac{\pi-\omega T_{EH}}{N_{win}-1} - \frac{\omega T_{desat}}{2}\right) = \csc\left(\frac{\pi-\omega T_{EH}}{2(N_{win}-1)}\right)\cos\left(\frac{\omega T_{EH}}{2}\right) \tag{8}$$

which in turn converts Equation (7) into $$I_{desat} = \frac{2\,I_P}{\pi\,N_2}\cdot\sin\left(\frac{\omega T_{desat}}{2}\right)\cos\left(\frac{\omega T_{EH}}{2}\right)\times\csc\left(\frac{\omega T_{EH}+\omega T_{desat}}{2}\right). \tag{9}$$

Substituting Equations (1)-(3) into Equation (9), $T_{desat}$ and $T_{EH}$ can be eliminated, ultimately producing $$I_{desat} = \frac{2\,I_P}{\pi\,N_2}\sin\left(\frac{\frac{\pi}{2}}{N_{win}(1+k_v)-1}\right)\times\cos\left(\frac{\frac{\pi}{2}}{N_{win}\left(1+\frac{1}{k_v}\right)-\frac{1}{k_v}}\right)\times\csc\left(\frac{\left(1+\frac{1}{k_v}\right)\frac{\pi}{2}}{N_{win}\left(1+\frac{1}{k_v}\right)-\frac{1}{k_v}}\right). \tag{10}$$

Then, the harvested current (i.e., average load current) can be computed by $$I_{LOAD} = \frac{1}{T_{half}}\int_0^{T_{half}}\frac{I_P}{N_2}\sin(\omega t)\,dt - I_{desat}. \tag{11}$$

Note that Equation (11) can be expressed either with $T_{desat}$ and $T_{EH}$ or $k_v$ and $N_{win}$. For example, with Equation (10), $k_v$, and $N_{win}$, $$I_{LOAD} = \frac{2\,I_P}{\pi\,N_2} - \frac{2\,I_P}{\pi\,N_2}\sin\left(\frac{\frac{\pi}{2}}{N_{win}(1+k_v)-1}\right)\times\cos\left(\frac{\frac{\pi}{2}}{N_{win}\left(1+\frac{1}{k_v}\right)-\frac{1}{k_v}}\right)\times\csc\left(\frac{\left(1+\frac{1}{k_v}\right)\frac{\pi}{2}}{N_{win}\left(1+\frac{1}{k_v}\right)-\frac{1}{k_v}}\right). \tag{12}$$

The harvested energy, or equivalently average load power, is $$P_{OUT} = V_{LOAD}I_{LOAD} = \frac{2\,V_{LOAD}\,I_P}{\pi\,N_2} - \frac{2\,V_{LOAD}\,I_P}{\pi\,N_2}\sin\left(\frac{\omega T_{desat}}{2}\right)\cos\left(\frac{\omega T_{EH}}{2}\right)\times\csc\left(\frac{\omega T_{EH}+\omega T_{desat}}{2}\right) = \frac{2\,V_{LOAD}\,I_P}{\pi\,N_2} - \frac{2\,V_{LOAD}\,I_P}{\pi\,N_2}\sin\left(\frac{\frac{\pi}{2}}{N_{win}(1+k_v)-1}\right)\cos\left(\frac{\frac{\pi}{2}}{N_{win}\left(1+\frac{1}{k_v}\right)-\frac{1}{k_v}}\right)\times\csc\left(\frac{\left(1+\frac{1}{k_v}\right)\frac{\pi}{2}}{N_{win}\left(1+\frac{1}{k_v}\right)-\frac{1}{k_v}}\right). \tag{13}$$

Note that a high number of energy harvesting windows (or, equivalently, a high desaturation voltage) will approximate Equation (13) to $P_{OUT}=2\,V_{LOAD}\,I_P/\pi\,N_2$. Under this asymptotic scenario, $I_{desat}$ will be negligibly small, and $I_{LOAD}$ will be sinusoidal.

In the case of cascaded two-core, the proposed desaturation scheme can be theoretically analyzed under the practical, nonintrusive scenario (i.e., with a cascaded two-core structure). The primary control capability that the single-core case required is no longer needed. The cascaded two-core structure comprises a clampable core for the first power stage cascaded with an ungapped core for the second power stage. The ungapped core with an extremely high magnetic permeability for high shunt impedance is used for maximum energy extraction. The clampable core not only functions as an isolation barrier between the primary system and the harvesting core to avoid interruption to the primary system but also facilitates a nonintrusive mounting of the energy harvester onto the current-carrying wire, which readily facilitates integration into the existing systems without breaking the primary circuit.

Figure 3C:
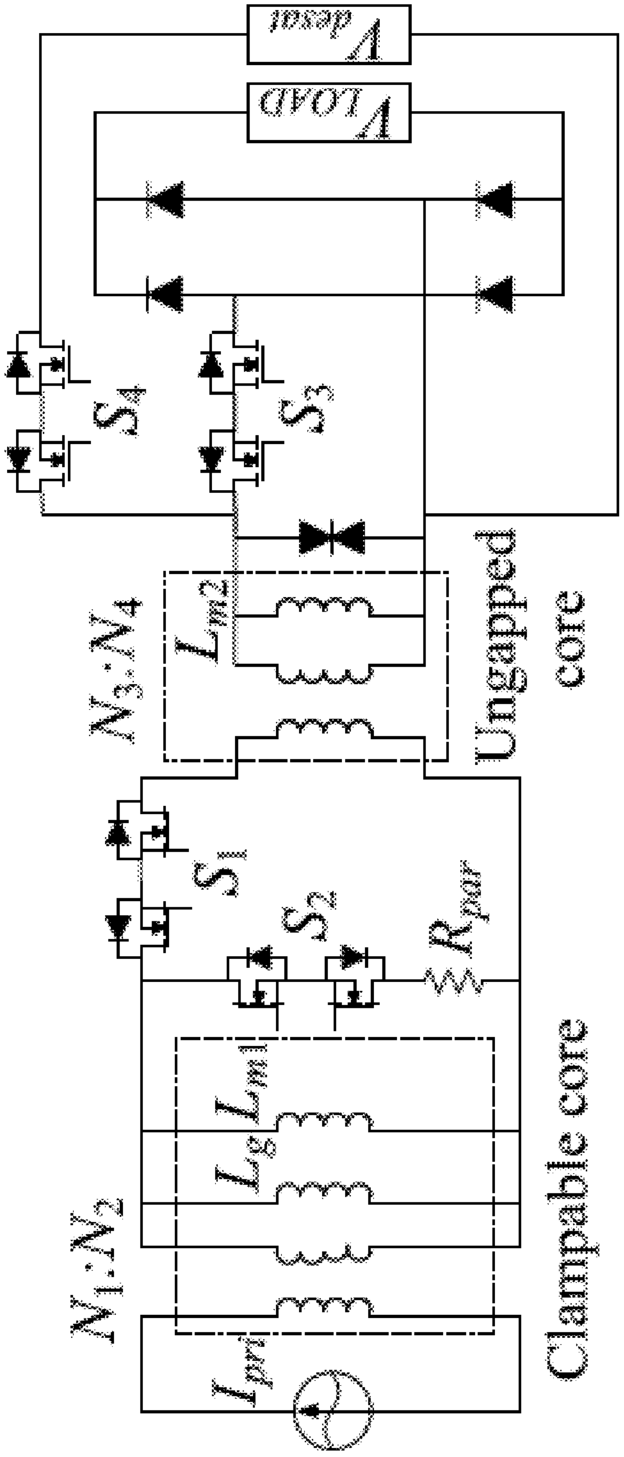

In FIGS. 1A and 1B, the switch $S_1$, which connects the magnetic core to the primary system, is turned on during the energy harvesting phase and is subsequently turned off during the desaturation phase. In the single-core case, transitions of $S_1$ introduce a disruption to the primary system's operation. The two-core configuration is inherently beneficial in this regard as $S_1$ does not have to be on the primary side. The clampable core, used as the first stage of the two-core structure, allows a nonintrusive installation. The ungapped core provides maximal energy harvesting via manipulating magnetic saturation and enables the desaturation scheme with $S_1$ inserted between the clampable core and the ungapped core. Overall, a potential downtime in the primary system is greatly minimized. The equivalent circuit of the cascaded two-core structure is illustrated in FIG. 3C. The MEH system mainly comprises two cores and four bidirectional switches. Optionally, a transient-voltage-suppression (TVS) diode can be inserted for voltage spike mitigation and switch overvoltage protection. During the energy harvesting phase, the switches $S_1$ and $S_3$ can be turned on, whereas switches $S_2$ and $S_4$ can be turned off. The switches operate reversely during the desaturation phase. Compared with the single-core structure, the switch $S_2$ and the resistor $R_{par}$ are newly inserted to provide a path for the air-gap inductance current to flow through during the desaturation phase when switch $S_1$ is turned off. $R_{par}$ can also be used to curb the maximum free-wheeling current. However, it is not strictly required if the switch $S_2$ can handle the current stress. The TVS diode can be extremely helpful in voltage spike mitigation, maintaining the voltage stress on the switches within permitted ranges.

FIG. 5 depicts the waveforms of four currents: harvested current (i.e., $I_{LOAD}$) in solid (blue); the current through the air gap inductance (i.e., $I_g'$) in dashed (red); the harvesting (ungapped) core's magnetizing current (i.e., $I_m$) in dotted (green); and the primary current (i.e., $I_{pri}'$) in dash-dot (black). The prime notation in $I_g'$ and $I_{pri}'$ indicates that they are referred to the load side.

The fluctuation in the air-gap inductance current for each $T_{half}$ is $$\Delta I_g = \frac{V_{LOAD}\ N_3\ N_{win}\ T_{EH}}{L_g\ N_4}. \tag{14}$$

The fluctuation in the harvesting core's magnetizing current for each $T_{half}$ is $$\Delta I_m = \frac{V_{LOAD}\ T_{EH}}{L_{m2}}. \tag{15}$$

In accordance with Kirchhoff's current law (KCL)

$$I'_{pri} = (I_m + I_{LOAD}) + I'_g. \tag{16}$$

Here, the magnetizing current flowing through $L_{m1}$ can be ignored because $L_{m1}$>>$L_g$. A time delay emerges between the zero-crossing points of the primary and load currents due to the existence of air-gap inductance and magnetizing inductance. This time delay, denoted as to, can be determined by $$\frac{I_P\ N_1}{N_2}\sin(\omega t_0) = \frac{\Delta I_m \frac{N_4}{N_3} + \Delta I_g}{2}. \tag{17}$$

By substituting Equations (14) and (15) into Equation (17), the value of to can be derived $$t_0 = \frac{1}{\omega}\arcsin\left[\frac{N_2\ V_{LOAD}\ T_{EH}}{2\ N_1\ I_P}\left(\frac{N_4}{L_{m2}\ N_3} + \frac{N_3\ N_{win}}{L_g\ N_4}\right)\right]. \tag{18}$$

For the cascaded two-core structure, a similar derivation to Equation (13) can be carried out to obtain the harvested energy $$P_{OUT} = V_{LOAD}I_{LOAD} = \frac{2\ I_P\ N_1\ N_3\ V_{LOAD}}{\pi\ N_2\ N_4}\cos(\omega t_0) - \frac{2\ I_P\ N_1\ N_3\ V_{LOAD}}{\pi\ N_2\ N_4} \times \sin\left(\frac{\omega T_{desat}}{2}\right)\cos\left(\frac{\omega\ T_{EH}}{2}\right) \times \csc\left(\frac{\omega T_{EH} + \omega T_{desat}}{2}\right). \tag{19}$$

When organized in terms of $k_v$ and $N_{win}$, the harvested energy, or equivalently average load power, is $$P_{OUT} = \frac{2\ I_P\ N_1\ N_3\ V_{LOAD}}{\pi\ N_2\ N_4}\cos(\omega t_0) - \frac{2\ I_P\ N_1\ N_3\ V_{LOAD}}{\pi\ N_2\ N_4}\sin\left(\frac{\frac{\pi}{2}}{N_{win}(1+k_v)-1}\right) \times \cos\left(\frac{\frac{\pi}{2}}{N_{win}\left(1+\frac{1}{k_v}\right)-\frac{1}{k_v}}\right) \times \csc\left(\frac{\left(1+\frac{1}{k_v}\right)\frac{\pi}{2}}{N_{win}\left(1+\frac{1}{k_v}\right)-\frac{1}{k_v}}\right). \tag{20}$$

Under the condition where $k_v$>>1 (i.e., $V_{desat}$>>$V_{LOAD}$), $P_{OUT}$ becomes $$P_{OUT} \approx \frac{2\ I_P\ V_{LOAD}\ N_1\ N_3}{\pi\ N_2\ N_4}\left[\cos(\omega t_0) - \sin\left(\frac{\pi}{2}\cdot\frac{1}{k_v\ N_{win}}\right)\right]. \tag{21}$$

Here, under the same assumption, Equation (10) can be approximated to $$I_{desat} \approx \frac{2\ I_P\ N_1\ N_3}{\pi\ N_2\ N_4}\sin\left(\frac{\pi}{2}\cdot\frac{1}{k_v\ N_{win}}\right). \tag{22}$$

The total energy required to desaturate the magnetic core, which the reverse control voltage should provide, together with the energy stored in the core at the end of each energy harvesting cycle, can be described by the following equation, based on the Steinmetz formulation:

$$P_{core} = k((2N_{win} - 1)f_{pri})^{\alpha}\Delta B^{\beta} \tag{23}$$

where $f_{pri}$ is the frequency of the primary current. Note that this is to mainly account for the core loss that the harvesting core (i.e., ungapped core) incurs while performing desaturation at a much higher frequency (i.e., (2 $N_{win}$−1) times higher) than the AC primary frequency. The net harvested energy, or equivalently net average load power, $P_{harvest}$, can be represented as $$P_{harvest} = P_{OUT} - P_{core} - P_{wire} \tag{24}$$

where $P_{wire}$ is the winding loss as defined below $$P_{wire} = I_{LOAD}^2 R_{wire} \tag{25}$$

and $R_{wire}$ is the total winding resistance referred to the load side. For optimal system performance and enhanced capability of energy harvesting, the desaturation voltage should be maximized without exceeding the voltage stress of the switches. In addition, increasing the number of energy harvesting windows within $T_{half}$ is beneficial as long as it does not significantly amplify the core loss. These efforts can notably reduce the desaturation duration and boost the harvested energy.

There are practical and passive ways of implementing the desaturation scheme without inserting an explicit external voltage source, according to some embodiments of the subject invention. Specific passive components can naturally generate negative voltages during certain transient conditions, eliminating the need for additional complex electronic circuits. Two methodologies that leverage passive components to directly generate reverse flux for the main harvesting core include desaturation via LC resonance and desaturation via TVS diode.

Figure 10A:
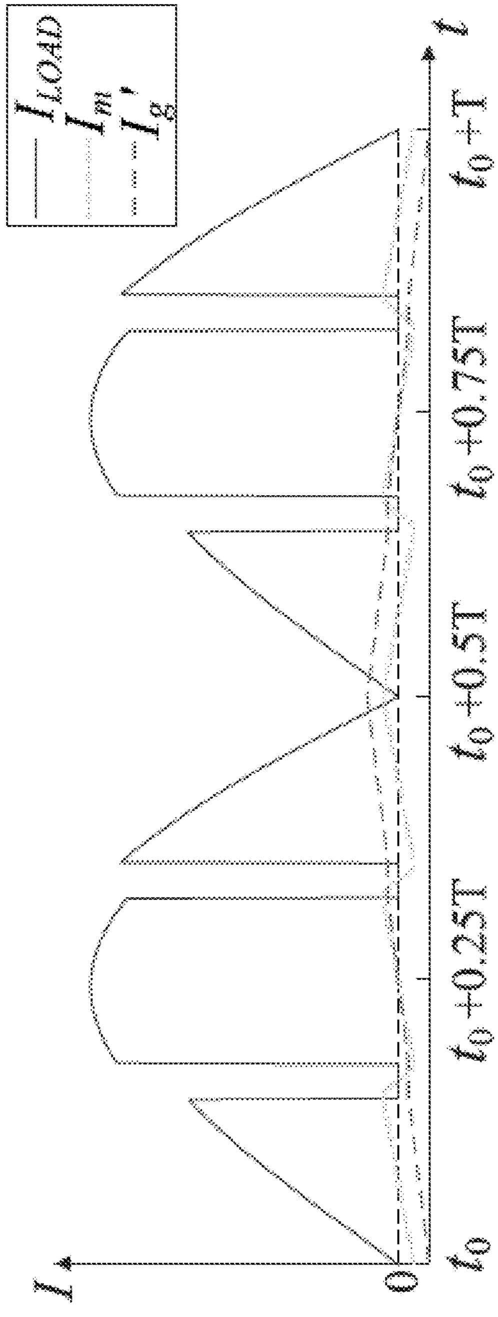
FIG. 10A shows a current waveform seen from the load side during desaturation via LC resonance, for the system shown in FIGS. 3A-3C.
Figure 10B:
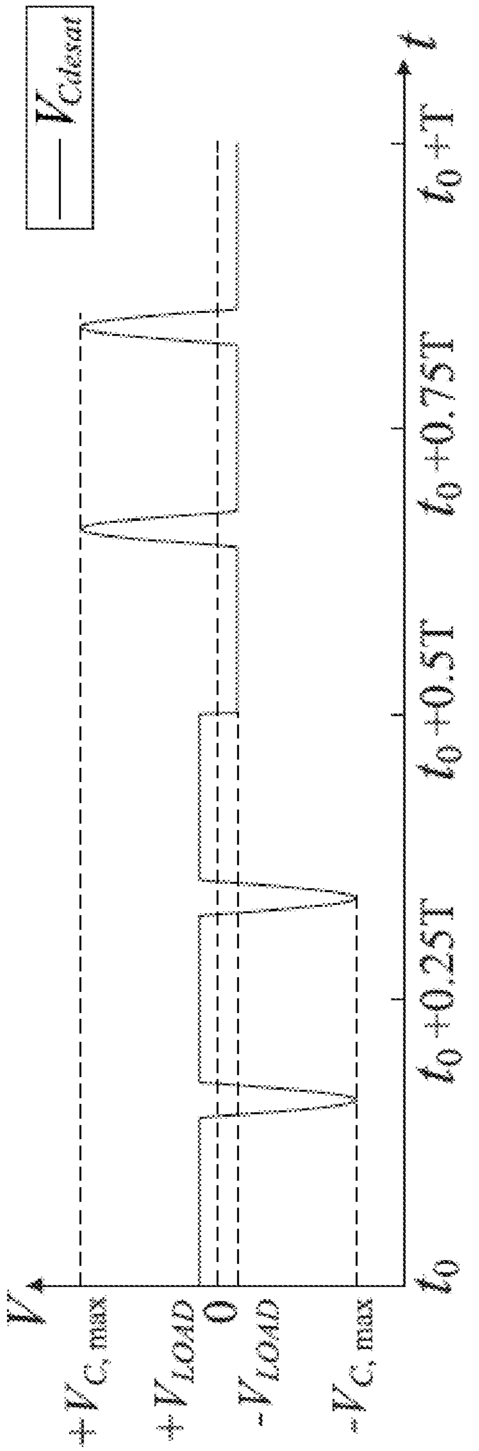
FIG. 10B shows a voltage waveform seen from the load side during desaturation via LC resonance, for the system shown in FIGS. 3A-3C.

With respect to desaturation via LC resonance, this method leverages an LC resonance to produce an opposite voltage for desaturation, as illustrated in FIGS. 3A and 3B. In comparison to the explicit voltage source, the capacitor, denoted as $C_{desat}$, can replace the branch of switch $S_4$ and the auxiliary desaturation voltage source in FIGS. 3A and 3B. FIG. 3A details the energy harvesting phase with switches $S_1$ and $S_3$ engaged while $S_2$ is off. In contrast, FIG. 3B depicts the desaturation phase, during which $S_1$ and $S_3$ are deactivated, and $S_2$ is on. During the desaturation phase, both the primary current and the load are disconnected from the harvesting ungapped core. Although $L_{m2}$ is close to the magnetic saturation boundary, it is still inductive. Hence, its current would better be continuous, especially considering the sheer amount of the harvesting core's inductance (e.g., single- or double-digit H). Therefore, upon deactivation of switch $S_1$, the current initially flowing through $L_{m2}$ is redirected through $C_{desat}$, starting an LC resonance. This process is illustrated in FIGS. 10A and 10B. The current direction into $C_{desat}$ is such that the capacitor voltage is quickly reversing toward the negative of the load voltage in the previous energy harvesting phase. Owing to an LC ring, the associated energy loss is minimal during this process. During the LC ring, the current through the magnetizing inductance, $L_{m2}$, gradually reduces to zero, at which point the maximum reverse voltage is generated across $C_{desat}$. This induced negative voltage reverses the magnetic field direction in the core, diverting it away from its previous saturation polarity. For smooth phase transitions, the desaturation duration, $T_{desat}$, is set to half the resonance period $$T_{desat} = \pi\sqrt{L_{m2}C_{desat}}. \tag{26}$$

In accordance with Equation (3), TEH can be calculated based on $N_{win}$ and $T_{desat}$ $$T_{EH} = \frac{T_{half} + T_{desat}}{N_{win}} - T_{desat}. \tag{27}$$

In FIG. 7, the air-gap inductance current referred to the load side, $I_g'$, is denoted in a dashed (red) line. The current flowing through the harvesting core, $L_{m2}$, is denoted by $I_m$ in a dotted (green) line.

From the energy conservation perspective $$\frac{1}{2}L_{m2}I_{m,EH}^2 + \frac{1}{2}C_{desat}V_{LOAD}^2 = \frac{1}{2}C_{desat}V_{C,max}^2 \tag{28}$$

where the absolute value of magnetizing current, $I_{m,EH}$, at the end of the energy harvesting period is approximately $$I_{m,EH} \approx \frac{V_{LOAD}T_{EH}}{2L_{m2}}. \tag{29}$$

Here, it has been assumed that the harvesting core's flux accumulation is primarily due to the load voltage. The maximum value of capacitor voltage, $V_{C,max}$ is given by $$\begin{aligned} V_{C,\max} &= \sqrt{V_{LOAD}^2 + \frac{L_{m2}}{C_{desat}}I_{m,EH}^2} \\ &= V_{LOAD}\sqrt{1 + \frac{\pi^2 T_{EH}^2}{4\,T_{desat}^2}}. \end{aligned} \tag{30}$$

Finally, combining Equations (19), (27), and (30) generates the harvested power $$\begin{aligned} P_{OUT,LC} = {} & \frac{2\ V_{LOAD}\ I_P\ N_1\ N_3}{\pi\ N_2\ N_4}\cos(\omega t_0) - \\ & \frac{2\ V_{LOAD}\ I_P\ N_1\ N_3}{\pi\ N_2\ N_4}\sin\left(\frac{\omega T_{desat}}{2}\right)\times \\ & \cos\left(\frac{\pi + \omega T_{desat}}{2\ N_{win}} - \frac{\omega\ T_{desat}}{2}\right)\csc\left(\frac{\pi + \omega T_{desat}}{2\ N_{win}}\right). \end{aligned} \tag{31}$$

In Equation (31), the first term is the harvested power from a sinusoidal current. The second term that starts with a negative sign is the dip in the harvested power during the desaturation window due to a discontinued load current. In order to enhance the harvested power, a smaller number of energy harvesting windows and a smaller desaturation capacitance are recommended to shorten desaturation period and improve its energy harvesting capability.

With respect to desaturation via TVS diode, a TVS diode can produce a reverse voltage and desaturate the magnetic core, as illustrated in FIGS. 4A and 4B. In comparison to the LC-resonance approach, the capacitor, $C_{desat}$, is substituted by the TVS diode. FIG. 4A portrays the energy harvesting phase, during which $S_1$ and $S_3$ are turned on and $S_2$ is turned off. In contrast, FIG. 4*b* depicts the desaturation phase with $S_1$ and $S_3$ off and $S_2$ on. During the desaturation phase, both the primary current and load are disconnected from the harvesting core. After turning off $S_1$ and $S_3$, the current through $L_{m2}$ is forced to go through the TVS, developing a relatively constant TVS voltage in a reverse direction to $V_{LOAD}$ in the previous energy harvesting phase. This reverse voltage can naturally generate the opposite B-field and desaturate the core. This current can gradually reduce to zero while outputting the reverse constant voltage set by the TVS diode. This can be a quicker way to desaturation than the LC-resonance approach, albeit at the expense of higher energy dissipation (i.e., diode dissipation versus LC ring).

Figure 11A:
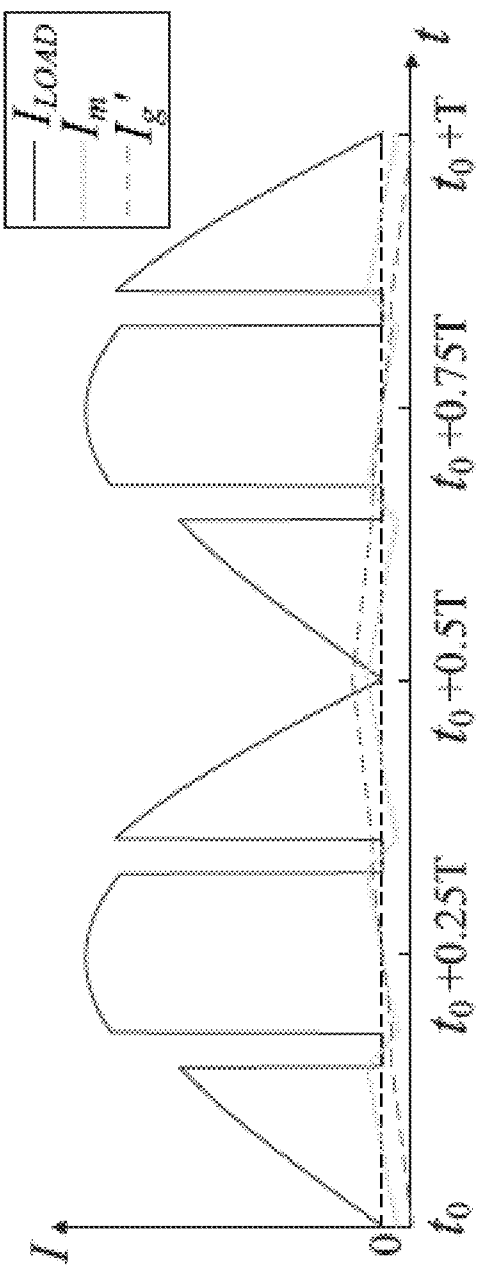
FIG. 11A shows a current waveform seen from the load side during desaturation via LC resonance, for the system shown in FIGS. 4A and 4B.
Figure 11B:
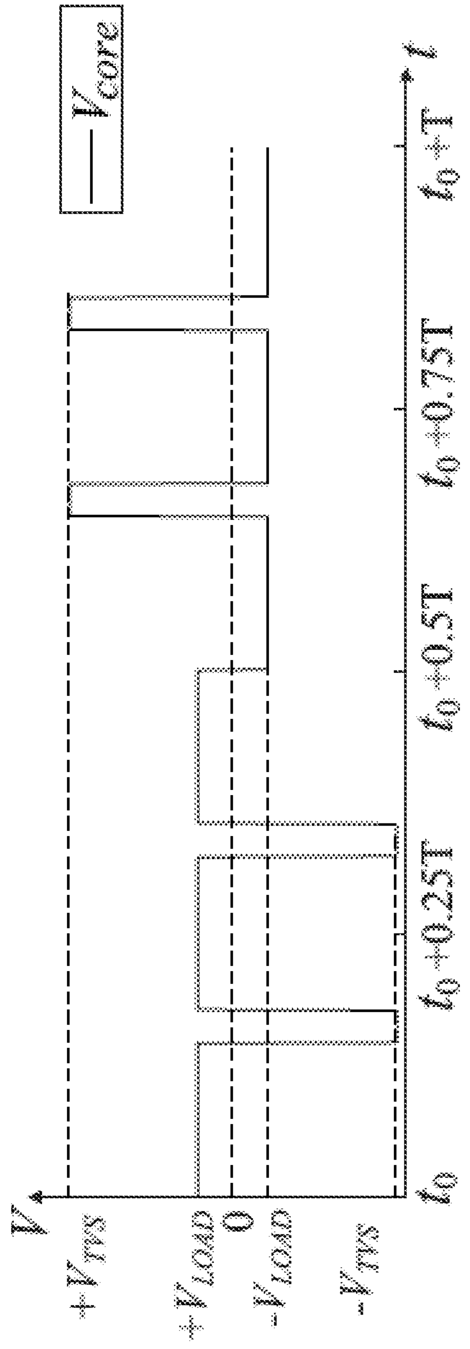
FIG. 11B shows a voltage waveform seen from the load side during desaturation via LC resonance, for the system shown in FIGS. 4A and 4B.

FIGS. 11A and 11B show the load current, $I_{LOAD}$, the air-gap inductance current referred to the load side, $I_g'$, the current flowing through the harvesting core ($L_{m2}$), $I_m$, and the secondary voltage of the harvesting core, $V_{core}$. When using a TVS diode, the desaturation voltage, $V_{desat}$, is uniformly defined by the TVS voltage, represented as $V_{TVS}$. As a result, Equation (20) can be expressed in terms of $V_{TVS}$, $V_{LOAD}$, and $N_{win}$ as follows $$P_{OUT,TVS} = \frac{2}{\pi}\frac{V_{LOAD}}{N_2}\frac{I_P}{}\cos(\omega t_0) - \frac{2}{\pi}\frac{V_{LOAD}}{N_2}\frac{I_P}{}\sin\left(\frac{\frac{\pi}{2}}{N_{win}\left(1+\frac{V_{TVS}}{V_{LOAD}}\right)-1}\right)\times \cos\left(\frac{\frac{\pi}{2}}{N_{win}\left(1+\frac{V_{LOAD}}{V_{TVS}}\right)-\frac{V_{LOAD}}{V_{TVS}}}\right)\times\csc\left(\frac{\left(1+\frac{V_{LOAD}}{V_{TVS}}\right)\frac{\pi}{2}}{N_{win}\left(1+\frac{V_{LOAD}}{V_{TVS}}\right)-\frac{V_{LOAD}}{V_{TVS}}}\right). \tag{32}$$

When $V_{C,max}$ from the LC ring method and $V_{TVS}$ from the TVS method are set to the maximum voltage rating of the switch, $V_{sw,MAX}$, the desaturation durations of the two methods can be further examined as follows, assuming the identical number of harvesting windows and load voltage for both the cases. The time duration ratio of desaturation to energy harvesting phases can be calculated for both $$r_{LC} = \frac{T_{desat,LC}}{T_{EH,LC}} = \frac{\frac{\pi}{2}\cdot V_{LOAD}}{\sqrt{V_{sw,MAX}^2 - V_{LOAD}^2}} \tag{33}$$

$$r_{TVS} = \frac{T_{desat,TVS}}{T_{EH,TVS}} = \frac{V_{LOAD}}{V_{sw,MAX}}. \tag{34}$$

Note $r_{LC} > r_{TVS}$ if $V_{LOAD} > 0$. With Equations (3), (33), and (34)

$$\frac{T_{EH,TVS}}{T_{EH,LC}} = \frac{N_{win} + (N_{win}-1)r_{LC}}{N_{win} + (N_{win}-1)r_{TVS}}. \tag{35}$$

Therefore, the TVS diode method will always offer a longer energy harvesting window than the LC resonance method (i.e., $T_{EH,TVS} > T_{EH,LC}$) at identical load voltage and energy harvesting window counts.

In an embodiment, an MEH system can include a clampable core that is cascaded with a harvesting core, with four directional switches positioned between them, as depicted in FIGS. 5A-5D. This structure still relies on the magnetic fields induced by an AC current with a peak value of $I_P$ at a frequency of $f_{pri}$. The clampable core can be modeled as an ideal transformer in parallel with a magnetizing inductance, $L_{m\_clamp}$, and an air gap inductance, $L_g$. Because $L_g \ll L_{m\_clamp}$, $L_{m\_clamp}$ can be ignored in an analysis. The model of the harvesting core is an ideal transformer in tandem with a magnetizing inductance, $L_{m\_ungapped}$. The numbers of turns of two cores on their primary and secondary sides are denoted as $N_1$, $N_2$, $N_3$, and $N_4$, respectively. Four bidirectional switches, $S_1$, $S_2$, $S_3$, and $S_4$, can be strategically positioned in a crisscross configuration, facilitating precise control of the core voltage polarity and EH window duration to reorient the B-field for desaturation. A TVS diode can be employed to mitigate voltage spikes generated by the activation and deactivation of switches and to protect the circuit elements. The voltage rating of the TVS diode can be chosen based on the breakdown voltage of the switches, ensuring adequate protection for switches against these voltage spikes. The negligible TVS-diode current can be omitted in an analysis. Further, a passive rectifier, including four diodes $D_1$, $D_2$, $D_3$, and $D_4$, can be seamlessly interfaced between the ungapped harvesting core and a constant-voltage load, $V_{LOAD}$, to guarantee continuous power delivery to load.

The passive rectifier could be readily replaced by an active version for lower conduction loss. When a supercapacitor, battery, or an input capacitor of the subsequent power converter is used as a practical load, load voltage regulation is required. With the desaturation method of embodiments of the subject invention, the load voltage can be directly regulated via the bidirectional switches. When the load voltage exceeds a specific value, the switches can create a short circuit (e.g., $S_1$ and $S_3$ on, or $S_2$ & $S_4$ on, or all on) to stop charging the storage capacitor and the capacitor voltage will decrease by delivering power to the load. When the load voltage drops below a specific value, the switches will operate normally to continue the EH process and charge the load/storage capacitor. This hysteresis-based control has been proven to work.

Figure 5C:
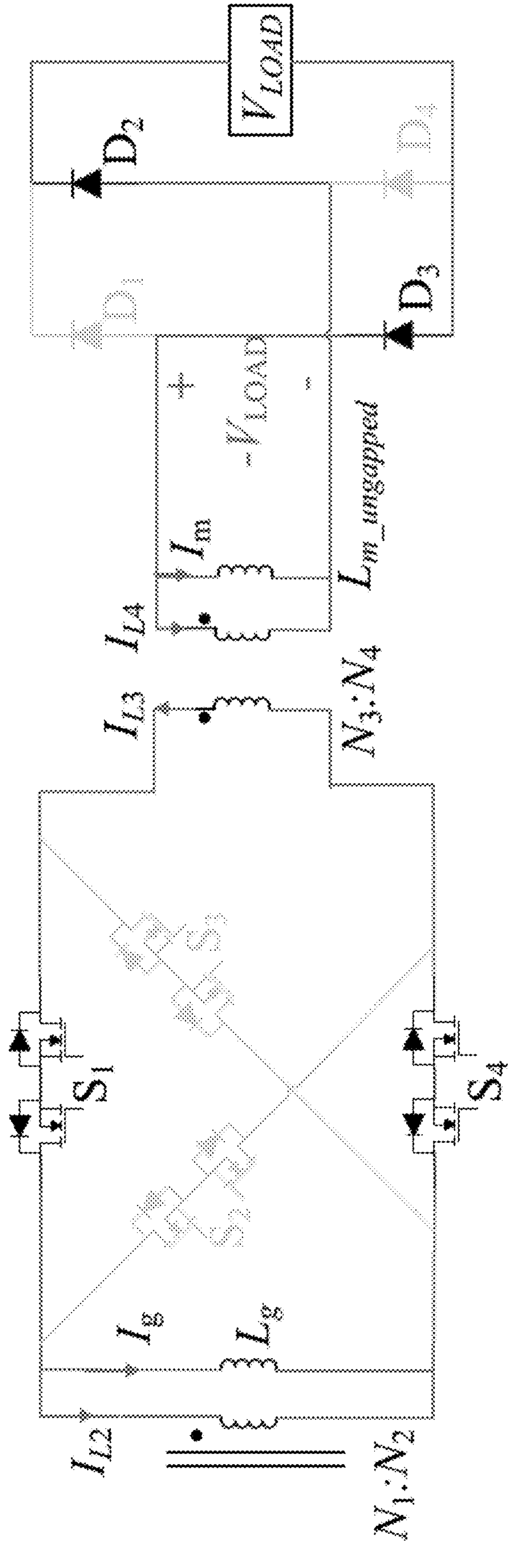
Figure 5D:
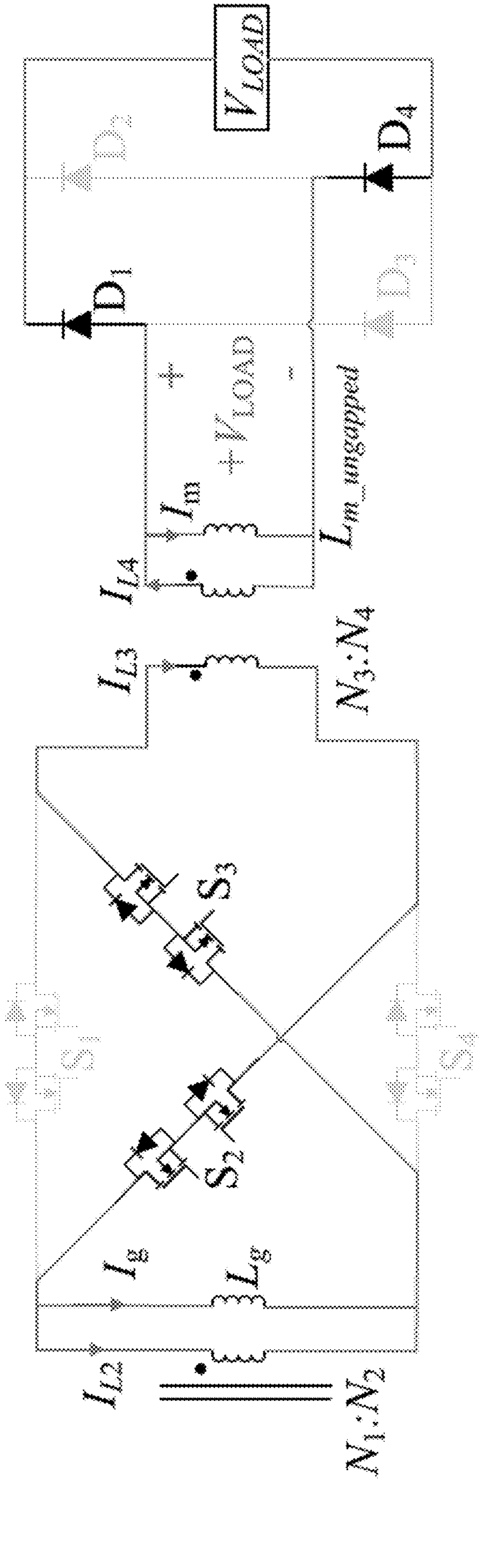
Figure 6:
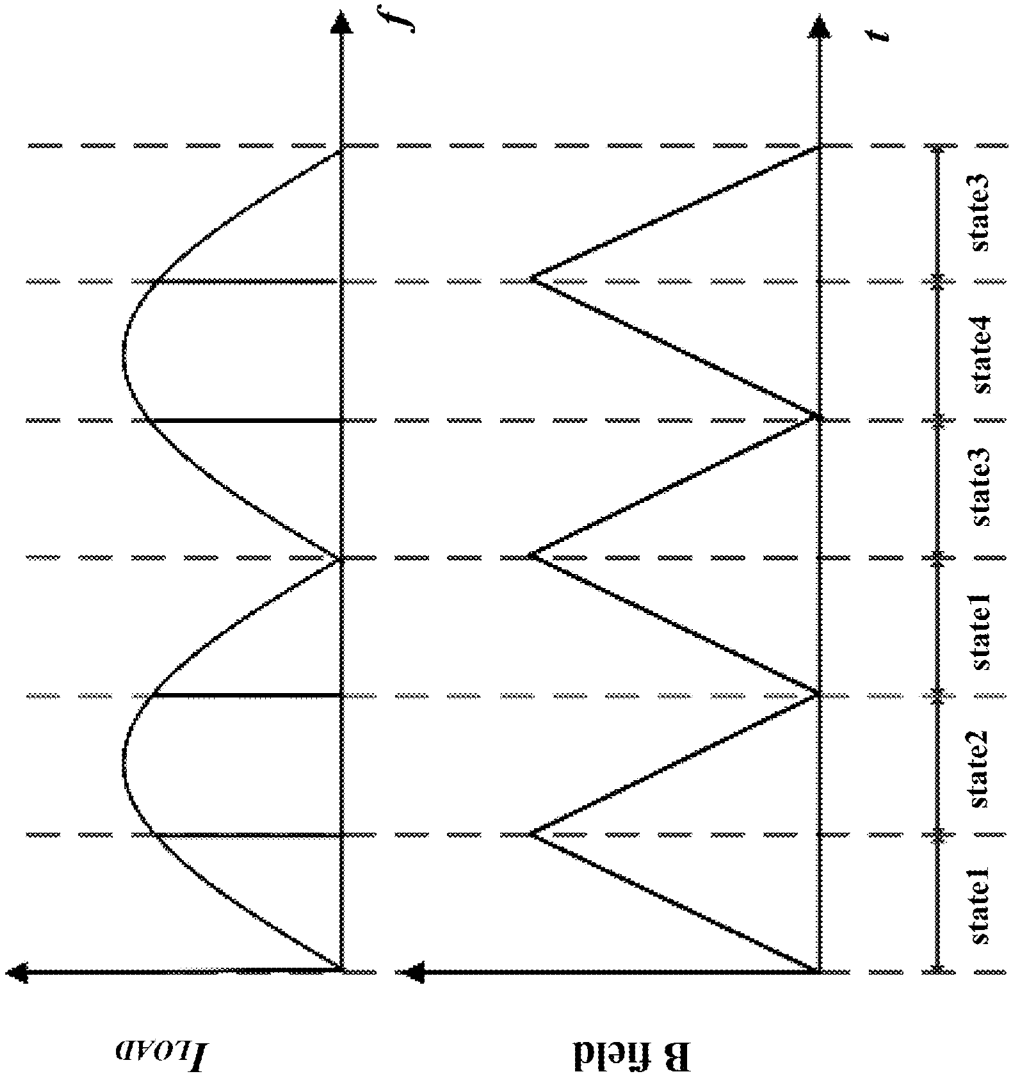
FIG. 6 shows a plot of $I_{load}$ versus time (top portion) and B field versus time (bottom portion) for the system/method depicted in FIGS. 5A-5D. The labeled "state1", "state2", "state3", and "state4" sections on the plots refer to the states depicted in FIGS. 5A-5D, respectively.

Four different circuit states for the proposed desaturation strategy are illustrated in FIGS. 5A-5D, respectively. In FIG. 5A, the first circuit state is depicted where the current $I_{L2}$ turns positive (direct out the dot). Switches $S_1$ and $S_4$ are activated, while $S_2$ and $S_3$ are deactivated. This action results in the secondary current of the harvesting core, $I_{L4}$, flowing through diodes $D_1$ and $D_4$. Consequently, the load voltage appears across the harvesting core, making $V_{core}=+V_{LOAD}$. In the next circuit state, as illustrated in FIG. 5B, the current $I_{L2}$ is still positive. Different from state 1, switches $S_1$ and $S_4$ are deactivated and $S_2$ and $S_3$ are activated. This forces $I_{L4}$ to circulate though the load branch via diodes $D_2$ and $D_3$. The load voltage, then, appears upside down across the core (i.e., $V_{core}=-V_{LOAD}$). Note that states 1 and 2 continue to alternate until $I_P$ turns negative. FIG. 5C illustrates the third state, where $I_{L2}$ turns negative (direct into the dot). Switches $S_1$ and $S_4$ turn on while switches $S_2$ and $S_3$ turn off. This leads to $I_{L4}$ being directed toward the load via diodes $D_2$ and $D_3$. As a result, a negative load voltage is established across the harvesting core (i.e., $V_{core}=-V_{LOAD}$). The last state is depicted in FIG. 5D. While the current $I_{L2}$ remains the same direction as state 3, switches $S_1$ and $S_4$ are off and switches $S_2$ and $S_3$ are on. Consequently, the current $I_{L4}$ flows through diodes $D_1$ and $D_4$. This induces a positive load voltage across the harvesting core (i.e., $V_{core}=+V_{LOAD}$). By manipulating the activation and deactivation of these four bidirectional switches, the core voltage alternates between $+V_{LOAD}$ or $-V_{LOAD}$ even within the unit ac cycle (i.e., T/2). This ensures that the magnetic flux density in the magnetic core always stay beneath its maximum value and allows multiple EH windows within the unit AC cycle and continues the EH process. At the beginning, only switches $S_1$ and $S_4$ will be turned on to conduct the traditional EH process for a short while. The harvesting core's secondary voltage will be sensed and sent to a microcontroller so that the period duration and zero crossing point are calculated. Then, the MEH system will enter the gapless EH state, in which the four bidirectional switches will be turned on and off, as illustrated in FIGS. 5A-5D.

Figure 23A:
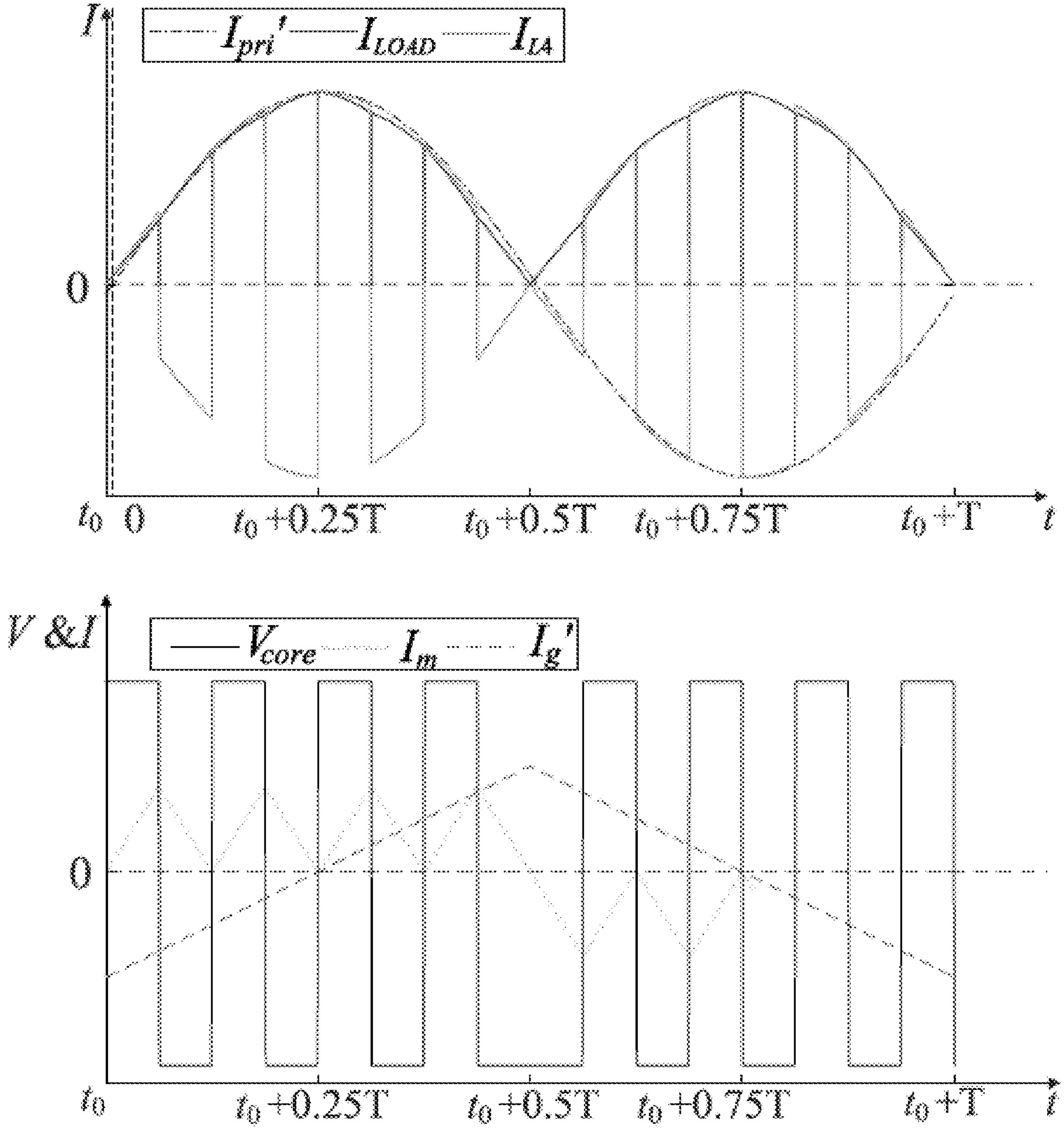
FIG. 23A shows current (top) and voltage (bottom) waveforms for the TVS method with $N_{win}$=8.
Figure 23B:
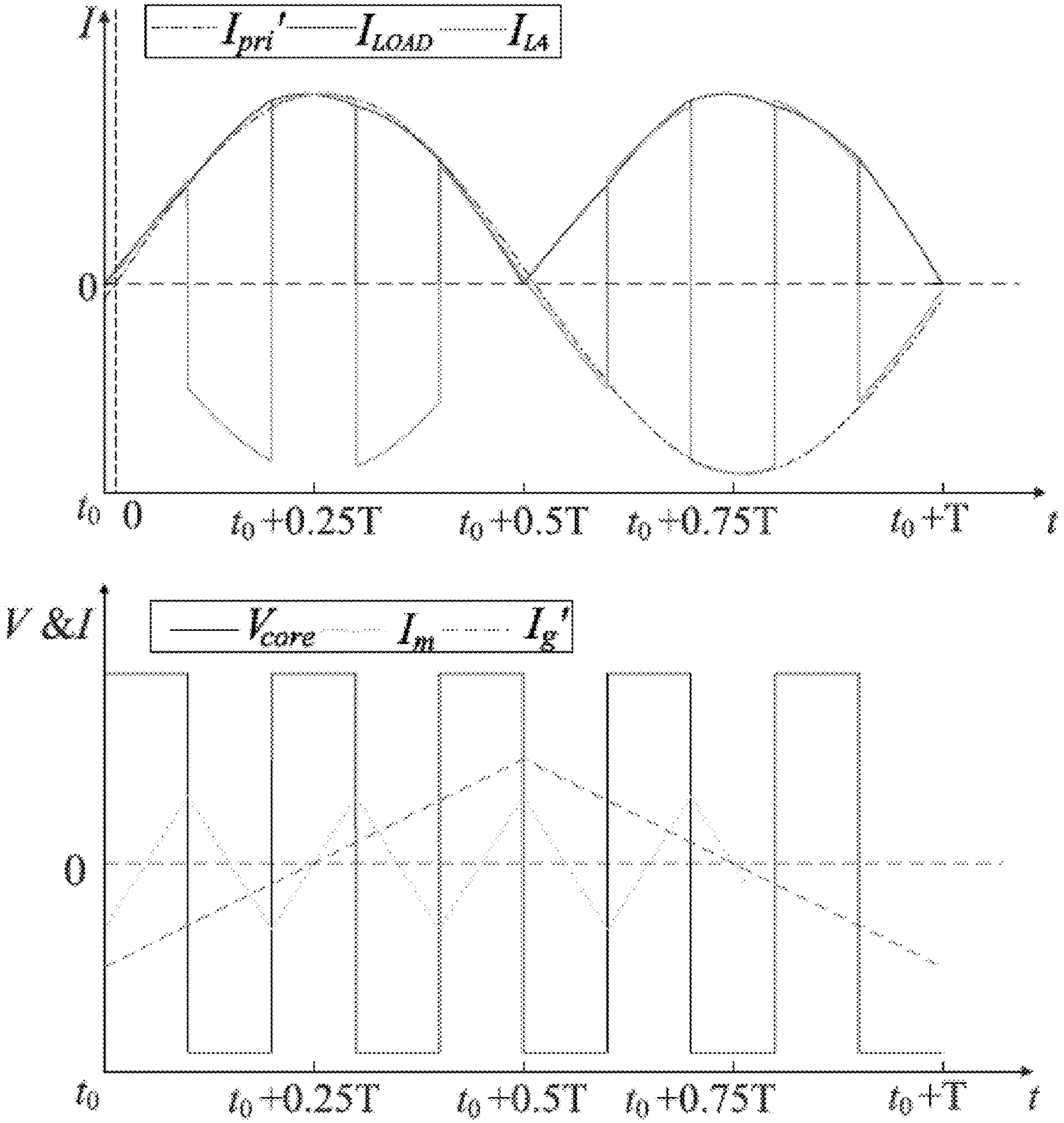
FIG. 23B shows current (top) and voltage (bottom) waveforms for the TVS method with $N_{win}$=5.

FIGS. 23A and 23B illustrate the waveforms of four currents and one voltage under two different counts of EH windows: load current, $I_{load}$; the current through the air gap inductance, $I_g'$; magnetizing current flowing through $L_{m\_ungapped}$, labeled as $I_m$; the primary current, $I_{pri}'$; the secondary current, $I_{L4}$; and the secondary voltage of the harvesting core, $V_{core}$. The prime notation (i.e., $I_g'$ and $I_{pri}'$)

indicates that they are referred to the load side. For the even count of EH windows in every half period (e.g., eight windows in FIG. 23A), the magnetizing current is always positive in positive half cycles, keeping the secondary current of the clampable core always out the dot. The magnetizing current is always negative in negative half cycles, keeping the secondary current of the clampable core always into the dot. For the odd count of EH windows in every half period, such as five windows in FIG. 23B, the core voltage waveform is different from that of an even count case. This difference in magnetizing current under even and odd counts of EH windows is because the inductance neither absorbs nor produces energy, and its current waveform should be symmetric when the circuit operates in its steady state.

In the following analysis, $V_{LOAD}$ represents the load voltage, $T_{EH}$ is the duration of one EH window, and $N_{win}$ denotes the window counts in every half AC line cycle, represented by $T_{half}$. The lengths of $N_{win}$ EH windows must sum up to $T_{half}$.

Because the air gap current, $I_g(t)$, must be half-wave symmetric in AC steady state, its DC offset should be zero. In positive half cycles, for example, $t \in [0, T_{half}]$, the air gap current, $I_g(t)$, can be expressed as the following equation based on flux balance principle and load voltage reflected through a transformer with turns ratio $N_3$:$N_4$:

$$I_g(t) = -\frac{V_{LOAD} N_3 T_{half}}{2N_4 L_g} + \frac{V_{LOAD} N_3}{L_g N_4} t. \tag{36}$$

In negative half cycles, for example, $t \in [T_{half}, 2T_{half}]$, the air gap current is $$I_g(t) = \frac{V_{LOAD} N_3 T_{half}}{2N_4 L_a} - \frac{V_{LOAD} N_3}{L_a N_4}(t - T_{half}). \tag{37}$$

In the first EH window, for example, $t \in [0, T_{EH}]$, the magnetizing current, $I_m(t)$, is $$I_m(t) = -\frac{V_{LOAD} T_{EH}}{2L_{m\_ungapped}} \cdot \mathrm{mod}(N_{win}, 2) + \frac{V_{LOAD}}{L_{m\_ungapped}} t \tag{38}$$

where mod ($N_{win}$, 2) is defined as below $$\mathrm{mod}(N_{win}, 2) = \begin{cases} 1 & (N_{win} = 2n + 1) \\ 0 & (N_{win} = 2n) \end{cases}. \tag{39}$$

In the next EH window, for example, $t \in [T_{EH}, 2\,T_{EH}]$, the magnetizing current is $$I_m(t) = \frac{V_{LOAD} T_{EH}}{2L_{m\_ungapped}} \cdot \mathrm{mod}(N_{win}, 2) - \frac{V_{LOAD}}{L_{m\_ungapped}}(t - T_{EH}). \tag{40}$$

In accordance with KCL, $$I'_{pri} = (I_m + I_{load}) + I'_g. \tag{41}$$

Here the magnetizing current flowing through $L_{m\_clamp}$ is ignored because of $L_{m\_clamp} >> L_g$. A time delay emerges between the zero-crossing points of the primary and load currents due to the existence of air gap inductance and magnetizing inductance. This time delay, denoted as to, can be determined by $$\frac{I_P N_1}{N_2} \sin(\omega t_0) = \frac{I_m(t_0)\frac{N_4}{N_3} + I_g(t_0)}{2}. \tag{42}$$

By substituting Equations (36) and (38) into Equation (42), the value of $t_0$ can be derived as follows $$t_0 = -\frac{a\sin\left(\mathrm{mod}\ (N_{win,2}) \cdot \frac{N_2 N_4 V_{LOAD} T_{EH}}{N_1 N_3 2 L_{m\_ungapped} I_P} + \frac{N_2 N_3 V_{LOAD} T_{half}}{2 N_1 N_4 L_g I_P}\right)}{\omega}. \tag{43}$$

The harvested power, $P_{OUT}$, or equivalently average load power, can be expressed as $$P_{OUT} = \frac{1}{T_{half}} \cdot \int_{t_0}^{t_0 + T_{half}} \frac{V_{LOAD} I_P N_1 N_3}{N_2 N_4} \sin(\omega t)\, dt = \frac{2 V_{LOAD} I_P N_1 N_3}{\pi N_2 N_4} \cos(\omega t_0). \tag{44}$$

The equation above highlights that the primary current, the load voltage, and the core characteristics play critical roles in determining the harvested power. By merging Equations (43) with Equation (44), a concise representation of the harvested power is derived as $$P_{OUT} = \frac{2 V_{LOAD} I_P N_1 N_3}{\pi N_2 N_4} \sqrt{1 - \left(\frac{N_2 V_{LOAD}}{4 f_{pri} I_P N_1}\left(\frac{\mathrm{mod}(N_{win}, 2)}{N_{win}} \cdot \frac{N_4}{N_3 L_{m\_ungapped}} + \frac{N_3}{N_4 L_g}\right)\right)^2}. \tag{45}$$

$$\frac{\partial P_{OUT}}{\partial V_{LOAD}} = \frac{2 I_P N_1 N_3}{\pi N_2 N_4} \left( \frac{1 - 2\left[\frac{N_2}{4 f_{pri} I_P N_1}\left(\frac{\mathrm{mod}(N_{win}, 2)}{N_{win}} \cdot \frac{N_4}{N_3 L_{m\_ungapped}} + \frac{N_3}{N_4 L_g}\right)\right]^2 V_{LOAD}^2}{\sqrt{1 - \left(\frac{N_2 V_{LOAD}}{4 f_{pri} I_P N_1}\left(\frac{\mathrm{mod}(N_{win}, 2)}{N_{win}} \cdot \frac{N_4}{N_3 L_{m\_ungapped}} + \frac{N_3}{N_4 L_g}\right)\right)^2}} \right). \tag{46}$$

As illustrated in Equation (45), an increase in the load voltage amplifies the term outside the square root while it reduces the square root itself. These contrasting behaviors create a maxima in $P_{OUT}$. This tendency can also be explained from the circuit perspective. For smaller load voltages, the currents passing through both the air gap inductance and the magnetizing inductance are negligible. Consequently, the load current closely mirrors the product of the primary current and winding ratios, rendering Pout strongly linear with $V_{LOAD}$. Conversely, with a relatively high load voltage, the extended time delay between the load current and the primary current cannot be ignored. This time delay, resulting from nonnegligible air gap and magnetizing currents lead to a lower average load current at a higher load voltage. These two dynamics—rising load voltage versus diminishing load current—compete in power calculations, and there is an optimal load voltage for maximum power output. The maxima of Equation (45) can be obtained by setting the derivative in Equation (46) to zero with respect to $V_{LOAD}$. When solved, $\partial P_{OUT}/\partial V_{LOAD}=0$ provides $$V_{LOAD,opt} = \frac{1}{\frac{\sqrt{2}N_2}{4f_{pri}I_PN_1}\left(\frac{\text{mod}(N_{win},2)}{N_{win}}\cdot\frac{N_4}{N_3L_{m\_ungapped}}+\frac{N_3}{N_4L_g}\right)}. \quad (47)$$

At this optimal point, $$P_{OUT,max} = \frac{\sqrt{2}V_{LOAD,opt}I_PN_1N_3}{\pi N_2N_4} = \frac{4f_{pri}I_P^2N_1^2}{\pi N_2^2\left(\frac{\text{mod}(N_{win},2)}{N_{win}}\cdot\frac{N_4^2}{N_3^2L_{m\_ungapped}}+\frac{1}{L_g}\right)}. \quad (48)$$

The peak harvested power is influenced by parameters such as the primary current, the number of EH windows, and other circuit parameters. The linear dependence on the primary frequency and the size of the core (i.e., embedded in $L_{m\_ungapped}$) is known in existing methods. However, the quadratic dependence on the primary current is completely groundbreaking and is the innovative point of the methods of embodiments of the subject invention, as shown in Equation (48). Existing methods only show a linear dependence on the primary current. Even with winding loss and core loss in the MEH system, the scaling still remains nearly quadratic in embodiments of the subject invention. The influence of these key parameters on the harvested power level were analyzed (see Example 3).

When the primary current is known, the load voltage can be selected based on Equation (47) for maximal EH. However, when the primary current is difficult to measure in practical scenarios, the optimal $V_{LOAD}$ can be determined by continuously adjusting it until the maximum power is achieved, without the need for sensing the primary current. This approach is similar to the TWA method or the maximum power point tracking (MPPT) used in photovoltaic (PV) systems. In this method, the load voltage is slightly varied, and the change in average power output is observed over a period (i.e., essentially the rate of the voltage increase itself over a unit time). If the power increases, the $V_{LOAD}$ adjustment continues in the same direction; if the power decreases, the direction of $V_{LOAD}$ adjustment is reversed. Ultimately, this process allows the system to track the optimal load voltage, ensuring operation near the maximum power point.

The net harvested energy, or equivalently net average load power, $P_{harvest}$, can be represented as $$P_{harvest} = P_{OUT} - P_{loss} \quad (49)$$

where $P_{loss}$ is a lumped power loss. The main losses in the MEH system with the desaturation methods of some embodiments of the subject invention are magnetic core and winding losses, determined through experiments. Other losses like control unit's power consumption and switching losses can be minimized by opting for low-power microcontrollers or piggybacking on the load's existing microcontrollers (e.g., sensor node's) and employing low-power gate drivers and low-impedance bidirectional switches. Because control power is essential for any advanced EH strategy but not unique to this method, it is not further discussed. The high-permeability core makes impedance matching unnecessary by offering significantly larger shunt impedance than a constant voltage load, ensuring most current flows into the load. Additionally, the desaturation scheme prevents magnetic saturation, maintaining the core's high permeability and negating the need for impedance matching.

Embodiments of the subject invention solve the problem of power transfer ceasing in MEH methods and systems once the core reaches full saturation. Embodiments enable higher energy extraction by providing mid-cycle desaturation in order to give multiple (e.g., at least 2) power transfer windows within one AC half-cycle. The desaturation of the magnetic core can be performed periodically, such as once each half-cycle or multiple times each half-cycle.

Related art methods do not use active desaturation. Instead, once a magnetic core reaches the full saturated state to obtain maximum power output, power transfer stops and a the core must desaturate over time (i.e., a user must wait for the core to desaturate over time). Embodiments of the subject invention achieve much higher energy extraction by using mid-cycle desaturation methods. This creates high power density compared to other ambient energy harvesting methods. This can mean, for example, ten times more power, or even one hundred times more power depending on the strength of the magnetic field. This can be sufficient for self-powering low-power devices, such as sensor nodes. It can "clamp on" to existing wires or systems and can be used on many sensor-based applications. For example, electromechanical systems can be monitored, so failure recognition can be predicted and/or there can be a reduction of repair time. Embodiments can also be used on AC transmission lines.

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

EXAMPLE 1

The parameters $\Delta B$, $N_{win}$, $V_{LOAD}$, and $V_{desat}$ can play critical roles in determining the harvested energy. However, among these four parameters, only three are independent. According to Equation (4), an obvious direct inverse relationship exists between $\Delta B$ and $N_{win}$. $N_{win}$ can be considered as a variable instead of $\Delta B$ in this example. More specifically, $N_{win}$, $V_{LOAD}$, and $T_{desat,LC}$ are freely controlled when exploring the parametric influence for the LC-resonance desaturation method. For the TVS desaturation method, $N_{win}$, $V_{LOAD}$, and $V_{TVS}$ are free variables in exploration. During these variable explorations, the value of ΔB is not set to one specific value; instead, it varies within a range spanning from zero to 2 $B_{SAT}$.

For a parametric exploration, a cascaded two-core structure was used (e.g., with VAC-W158 as the clampable core and VAC-W424 as the harvesting core). A primary current of 5 Amperes (A) at 50 Hertz (Hz) was considered for energy harvesting. The clampable core has 2-turn primary and 78-turn secondary windings and includes a 5-micrometer (μm) air gap. In contrast, the ungapped harvesting core features 50-turn primary and 108-turn secondary windings. Detailed specifications and inductance modeling of these cores can be found in Gao et al. (Mathematical modeling and validation of saturating and clampable cascaded magnetics for magnetic energy harvesting," IEEE Trans. Power Electron., vol. 38, no. 3, pp. 3455-3468 March 2023; which is hereby incorporated herein by reference in its entirety). In terms of Equation (23), the constants k, α, and β can be defined as $3.8\times10^{-6}$, 1.2, and 1.6, respectively (see also Yi et al., Analysis, modeling, and validation of cascaded magnetics for magnetic energy harvesting, in Proc. IEEE Energy Convers. Congr. Expo. (ECCE), pp. 1-7, October 2022; which is hereby incorporated herein by reference in its entirety). The maximum load voltage was explored from 30 Volts (V) to 90 V, with the number of energy harvesting windows (i.e., $N_{win}$) varying from 3 to 48. For the TVS desaturation technique, four distinct TVS voltage levels were chosen, whereas for the LC-resonance method, four different resonance periods were evaluated.

Figure 12A:
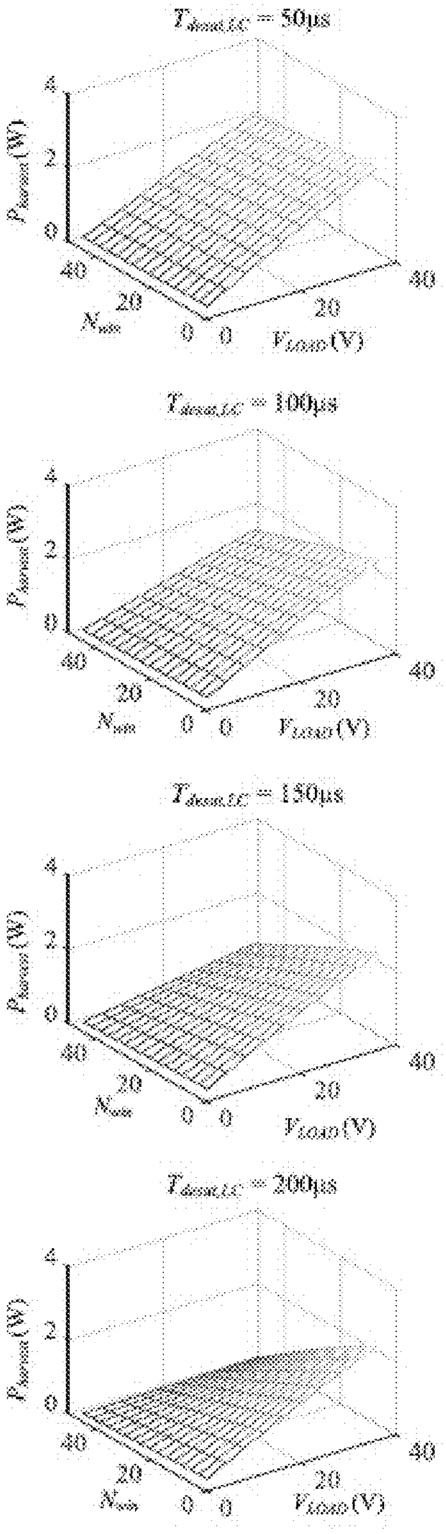
FIG. 12A shows four plots of power (in Watts (W)) versus number of energy harvesting windows ($N_{win}$) and load voltage ($V_{LOAD}$) for four different desaturation times ($T_{desat,LC}$) using the LC desaturation method. From top to bottom, the plots are for time of $T_{desat,LC}$=50 microseconds (μs), 100 μs, 150 μs, and 200 μs, respectively.
Figure 12B:
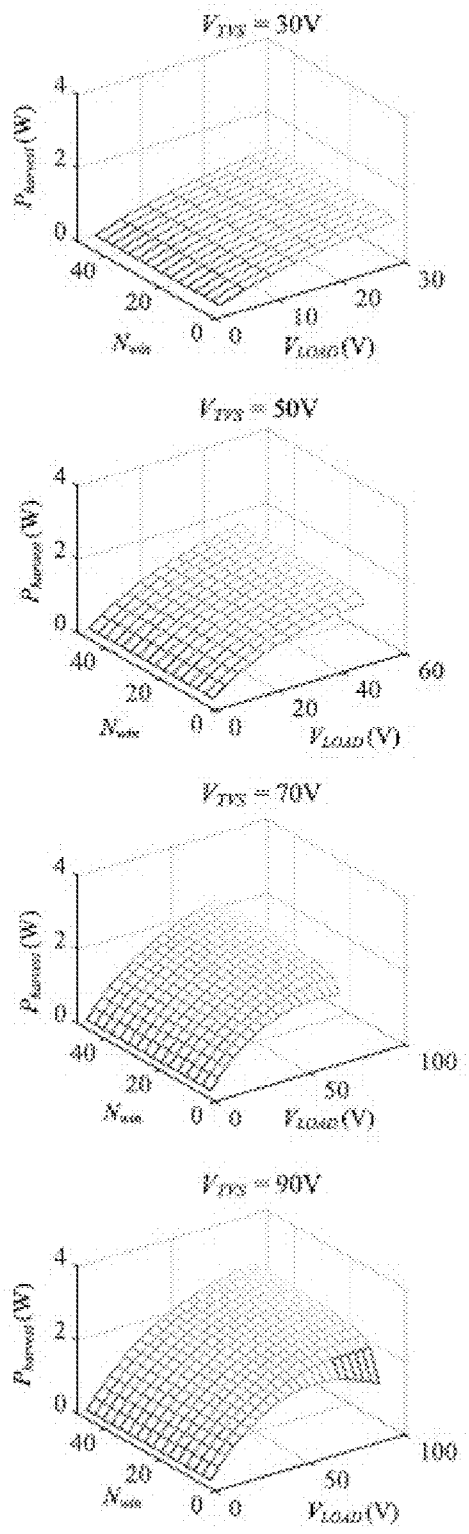
FIG. 12B shows four plots of power (in Watts (W)) versus $N_{win}$ and $V_{LOAD}$ (in V) for four different TVS voltages ($V_{TVS}$) using the TVS desaturation method. From top to bottom, the plots are for $V_{TVS}$=30 V, 50 V, 70 V, and 90 V, respectively.

FIGS. 12A and 12B show the correlation between harvested energy and the parameters $V_{LOAD}$, $N_{win}$, and either $T_{desat,LC}$ or $V_{TVS}$ as a control of $V_{desat}$. With the LC-resonance method in FIG. 12A, more energy can be harvested with an increase in $V_{LOAD}$ in general because the load current waveform will be roughly the same under the desaturation scheme. However, an increase in $N_{win}$ decreases the harvested energy because a higher $N_{win}$ necessitates more frequent LC rings that have a fixed duration. This increased overhead in time in each primary cycle effectively degrades the harvested energy. With the TVS desaturation technique in FIG. 12B, more energy can be harvested in general with an increase in either $N_{win}$ or $V_{LOAD}$. However, it is noteworthy that the rate of this increment quickly diminishes for $V_{LOAD}$ and even more quickly for $N_{win}$. The diminishing rate for $N_{win}$ is attributed to the average load current. It can be observed from Equation (22) that for sufficiently large values of $N_{win}$, the decrement in the load current during desaturation phases tends to be negligible. This leads to a nearly sinusoidal load current, whose value in turn is solely determined by the primary current and winding ratios, but not by $N_{win}$. Consequently, $N_{win}$ exhibits a minimal impact on the harvested energy. Conversely, for smaller $N_{win}$ values, the decrement in the load current during desaturation phases reduces with increasing $N_{win}$, suggesting that more $N_{win}$ can improve the harvested energy.

The diminishing rate for $V_{LOAD}$ is attributed to the increasing energy requirements for desaturation and decreasing energy harvesting duration. As $V_{LOAD}$ becomes higher in a parametric sweep, ΔB also increases, as shown in Equation (1), requiring more energy for desaturation. Besides, with a fixed desaturation voltage, $V_{TVS}$, $k_v$ decreases with increasing $V_{LOAD}$. This results in desaturation phases occupying a larger portion of $T_{half}$, lowering the average load current and slowing the boost in harvested power.

Note also that when the load voltage surpasses a specific threshold, the energy needed for desaturation may surpass the gain from the desaturation mechanism. In this case, the desaturation will actually degrade the total harvested energy. There is an additional constraint on the minimum $N_{win}$ because ΔB during each energy harvesting window cannot surpass the physical maximum of 2 $B_{SAT}$ $$V_{LOAD}T_{EH} = \frac{V_{LOAD}T_{half}}{N_{win} + (N_{win} - 1)\frac{V_{LOAD}}{V_{desat}}} \le 2\ B_{SAT}A_{CORE}\ N_4. \tag{50}$$

An example of mismatched selection of $V_{LOAD}$ and $N_{win}$ is illustrated in the lower right corner of FIG. 12B, marked in gray. When $N_{win}$ is minimal, long energy harvesting duration leads to core saturation under high $V_{LOAD}$ conditions. Consequently, this incongruent selection of $V_{LOAD}$ and $N_{win}$ results in a significant reduction in the harvested energy due to unintentionally long magnetic saturation before desaturation kicks in.

EXAMPLE 2

Figure 13:
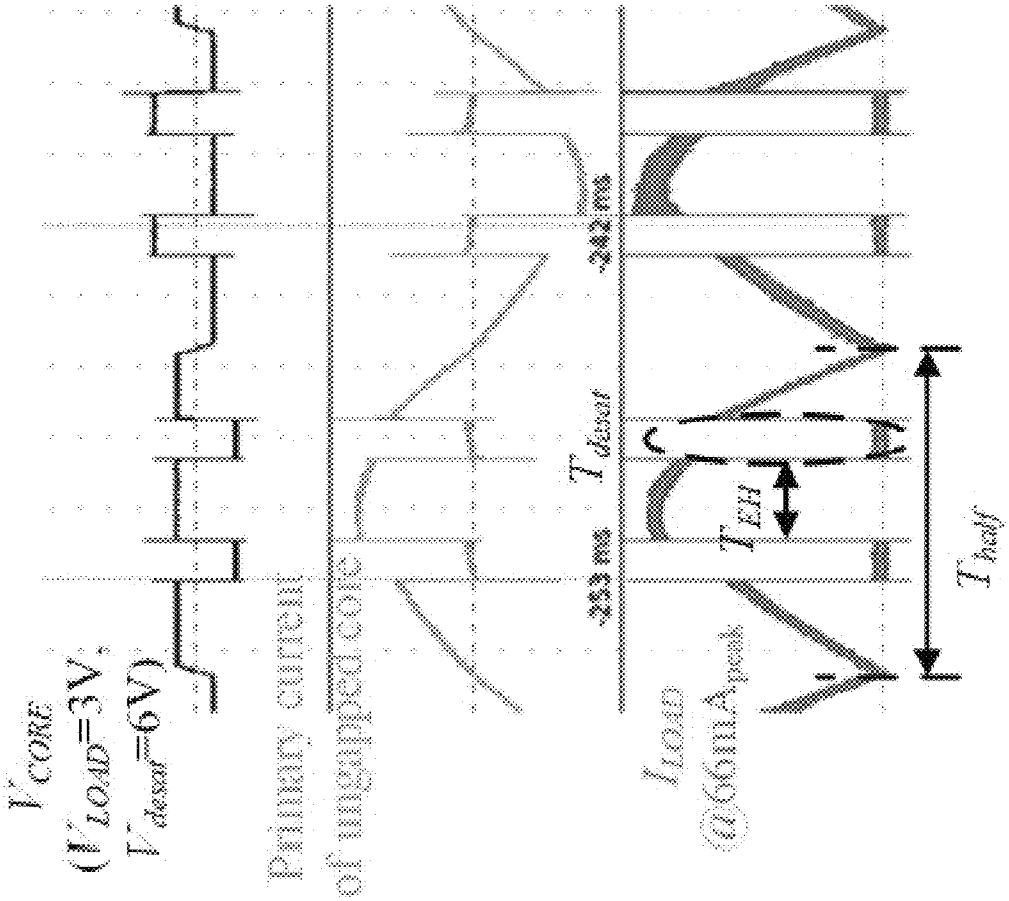
FIG. 13 shows an oscilloscope screen during an experiment.
Figure 14A:
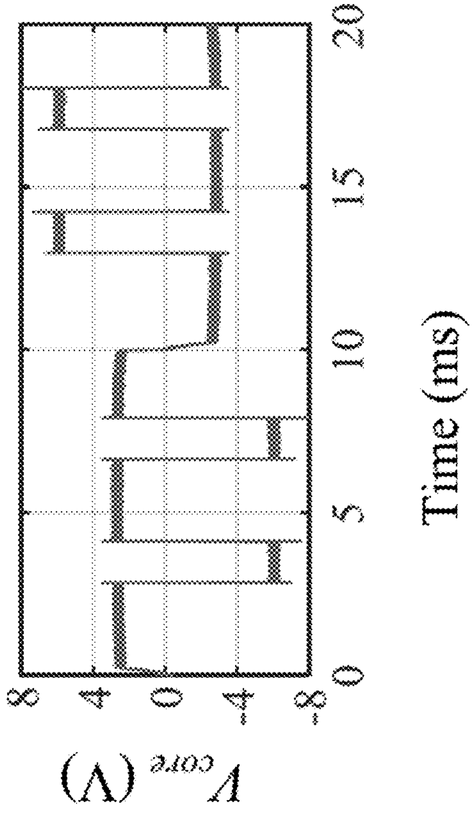
FIG. 14A shows a plot of Vcore (in V) versus time (in milliseconds (ms)), showing an experimental voltage waveform of a harvesting core with explicit reverse voltage, for $N_{win}$=3.
Figure 14B:
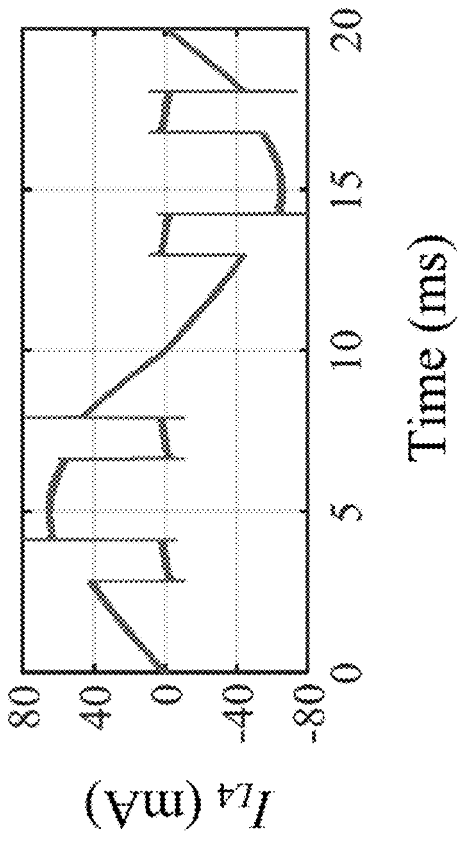
FIG. 14B shows a plot of current in an inductor ($I_{L4}$) (in milliamps (mA)) versus time (in ms), showing an experimental current waveform of a harvesting core with explicit reverse voltage, for $N_{win}$=3.
Figure 14C:
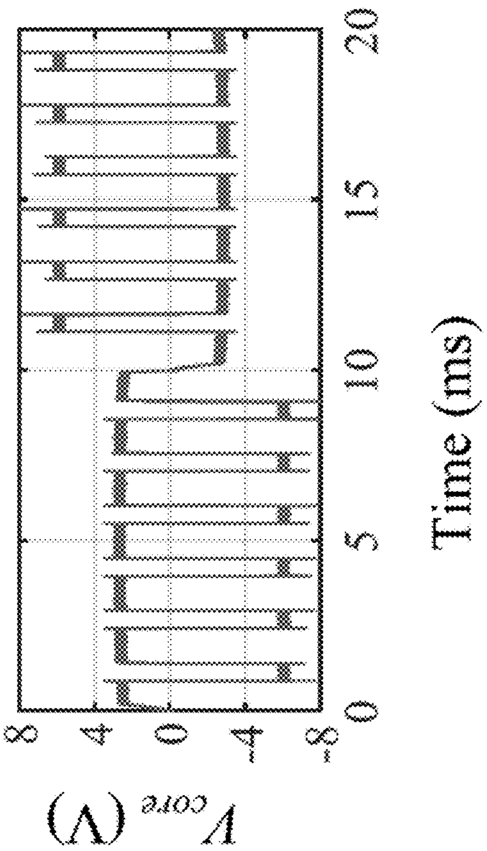
FIG. 14C shows a plot of Vcore (in V) versus time (in ms), showing an experimental voltage waveform of a harvesting core with explicit reverse voltage, for $N_{win}$=7.
Figure 14D:
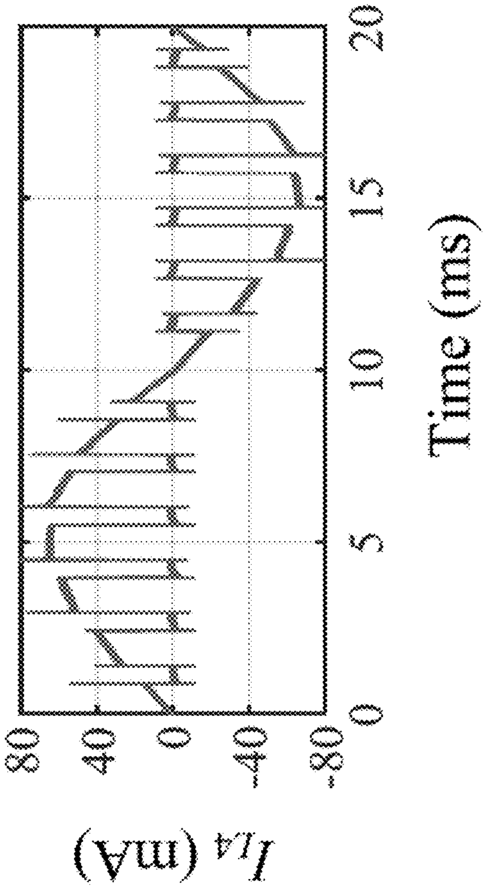
FIG. 14D shows a plot of $I_{L4}$ (in mA) versus time (in ms), showing an experimental current waveform of a harvesting core with explicit reverse voltage, for $N_{win}$=7.

In order to validate the effectiveness of the reverse flux desaturation techniques for MEH systems with cascaded cores, three of the methods (i.e., explicit reverse voltage source, LC-resonance, and TVS) were simulated, physically constructed, and experimented upon. A zoom-in view of the oscilloscope screen from the experimental setup is shown in FIG. 13. Throughout all the experiments, a properly regulated direct current (DC) voltage supply (CPX400S) served as the constant voltage load. Furthermore, an additional DC voltage supply (HM305P) was used for the explicit reverse flux voltage source for the first experiment. The primary energy source was emulated with a programmable AC voltage source (BK9832) and power resistors with heatsinks. Arduino Uno Rev3 was used to generate gate signals for all the bidirectional switches based on CSD87503Q3E (TI) with a threshold voltage of 30 V. The datasets were captured with a Tektronix MSO64 oscilloscope, TPP1000 voltage probes, and TCP0030A current probes.

The clampable core was built with VAC-W158 with two 5-μm air gaps. The ungapped harvesting core was built with VAC-W424. Details about these cores are available in Gao et al. (supra.). The primary and secondary windings for the clampable core were 2 and 78 turns (denoted by $N_1$ and $N_2$), respectively. As the clampable core enables nonintrusive installation, two turns in the primary winding, instead of one, were chosen to emphasize the fact. The ungapped harvesting core had 50- and 108-turn windings (denoted as $N_3$ and $N_4$) on its primary and secondary sides, respectively. Circuit parameters used in the experiments are shown in the table in FIG. 30.

Desaturation Via Explicit Reverse Voltage Source

The explicit reverse voltage method is experimentally demonstrated in FIGS. 14A-14D with two $N_{win}$ values. The operational principles can be quickly identified. The number of energy harvesting windows (i.e., $N_{win}$) per $T_{half}$ is 3 for FIGS. 14A and 14B and 7 for FIGS. 14C and 14D. For FIGS. 14A-14D, 15A-15C, and 16A-16C, the peak amplitude of the primary source current, $I_P$, was set to 5.6 A (i.e., ≈4 A root mean squared (RMS)) at 50 Hz and the desaturation voltage was set to twice the load voltage (i.e., $k_v$=2). A $V_{LOAD}$ sweep from 1 V and 5 V was performed. In addition to the $V_{LOAD}$ sweep, an $N_{win}$ sweep from 3 to 10 was also performed. For the $N_{win}$ sweep, $I_P$ was kept at 5.6 A and 50 Hz and $V_{LOAD}$ at 3 V.

Figure 15A:
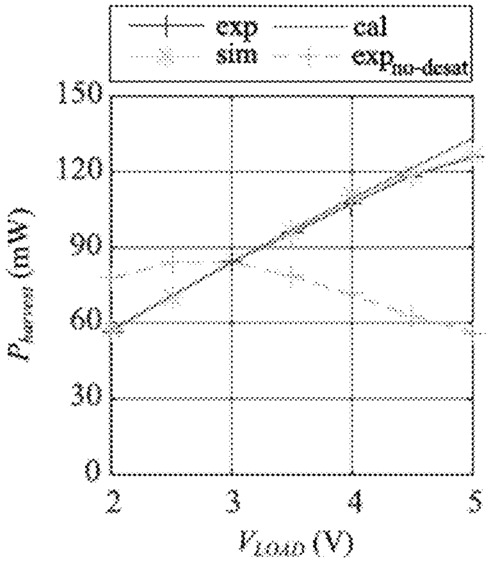
FIG. 15A shows a plot of harvested power ($P_{harvest}$) (in milliwatts (mW)) versus $V_{LOAD}$ (in V) for an experiment (explicit voltage method). The (blue) curve with the plus sign data points is for experimental values; the (green) curve with star data points is for simulated values; the (red) curve with no data points is for calculated values; and the (yellow) dotted curve with plus sign data points is for experimental values (with no desaturation).
Figure 15B:
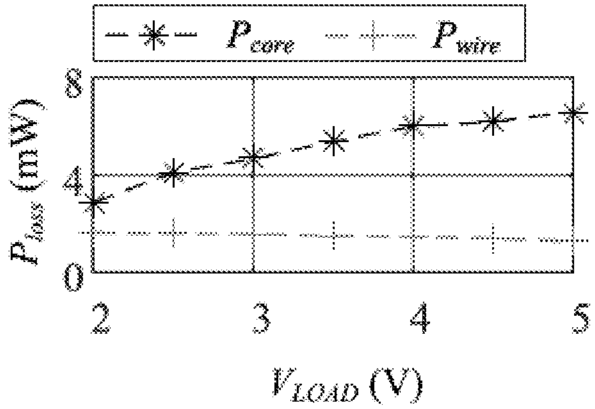
FIG. 15B shows a plot of power loss ($P_{loss}$) (in mW) versus $V_{LOAD}$ (in V) for an experiment (explicit voltage method). The (black) curve with star data points is for power in the core ($P_{core}$); and the (purple) curve with plus sign data points is for power in the wire ($P_{wire}$).
Figure 15C:
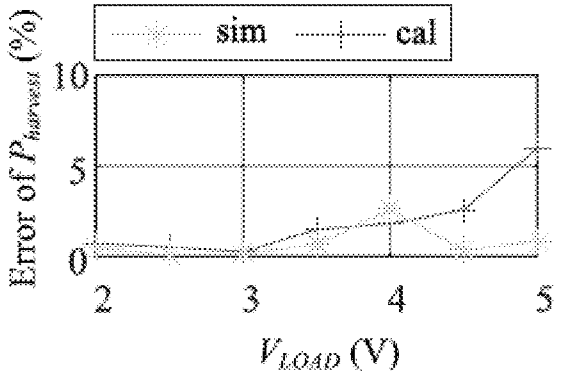
FIG. 15C shows a plot of prediction error of $P_{harvest}$ (in percentage (%)) versus $V_{LOAD}$ (in V) for an experiment (explicit voltage method). The (green) curve with star data points is for simulated values; and the (red) curve with plus sign data points is for calculated values.
Figure 16A:
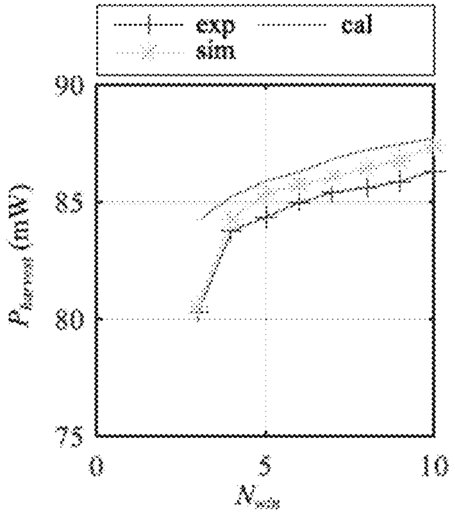
FIG. 16A shows a plot of $P_{harvest}$ (in mW) versus $N_{win}$ for an experiment (explicit voltage method). The (blue) curve with the plus sign data points is for experimental values; the (green) curve with star data points is for simulated values; and the (red) curve with no data points is for calculated values.
Figure 16B:
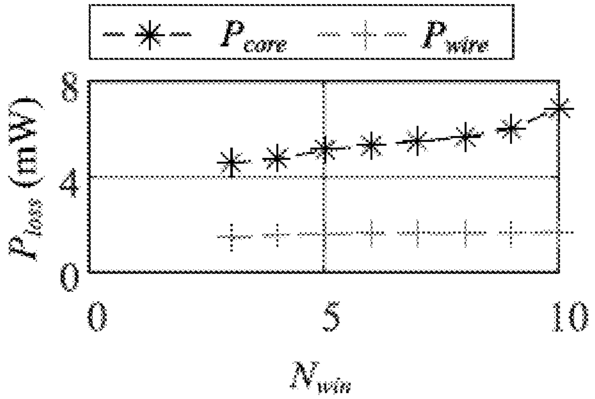
FIG. 16B shows a plot of $P_{loss}$ (in mW) versus $N_{win}$ for an experiment (explicit voltage method). The (black) curve with star data points is for power in the core ($P_{core}$); and the (purple) curve with plus sign data points is for power in the wire ($P_{wire}$).
Figure 16C:
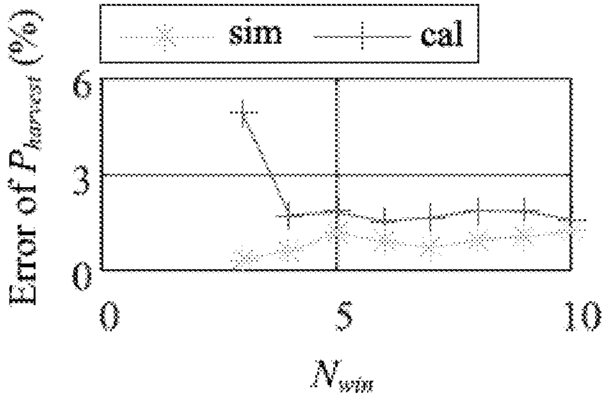
FIG. 16C shows a plot of prediction error of $P_{harvest}$ (in %) versus $N_{win}$ for an experiment (explicit voltage method). The (green) curve with star data points is for simulated values; and the (red) curve with plus sign data points is for calculated values.
Figure 17A:
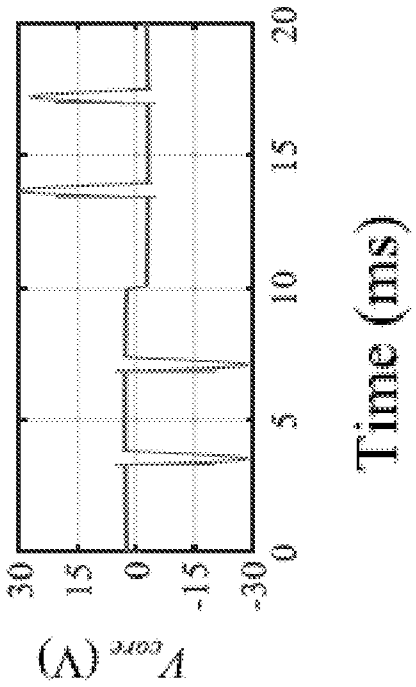
FIG. 17A shows a plot of Vcore (in V) versus time (in milliseconds (ms)), showing an experimental voltage waveform of a harvesting core with the LC resonance method, for $N_{win}$=3.
Figure 17B:
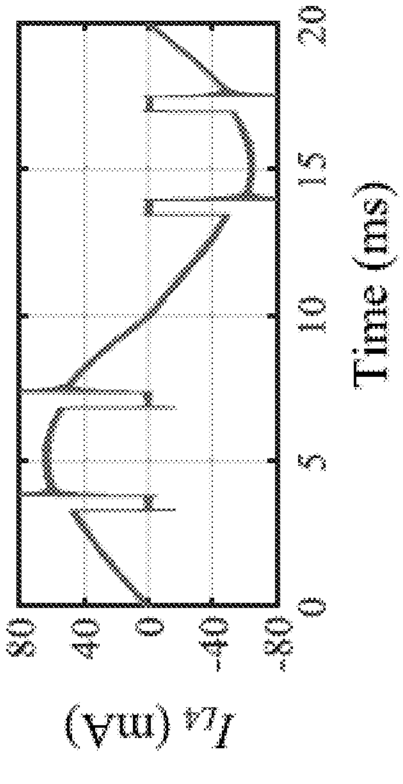
FIG. 17B shows a plot of current in an inductor ($I_{L4}$) (in mA) versus time (in ms), showing an experimental current waveform of a harvesting core with the LC resonance method, for $N_{win}$=3.
Figure 17C:
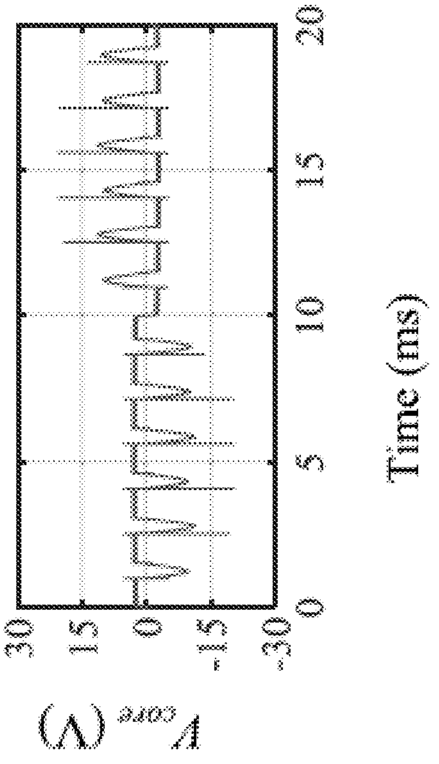
FIG. 17C shows a plot of Vcore (in V) versus time (in ms), showing an experimental voltage waveform of a harvesting core with the LC resonance method, for $N_{win}$=7.
Figure 17D:
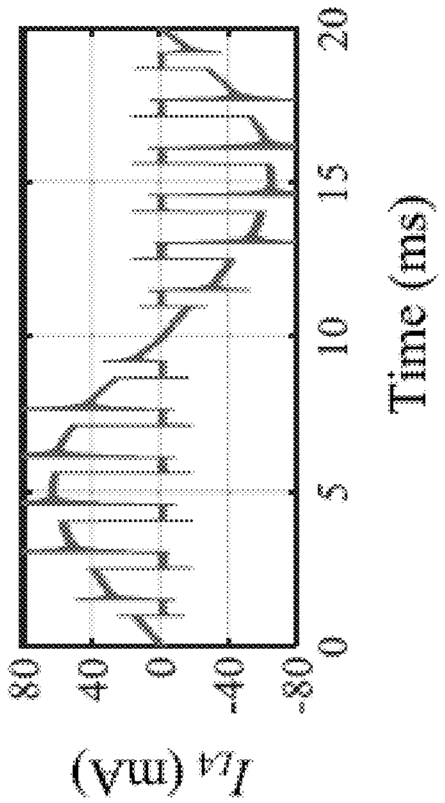
FIG. 17D shows a plot of $I_{L4}$ (in mA) versus time (in ms), showing an experimental current waveform of a harvesting core with the LC resonance method, for $N_{win}$=7.
Figure 18A:
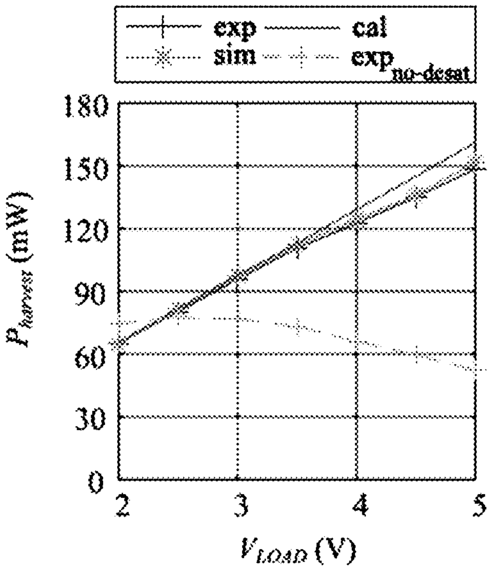
FIG. 18A shows a plot of $P_{harvest}$ (in mW) versus $V_{LOAD}$ (in V) for an experiment (LC resonance method). The (blue) curve with the plus sign data points is for experimental values; the (green) curve with star data points is for simulated values; the (red) curve with no data points is for calculated values; and the (yellow) dotted curve with plus sign data points is for experimental values (with no desaturation).
Figure 18B:
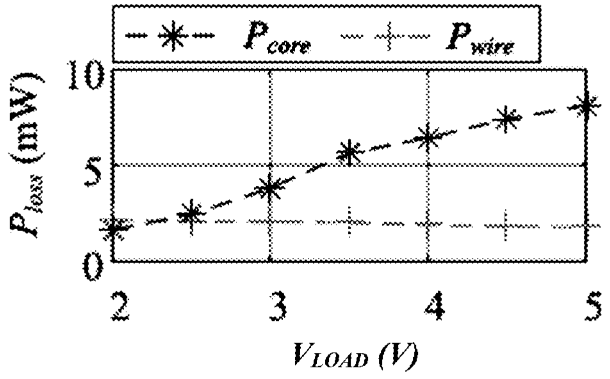
FIG. 18B shows a plot of $P_{loss}$ (in mW) versus $V_{LOAD}$ (in V) for an experiment (LC resonance method). The (black) curve with star data points is for power in the core ($P_{core}$); and the (purple) curve with plus sign data points is for power in the wire ($P_{wire}$).
Figure 18C:
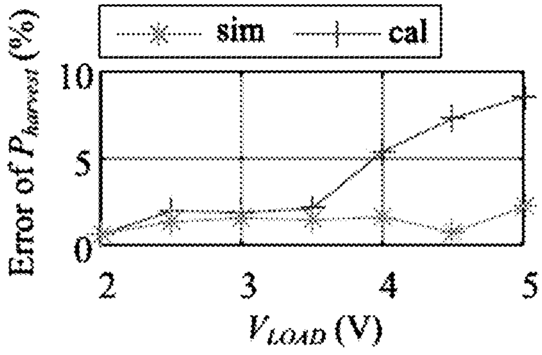
FIG. 18C shows a plot of prediction error of $P_{harvest}$ (in %) versus $V_{LOAD}$ (in V) for an experiment (LC resonance method). The (green) curve with star data points is for simulated values; and the (red) curve with plus sign data points is for calculated values.
Figure 19A:
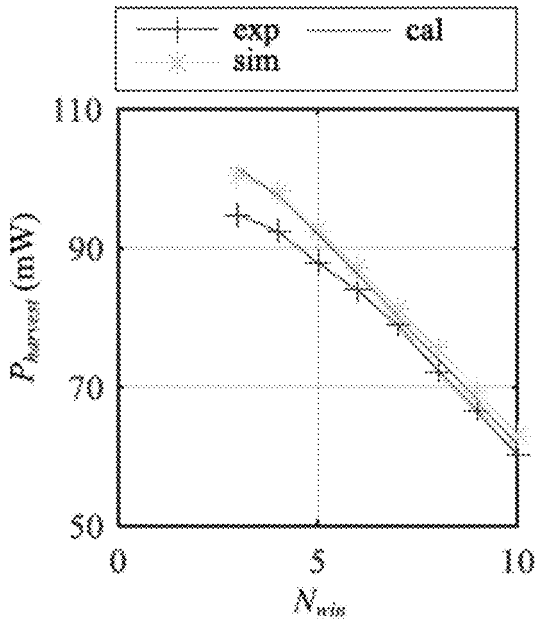
FIG. 19A shows a plot of $P_{harvest}$ (in mW) versus $N_{win}$ for an experiment (LC resonance method). The (blue) curve with the plus sign data points is for experimental values; the (green) curve with star data points is for simulated values; and the (red) curve with no data points is for calculated values.
Figure 19B:
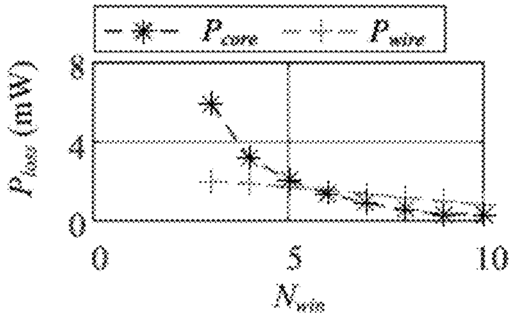
FIG. 19B shows a plot of $P_{loss}$ (in mW) versus $N_{win}$ for an experiment (LC resonance method). The (black) curve with star data points is for power in the core ($P_{core}$); and the (purple) curve with plus sign data points is for power in the wire ($P_{wire}$).
Figure 19C:
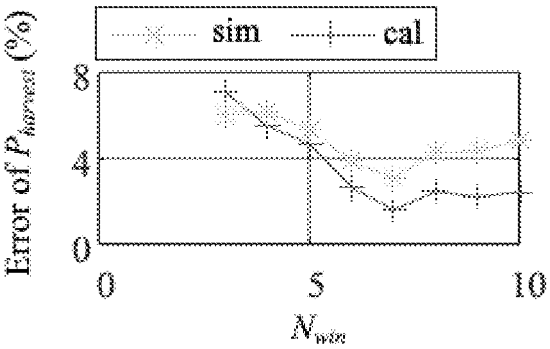
FIG. 19C shows a plot of prediction error of $P_{harvest}$ (in %) versus $N_{win}$ for an experiment (LC resonance method). The (green) curve with star data points is for simulated values; and the (red) curve with plus sign data points is for calculated values.

In FIGS. 15A-15C and 16A-16C, the performance of energy harvesting under these two sweeps is presented. In FIGS. 15A and 16A, the dashed line, denoted as $exp_{no-desat}$, illustrates outcomes without the desaturation method. In FIGS. 15B and 16B, the core loss, $P_{core}$, and winding loss, $P_{wire}$, are presented. In FIGS. 15C and 16C, the discrepancy in harvested energy between the calculated and experimental results and between the simulation and experimental results are shown.

In FIG. 15A, the desaturation scheme harvested less energy than the base case without desaturation when $V_{LOAD}$ was low (i.e., $V_{LOAD}$<3 V). This is an unlikely case in practice as it is attributed to $V_{LOAD}$ being unable to bring the core to the saturation boundary, which is needed for higher energy harvesting. Beyond this unfavorable use-case, $V_{LOAD}$ is directly associated with the harvested energy, consistent with Equation (20). Moreover, an optimized increment in the number of energy harvesting windows enhances the harvested energy due to a shortened desaturation period and an effectively higher load current. However, the growth rate diminishes as the energy required for desaturation also climbs with $N_{win}$. In FIGS. 15B and 16B, the core loss increases with $V_{LOAD}$ due to an increased change in the B-field. The core loss also scales with the number of energy harvesting windows as the hysteretic loop of the B-H curve is fully overcome $N_{win}$ times in each $T_{half}$. The maximum discrepancy between hand calculation and experimental and between the simulation and experimental results is below 8%.

Desaturation Via LC Resonance

The same circuit conditions and experiment setup were maintained. The capacitance used for desaturation was 7.2 nanoFarads (nF), and the span of the desaturation phase was fixed at 0.5 milliseconds (ms) (i.e., 5% of $T_{half}$).

In FIGS. 17A-17D, the experimental time-domain waveforms of the secondary current and voltage of the harvesting core under $I_P$=5.6 A are presented. FIGS. 18A-18C and 19A-19C illustrate the harvested energy from the experiment, simulation, and calculation.

Similar to the results from the explicit reverse voltage method, an increase in $V_{LOAD}$ directly improves the harvested energy. However, a higher $N_{win}$ reduces the harvested energy. This reduction occurs because a fixed desaturation window (i.e., LC ring time), combined with a higher $N_{win}$, lengthens the total desaturation time, lowering the average load current. Increasing $N_{win}$ decreases the core loss due to reduced ΔB in the magnetic core. The differences between the calculated and experimental results and the between simulation and experimental results are kept below 10%.

Desaturation Via TVS Diode

For the TVS method, identical circuit configurations and experimental setups were used to the previous two methods. The TVS diode voltage that provides constant reverse flux was 30 V. The voltage rating of the bidirectional switches was also matched at 30 V.

Figure 20A:
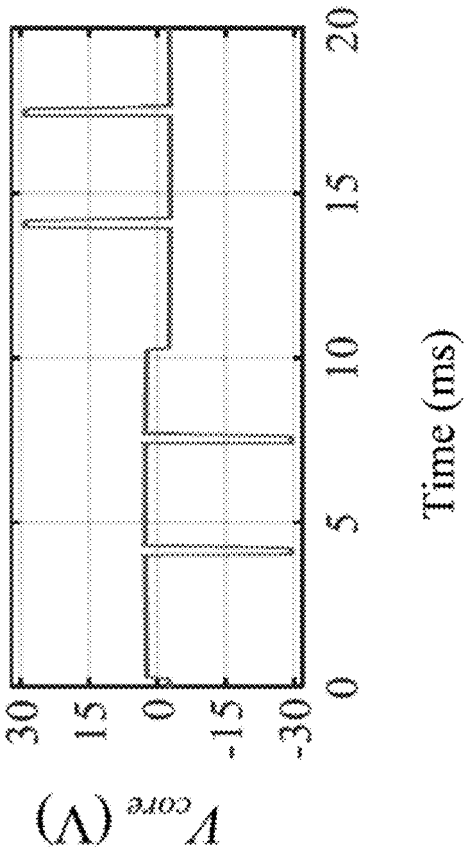
FIG. 20A shows a plot of Vcore (in V) versus time (in ms), showing an experimental voltage waveform of a harvesting core with the TVS method, for $N_{win}$=3.
Figure 20B:
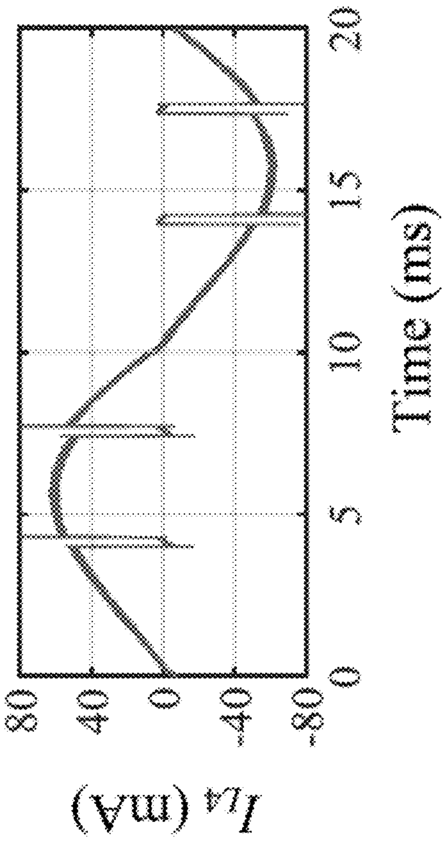
FIG. 20B shows a plot of current in an inductor ($I_{L4}$) (in mA) versus time (in ms), showing an experimental current waveform of a harvesting core with the TVS method, for $N_{win}$=3.
Figure 20C:
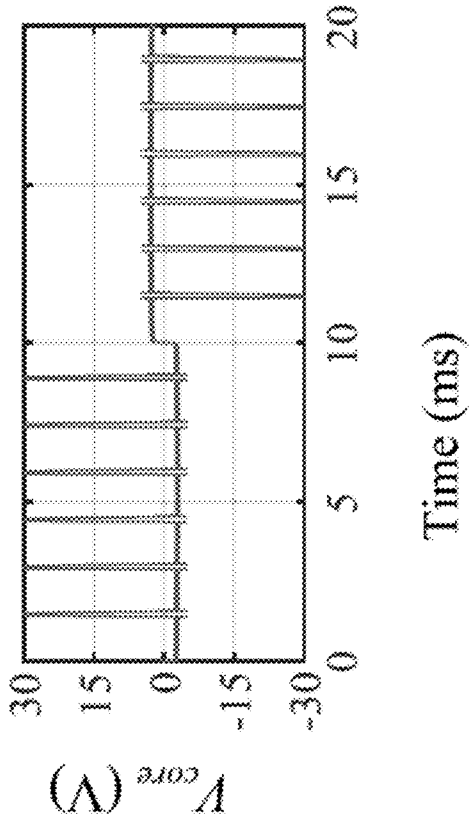
FIG. 20C shows a plot of Vcore (in V) versus time (in ms), showing an experimental voltage waveform of a harvesting core with the TVS method, for $N_{win}$=7.
Figure 20D:
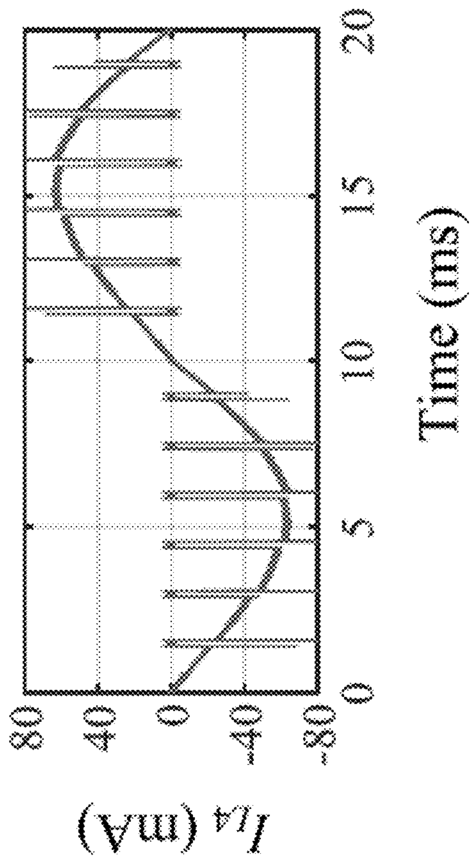
FIG. 20D shows a plot of $I_{L4}$ (in mA) versus time (in ms), showing an experimental current waveform of a harvesting core with the TVS method, for $N_{win}$=7.
Figure 21A:
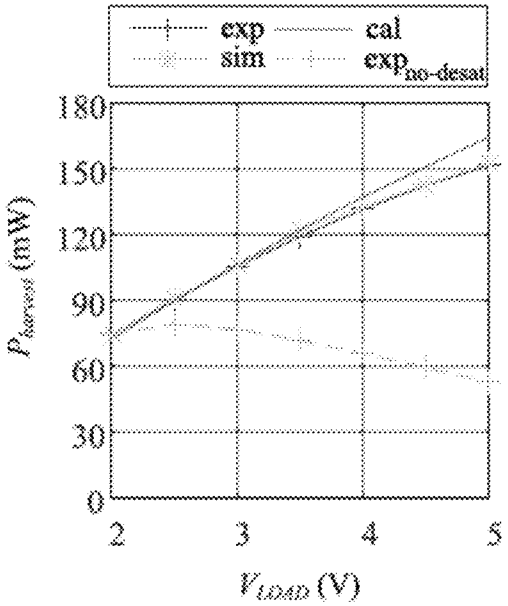
FIG. 21A shows a plot of $P_{harvest}$ (in mW) versus $V_{LOAD}$ (in V) for an experiment (TVS method). The (blue) curve with the plus sign data points is for experimental values; the (green) curve with star data points is for simulated values; the (red) curve with no data points is for calculated values; and the (yellow) dotted curve with plus sign data points is for experimental values (with no desaturation).
Figure 21B:
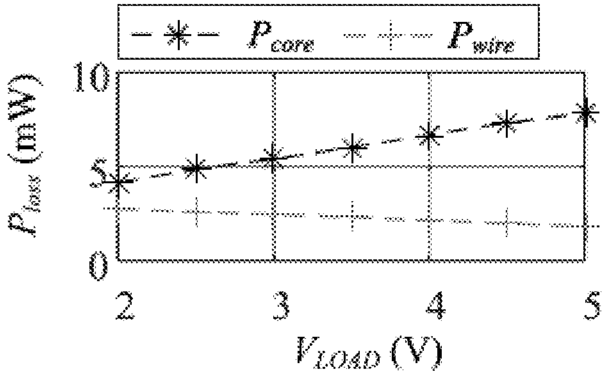
FIG. 21B shows a plot of $P_{loss}$ (in mW) versus $V_{LOAD}$ (in V) for an experiment (TVS method). The (black) curve with star data points is for power in the core ($P_{core}$); and the (purple) curve with plus sign data points is for power in the wire ($P_{wire}$).
Figure 21C:
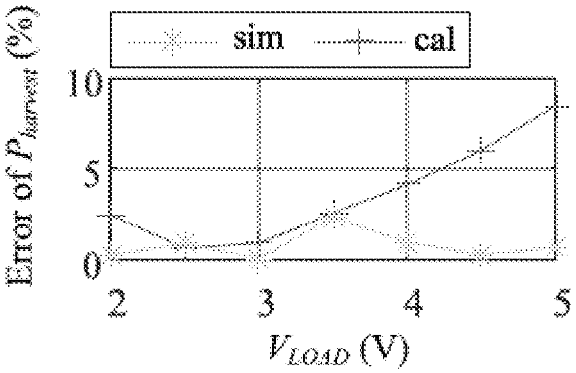
FIG. 21C shows a plot of prediction error of $P_{harvest}$ (in %) versus $V_{LOAD}$ (in V) for an experiment (TVS method). The (green) curve with star data points is for simulated values; and the (red) curve with plus sign data points is for calculated values.
Figure 22A:
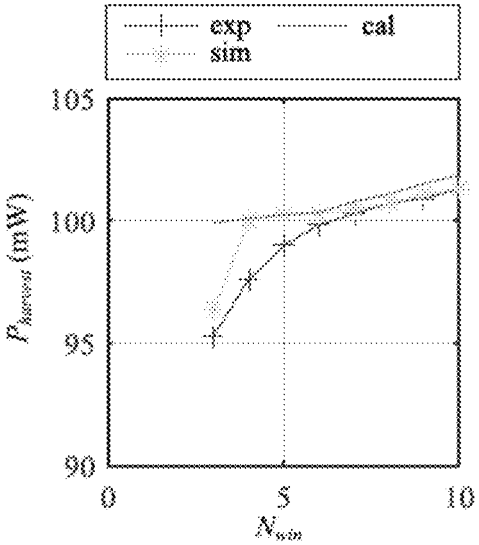
FIG. 22A shows a plot of $P_{harvest}$ (in mW) versus $N_{win}$ for an experiment (TVS method). The (blue) curve with the plus sign data points is for experimental values; the (green) curve with star data points is for simulated values; and the (red) curve with no data points is for calculated values.
Figure 22B:
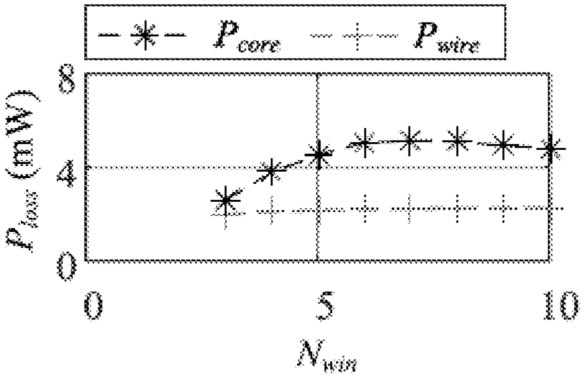
FIG. 22B shows a plot of $P_{loss}$ (in mW) versus $N_{win}$ for an experiment (TVS method). The (black) curve with star data points is for power in the core ($P_{core}$); and the (purple) curve with plus sign data points is for power in the wire ($P_{wire}$).
Figure 22C:
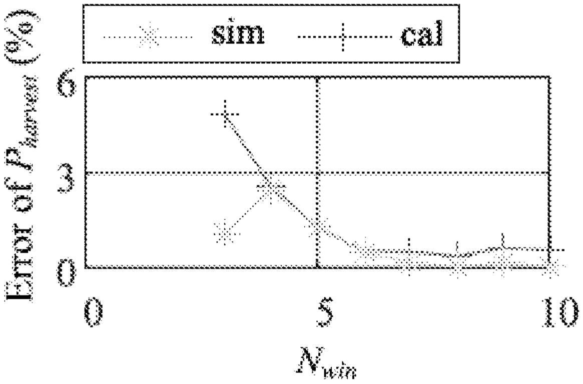
FIG. 22C shows a plot of prediction error of $P_{harvest}$ (in %) versus $N_{win}$ for an experiment (TVS method). The (green) curve with star data points is for simulated values; and the (red) curve with plus sign data points is for calculated values.

The experimental time-domain waveforms for current and voltage, observed from the secondary side of the harvesting core with $N_{win}$=3 and $N_{win}$=7, are shown in FIGS. 20A-20C.

FIGS. 21A-21C and 22A-22C present the harvested energy from experiment, simulation, and calculation. As observed with the explicit reverse voltage method, an increase in $V_{LOAD}$ significantly boosts the harvested energy. A higher $N_{win}$ also increases the harvested energy. The core loss is primarily governed by $V_{LOAD}$, which translates into the magnitude of ΔB, and the duration and count of energy harvesting windows. Initially, the core loss increases with a higher $N_{win}$ due to a higher effective frequency for the harvesting core. However, it later decreases as ΔB reduces, attributed to the reduced duration of each energy harvesting window. The differences between the calculated and experimental and between the simulation and experimental results are all under 10%.

From the experimental results, the concept of magnetic desaturation for energy harvesting has been successfully verified in the laboratory. Three methods were verified-explicit reverse voltage sources, LC resonance, and TVS diodes. The cascaded two-core structure, which incorporates a clampable core and an ungapped harvesting core, is essential to enable the proposed desaturation strategies. The main loss contributors in the proposed desaturation methods are the magnetic core loss and winding loss. Other losses, such as the power consumption of the control unit and switching losses, can be minimized by opting for low-power microcontrollers, gate drivers, and low-impedance bidirectional switches; they were not investigated in this experiment. In many cases, end-user applications with energy harvesting mechanisms serve as sensor nodes, cyber-physical systems (CPS), Internet of Things (IoT), etc. The existing microcontrollers for those applications can readily double as the gate signal generator for our proposed methods, similar to VAMPIRE (see also, Moon and Leeb, Wire less sensors for electromechanical systems diagnostics, IEEE Trans. Instrum. Meas., vol. 67, no. 9, pp. 2235-2246 September 2018; which is hereby incorporated by reference herein in its entirety). This essentially eliminates the major portion of the power overhead for controls.

The table in FIG. 31 shows a comparison of the harvested energy (i.e., equivalently average power) upon using three reverse-flux desaturation methods investigated in this experiment and using additional-control-coil desaturation methods. The table in FIG. 32 shows a comparison of the enhanced energy harvesting capability under different schemes, such as high-efficiency circuit, control diagram, and the reverse flux desaturation scheme based on passive components. The last row in it reflects the harvested power in other references scaled to the same conditions as in this experiment. The methods of embodiments of the subject invention significantly improve the harvested energy. The explicit reverse voltage method can increase harvested power by more than 50%, and the LC-resonance and TVS methods nearly double the harvested energy (i.e., 185% and 190%, respectively). Further, compared with the additional-control-coil desaturation method, both the LC-resonance and TVS methods feature enhanced energy harvesting capability and streamlined, simple circuit designs, and control schemes. This simplicity stems from their use of passive components to directly generate the reverse flux for desaturation.

In general, energy harvesting is improved by selecting higher load and desaturation voltages and increasing the LC resonance frequency. The LC-resonance approach benefits from a lower number of energy harvesting windows, ensuring longer intracycle energy harvesting intervals for a minimal time overhead in desaturation. In addition, it is crucial to find a balance between the capacitor's peak voltage for switch protection and the duration of desaturation for harvested energy improvement. With the TVS-diode method, optimal energy harvesting results from higher load and TVS voltages, which, however, should be limited below the switch's voltage rating. In contrast to the LC-resonance method, a higher number of energy harvesting windows directly improves the harvested energy with the TVS method.

EXAMPLE 3

In order to validate the desaturation technique from FIGS. 5A-5D, 23A, and 23B (and the accompanying descriptive text), LTspice simulations and experiments were conducted, employing the circuit diagram illustrated in FIGS. 5A-5D. VAC-W158 and VACW424 were used as clampable and harvesting cores, respectively. Detailed specifications and inductance modeling of these cores are available in Gao et al. (supra.). The simulation and experimental setup is summarized in the table shown in FIG. 33. Simulations and experiments were conducted under different primary current magnitudes, load voltages, and numbers of EH windows. A properly loaded DC voltage supply served as the constant voltage load.

Figure 24A:
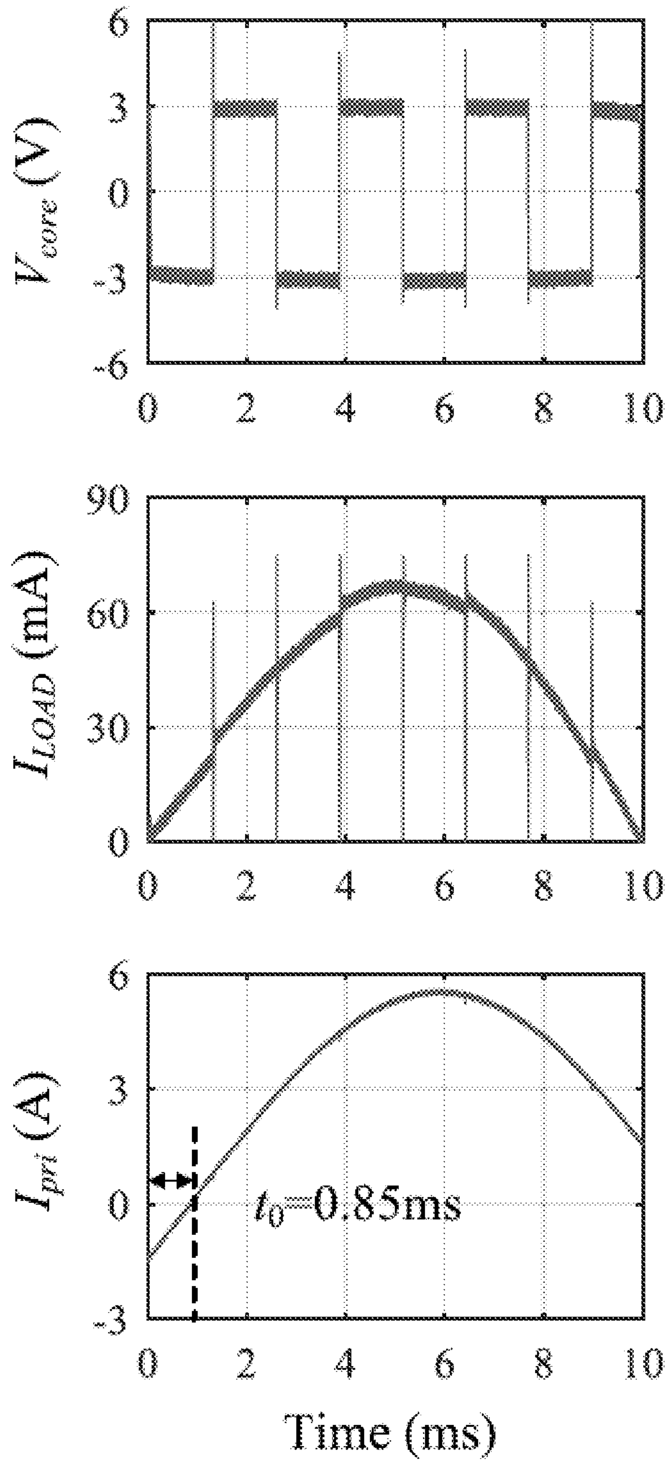
FIG. 24A shows waveforms of a harvesting core's secondary voltage (in V), load current (in mA), and primary current (in Amperes (A)), respectively from top to bottom, for an experiment (TVS method) with a load voltage ($V_{LOAD}$) of 3 V.
Figure 24B:
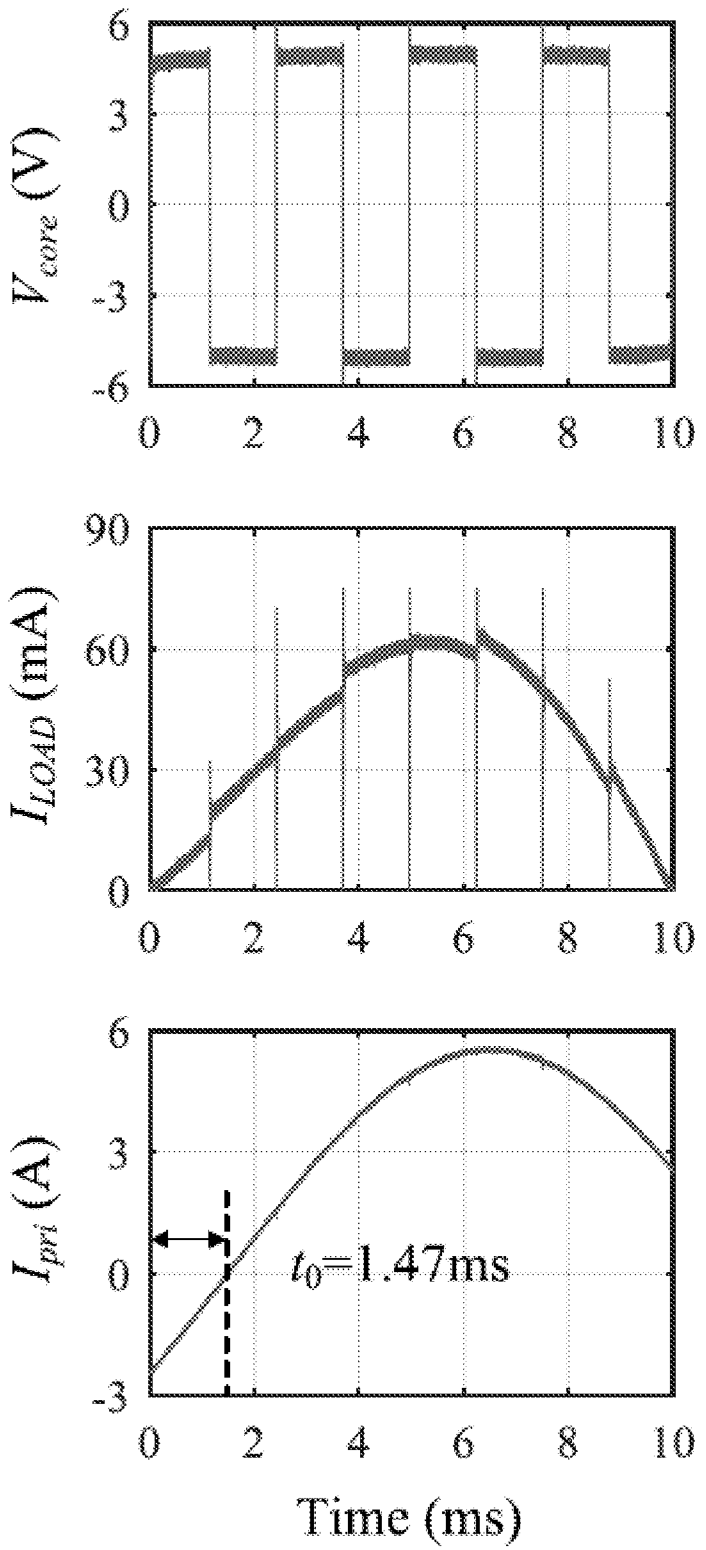
FIG. 24B shows waveforms of a harvesting core's secondary voltage (in V), load current (in mA), and primary current (in A), respectively from top to bottom, for an experiment (TVS method) with a load voltage ($V_{LOAD}$) of 6 V.
Figure 25A:
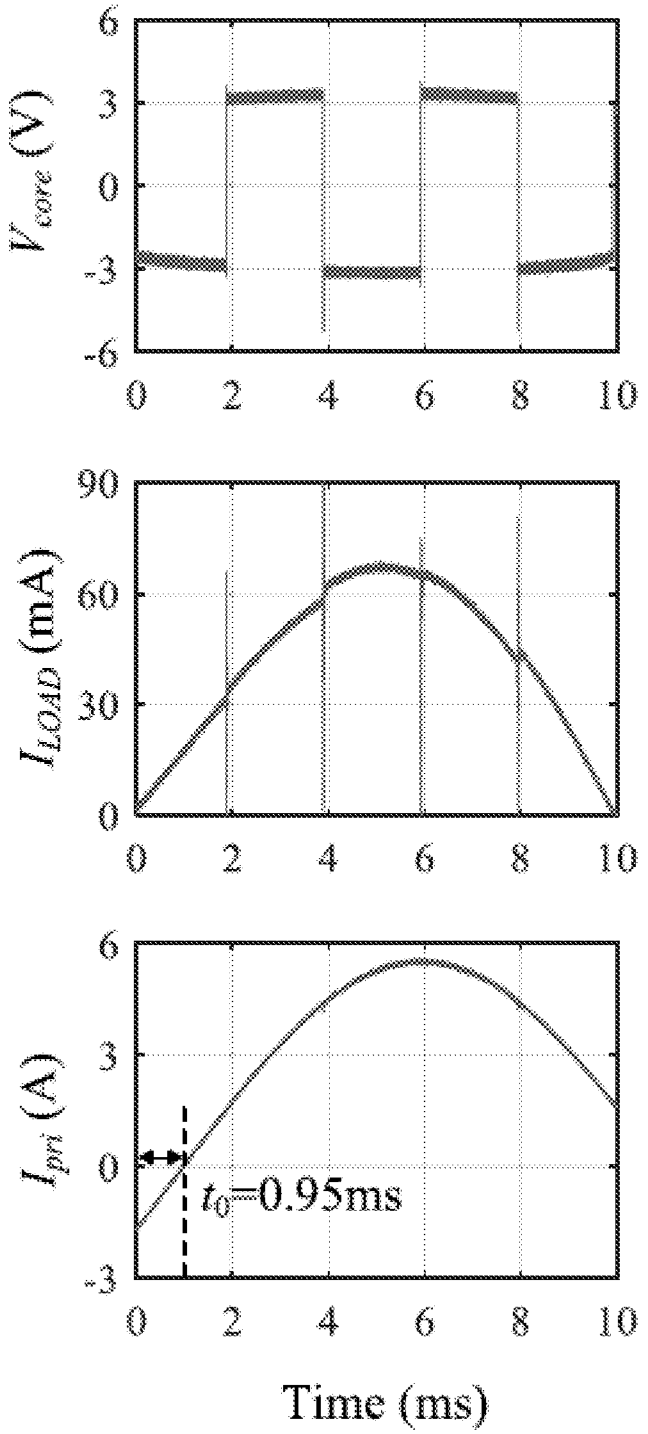
FIG. 25A shows waveforms of a harvesting core's secondary voltage (in V), load current (in mA), and primary current (in A), respectively from top to bottom, for an experiment (TVS method) with $N_{win}$=5.
Figure 25B:
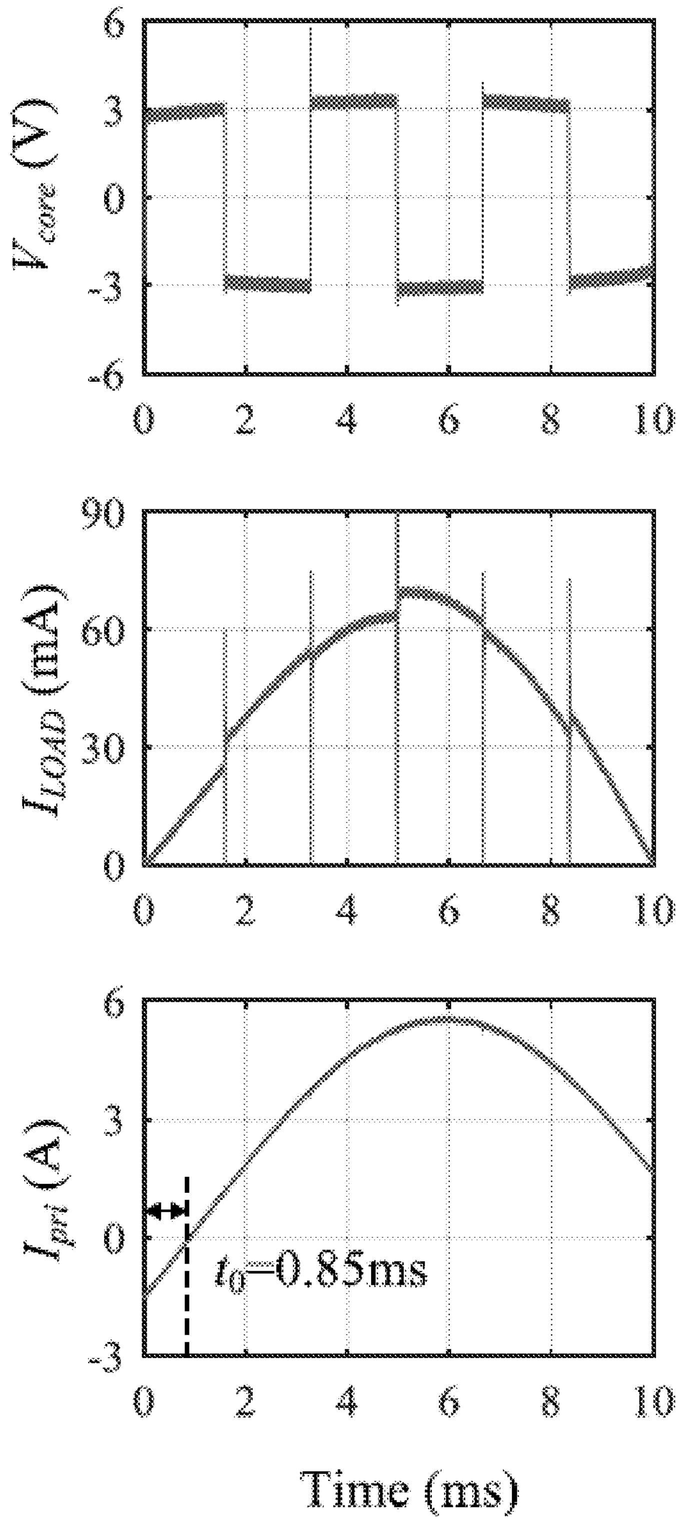
FIG. 25B shows waveforms of a harvesting core's secondary voltage (in V), load current (in mA), and primary current (in A), respectively from top to bottom, for an experiment (TVS method) with $N_{win}$=6.
Figure 25C:
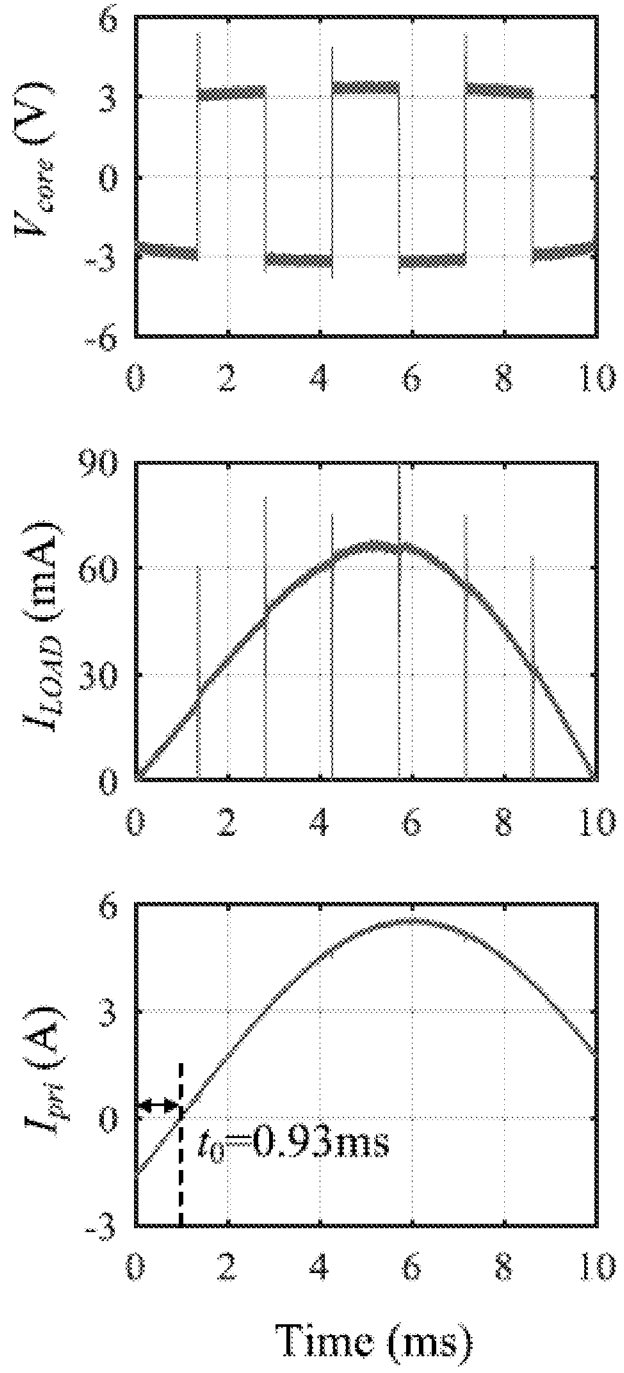
FIG. 25C shows waveforms of a harvesting core's secondary voltage (in V), load current (in mA), and primary current (in A), respectively from top to bottom, for an experiment (TVS method) with $N_{win}$=7.
Figure 25D:
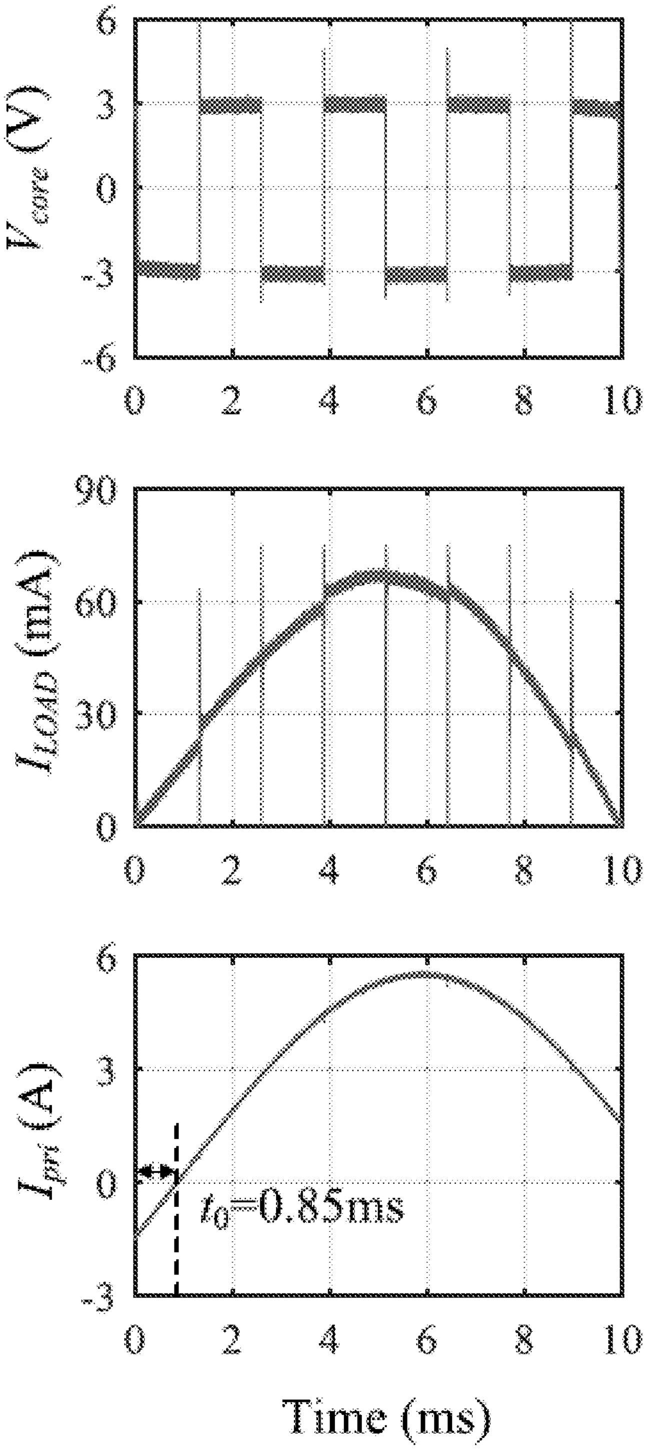
FIG. 25D shows waveforms of a harvesting core's secondary voltage (in V), load current (in mA), and primary current (in A), respectively from top to bottom, for an experiment (TVS method) with $N_{win}$=8.

Three time-domain waveforms, the secondary voltage ($V_{core}$) of the harvesting core, the load current ($I_{LOAD}$), and the primary current ($I_{pri}$), were obtained from experiments and are shown in FIGS. 24A and 24B. Also, time-domain waveforms under different EH windows are provided in FIGS. 25A-25D. The primary current amplitude was 5.6 A. It experimentally demonstrates that the desaturation method can enable EH for the whole period by preventing or inhibiting the magnetic core from saturation via altering the core voltage. The load voltage was 3 V for FIG. 24A and 6 V for FIG. 25B. The label to represents the time delay between the zero crossings of the primary and load currents. In FIG. 24A with the lower load voltage condition, the zero crossing points of the primary and load currents align more closely (i.e., smaller to), primarily because of the smaller current flowing through the air gap inductance and magnetizing inductance of the clampable core. In other words, the load with a lower voltage obtains a higher harvested current, as shown in FIG. 24A. The load with a higher voltage obtains a lower harvesting current, as shown in FIG. 25B. There will be an optimal load voltage for the maximum EH between two extreme cases. The maximum predicted by Equations (47) and (48) is consistently validated in FIGS. 26A-26C and further verified in FIGS. 28A-28C.

Figure 26A:
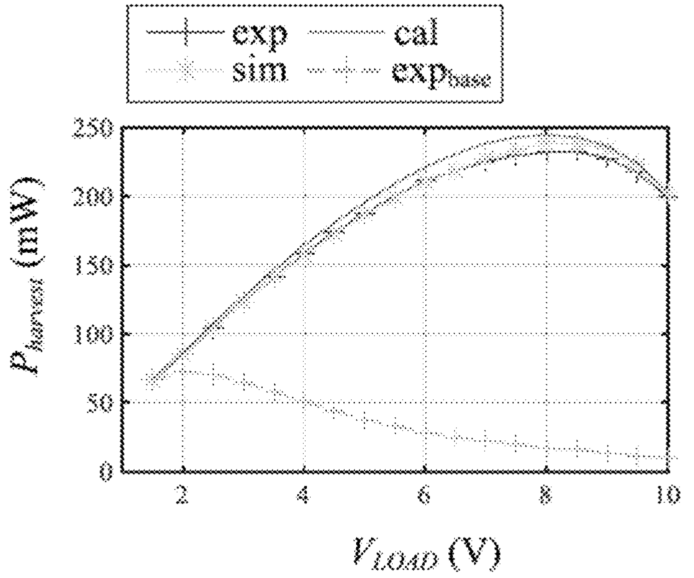
FIG. 26A shows a plot of $P_{harvest}$ (in mW) versus $V_{LOAD}$ (in V) for an experiment (TVS method) with a primary current ($I_p$) of 5.6 A. The (blue) curve with the plus sign data points is for experimental values; the (green) curve with star data points is for simulated values; the (red) curve with no data points is for calculated values; and the (yellow) dotted curve with plus sign data points is for experimental values (base).
Figure 26B:
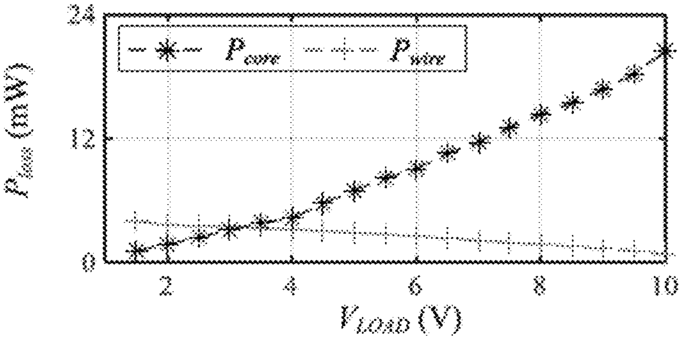
FIG. 26B shows a plot of $P_{loss}$ (in mW) versus $V_{LOAD}$ (in V) for an experiment (TVS method) with $I_p$=5.6 A. The (black) curve with star data points is for power in the core ($P_{core}$); and the (purple) curve with plus sign data points is for power in the wire ($P_{wire}$).
Figure 26C:
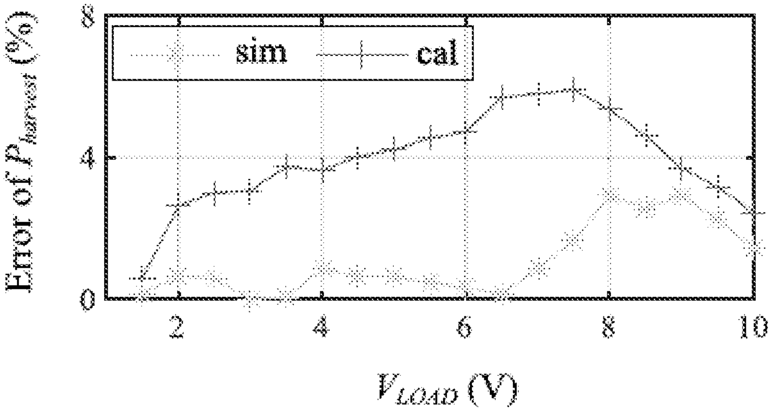
FIG. 26C shows a plot of prediction error of $P_{harvest}$ (in %) versus $V_{LOAD}$ (in V) for an experiment (TVS method) with $I_p$=5.6 A. The (green) curve with star data points is for simulated values; and the (red) curve with plus sign data points is for calculated values.
Figure 28A:
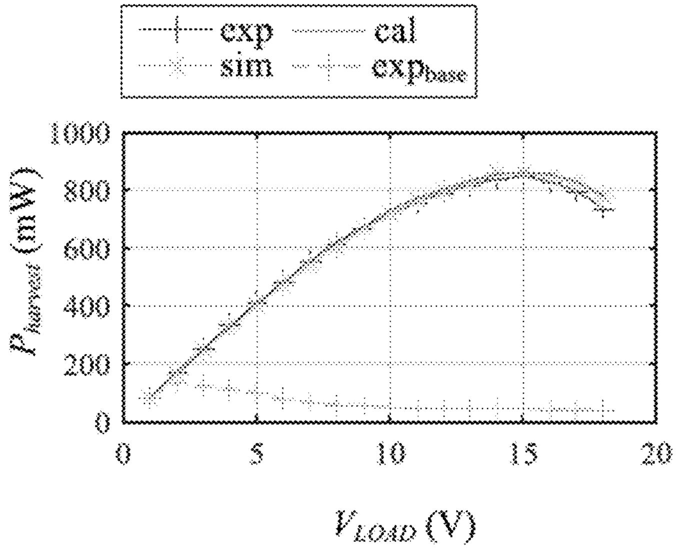
FIG. 28A shows a plot of $P_{harvest}$ (in mW) versus $V_{LOAD}$ (in V) for an experiment (TVS method) with $I_p$=11.3 A. The (blue) curve with the plus sign data points is for experimental values; the (green) curve with star data points is for simulated values; the (red) curve with no data points is for calculated values; and the (yellow) dotted curve with plus sign data points is for experimental values (base).
Figure 28B:
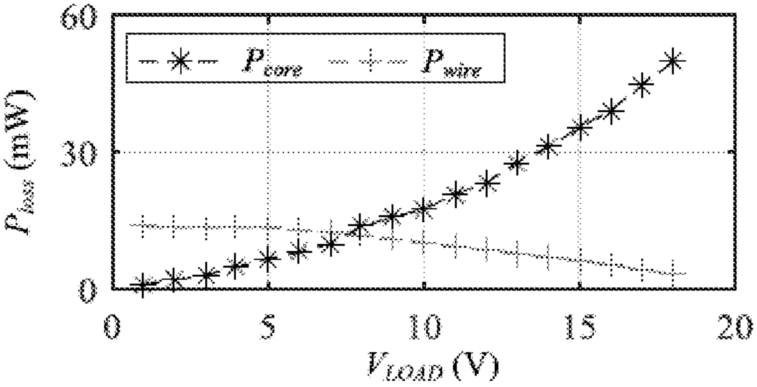
FIG. 28B shows a plot of $P_{loss}$ (in mW) versus $V_{LOAD}$ (in V) for an experiment (TVS method) with $I_p$=11.3 A. The (black) curve with star data points is for power in the core ($P_{core}$); and the (purple) curve with plus sign data points is for power in the wire ($P_{wire}$).
Figure 28C:
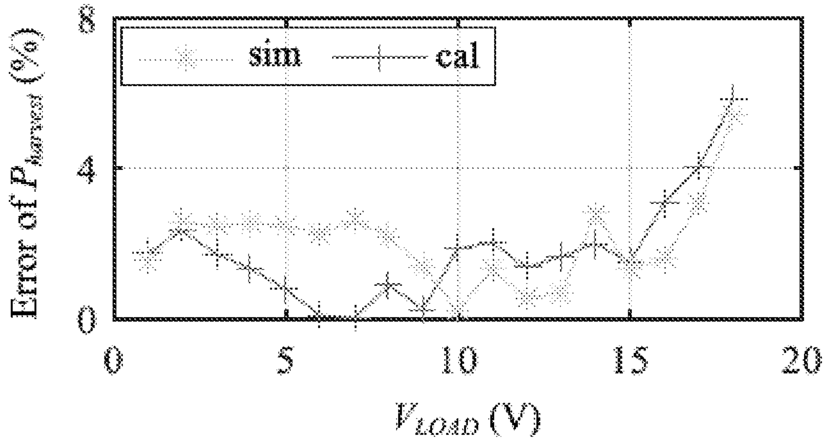
FIG. 28C shows a plot of prediction error of $P_{harvest}$ (in %) versus $V_{LOAD}$ (in V) for an experiment (TVS method) with $I_p$=11.3 A. The (green) curve with star data points is for simulated values; and the (red) curve with plus sign data points is for calculated values.

FIGS. 26A-26C and 28A-28C show the harvested power results with the proposed desaturation scheme from calculation, simulation, and experiment under two different primary current magnitudes, 5.6 A (FIGS. 26A-26C) and 11.3 A (FIGS. 28A-28C). The dashed line (i.e., $exp_{base}$) illustrates the outcomes of the cascaded two-core structure without the desaturation method. The $P_{harvest}$ versus $V_{LOAD}$ graphs in FIGS. 26A and 28A show that under low load voltage scenarios, increasing the load voltage significantly boosts harvested power, while in high load voltage scenarios, a rise in load voltage reduces harvested power due to the reduced average load current from the misalignment between primary and load currents. The optimal load voltage for maximum harvested power occurs when the power gain from increasing load voltage no longer exceeds the power loss from lower average current. In experiments, the peak harvested power of 232 milliwatts (mW) was achieved at 8 V when $I_P$=5.6 A while a peak power of 848 mW was observed at 15 V when $I_P$=11.3 A. Undoubtedly, a higher primary current results in a higher harvested energy, as it establishes a more potent magnetic field and elevates a higher optimal load voltage for maximum harvested power. In FIGS. 26B and 28B, both core loss, $P_{core}$, and winding loss, $P_{wire}$, are experimentally derived. The core loss increases with $V_{LOAD}$ due to an increased change in the B-field. The errors of $P_{harvest}$ in FIGS. 26C and 28C between calculation and experimental data and between simulation and experimental results are below 6%.

FIGS. 25A-25D illustrate the time-domain waveforms of the secondary voltage ($V_{core}$) of the harvesting core, the load current ($I_{LOAD}$), and the primary current ($I_{pri}$) under four different of numbers of EH windows. These experiments reveal that even-numbered EH windows (i.e., $N_{win}$=6 in FIG. 25B and $N_{win}$=8 in FIG. 25D) result in a reduced time lag between the primary and load currents and a less reduction in average load current, leading to enhanced EH under identical load voltage, in contrast to their odd-numbered counterparts (i.e., $N_{win}$=5 in FIG. 25A and $N_{win}$=7 in FIG. 25C).

Figure 27A:
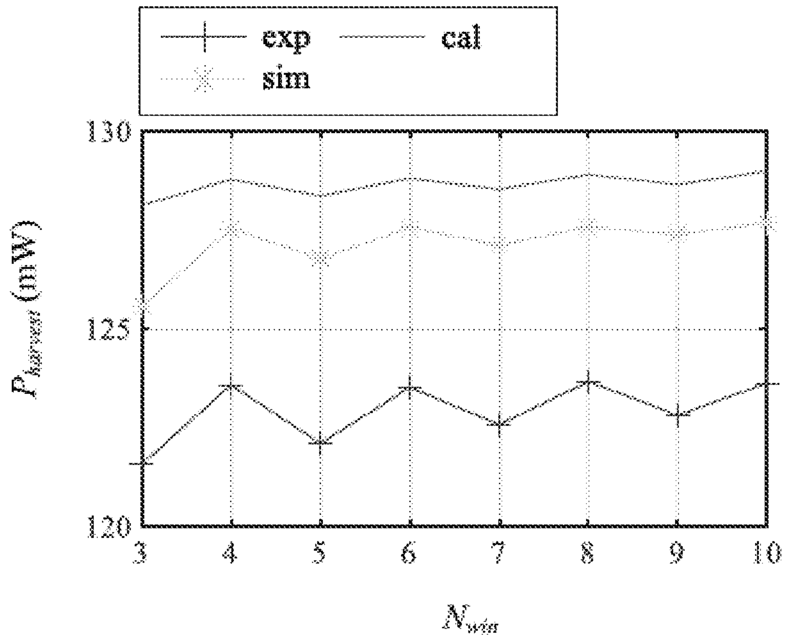
FIG. 27A shows a plot of $P_{harvest}$ (in mW) versus $N_{win}$ for an experiment (TVS method) with $I_p$=5.6 A. The (blue) curve with the plus sign data points is for experimental values; the (green) curve with star data points is for simulated values; and the (red) curve with no data points is for calculated values.
Figure 27B:
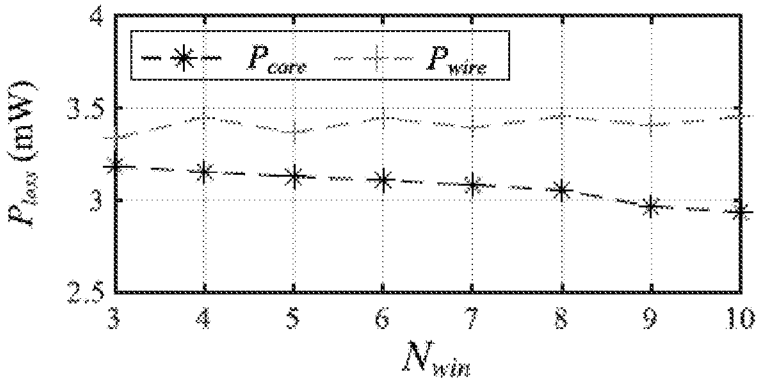
FIG. 27B shows a plot of $P_{loss}$ (in mW) versus $N_{win}$ for an experiment (TVS method) with $I_p$=5.6 A. The (black) curve with star data points is for power in the core ($P_{core}$); and the (purple) curve with plus sign data points is for power in the wire ($P_{wire}$).
Figure 27C:
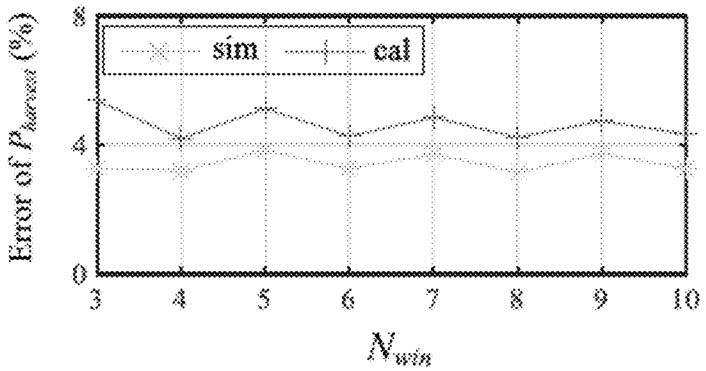
FIG. 27C shows a plot of prediction error of $P_{harvest}$ (in %) versus $N_{win}$ for an experiment (TVS method) with $I_p$=5.6 A. The (green) curve with star data points is for simulated values; and the (red) curve with plus sign data points is for calculated values.

FIGS. 27A-27C show the harvested power, $P_{harvest}$, core loss, $P_{core}$, winding loss, $P_{wire}$, and harvested power discrepancy between calculated and experimental data, and between simulation and experimental results under the condition of $V_{LOAD}$=3 V and $I_P$=4 A (RMS). In FIG. 27A, under odd numbers of EH windows, increasing the number of windows improves harvested energy by fostering better alignment between load and primary currents, resulting in higher load current. However, the effect of window count is less significant than $V_{LOAD}$ due to the magnetizing inductance being much larger than air gap inductance, with the time delay between currents primarily influenced by air gap inductance. The change in magnetizing current with varying $N_{win}$ is smaller than that of air gap current, minimally affecting harvested power. For even numbers of windows, the influence on average load current and harvested power is smaller compared to odd numbers, as the magnetizing current's zero-crossing points coincide with those of the load current, making its impact on to negligible. The harvested power obtained from experiments with even-numbered $N_{win}$ is 124 mW. In FIG. 27B, as $N_{win}$ increases, the core loss decreases because ΔB in the magnetic core shrinks with shortened EH windows. In FIG. 27C, the power differences between calculated and experimental and between simulation and experimental results are less than 6%.

Figure 29:
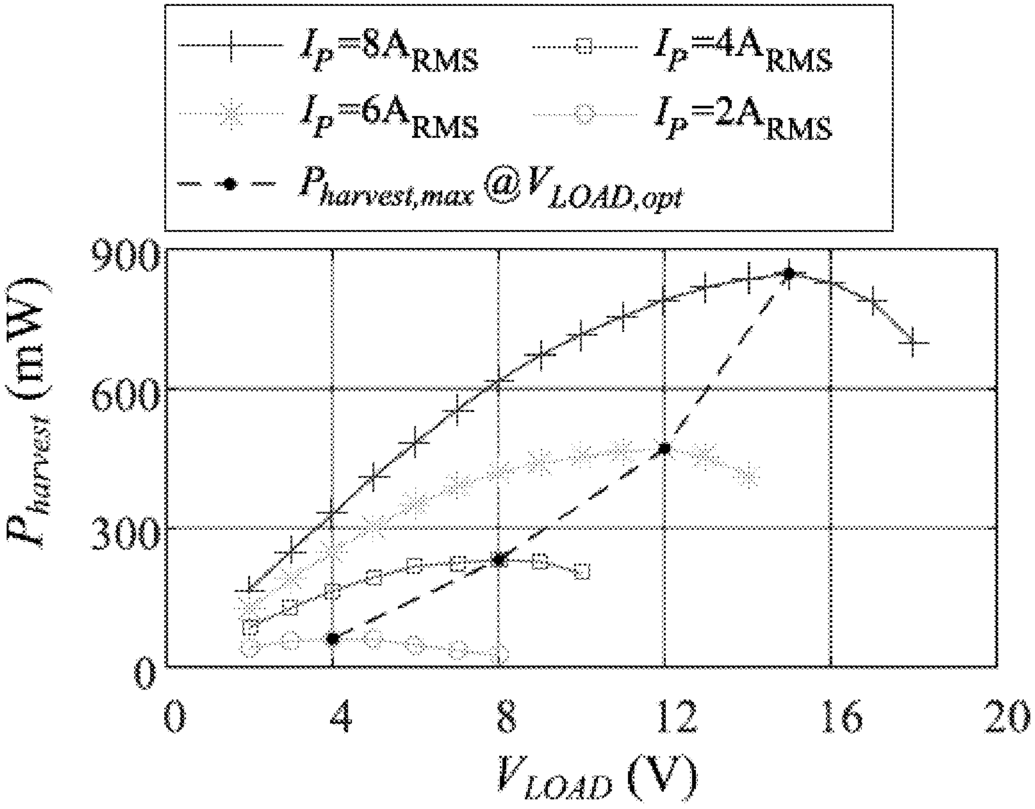
FIG. 29 shows a plot of $P_{harvest}$ (in mW) versus $V_{LOAD}$ (in V) for an experiment (TVS method) with different $I_p$ values. The (blue) curve with the plus sign data points is for $I_p$=8 A (root mean squared (RMS)); the (green) curve with star data points is for $I_p$=6 A (RMS); the (red) curve with square data points is for $I_p$=4 A (RMS); the (yellow) curve with circle data points is for $I_p$=2 A (RMS); and the (black) dotted curve with solid dot data points is for maximum $P_{harvest}$ at optimal load voltage ($V_{LOAD,opt}$).

FIG. 29 presents the harvested power obtained from experiments from variable load voltage and primary current amplitudes. The results of harvested power from the primary current of 8 A (RMS), 6 A (RMS), 4 A (RMS), and 2 A (RMS) are shown in FIG. 29. The dashed line reflects the maximum harvested power points at the optimal load voltage under variable primary currents. The harvested energy quadratically increases with the primary current because the stronger primary current not only amplifies the magnetic field strength but also elevates the optimal load voltage for the maximum power point as proven in Equation (48).

In the experiment, the desaturation scheme of embodiments of the subject invention improved the harvested power by 712 mW under the condition of $V_{LOAD}$=15 V and $I_P$=8 A (RMS) at 50 Hz. The extra power penalty for the proposed control scheme is due to the switch Rds (on), gate drivers, and microcontroller. The switch conduction loss is nearly negligible at 0.44 mW. The total power consumption using gate driver SI8271 and microcontroller ATMEGA328P is 124 mW+45 mW=169 mW. The benefit from improved EH far outweighs the control power cost. Further, by utilizing a microcontroller and gate drivers with lower power consumption, for example, ADUM4121ARIZ (79 mW) and PIC18F14K50 (2.63 mW), the overall system efficiency can be further improved.

The table shown in FIG. 34 compares the performance of the method of embodiments of the subject invention with that of existing methods. The top portion (i.e., top eight rows) summarizes the harvested energy reported in each reference with the stated environmental conditions. The middle portion (i.e., next three rows) presents implementation- and installation-specific comparisons. The bottom portion (i.e., bottom two rows) presents the normalized performance comparison when all methods are subject to the same environmental conditions with identical total core volume. For the method of embodiments of the subject invention, two columns with two different core volume values are provided. The first column presents the experimental result using excessively large cut cores to form a clampable stage with $Vol_{core}$=212 cubic centimeters ($cm^3$). The second column presents the potential outcome with a clampable core that has the same volume as the harvesting core's (i.e., 8.8 $cm^3$). In the condition, the minimum clampable core volume was calculated to be 2.0 $cm^3$. However, for a practical winding window and fabrication margin, the identical size for the clampable core was chosen for the second column. In either case, the harvested energy is identical. Once beyond the minimum requirement, a bigger clampable core only leads to a degraded density, as shown in the table. With a reasonable total core volume, the EH density of the method of embodiments of the subject invention is slightly inferior/comparable to the best single-core case (i.e., 77 versus 60) at $I_{P,RMS}$=8 A (RMS). However, as shown in the bottom portion of the table, when all the methods are normalized to $I_P$=15 A (RMS) with the identical total core volume of 17.6 $cm^3$ and $N_1$=1, the EH density of the method of embodiments of the subject invention surpasses all the other methods, even the best single-core case (i.e., 77 versus 110), with a significant margin. Moreover, this harvesting density will further improve at an even higher primary side current, showing great potential for applications in a high-current environment. This is because the desaturation method of embodiments of the subject invention has a linearly increasing density (i.e., quadratically increasing energy) with respect to $I_P$, while all the existing methods have constant densities (i.e., linearly increasing energy) with respect to $I_P$. The method of embodiments of the subject invention has a relatively higher number of switches than the single-core methods. Along with a second core, this leads to a relatively higher build cost. However, the increased build cost and control complexity ultimately enable a completely nonintrusive installation via a clampable structure and a high EH density via desaturation control.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method for mid-cycle desaturation of a magnetic energy harvesting (MEH) system, the method comprising:

a) providing the MEH system comprising:
   - a first magnetic coupling element comprising a first winding and a second winding, wherein the first winding is configured to receive magnetic flux from an alternating current (AC) source;
   - a primary switching network comprising a plurality of bidirectional switches electrically coupled to the second winding of the first magnetic coupling element, wherein the primary switching network is configured to control routing and polarity of a first induced current flowing from the second winding;
   - a second magnetic coupling element comprising a third winding and a fourth winding, wherein the third winding is electrically coupled to the primary switching network to receive the controlled first induced current; and
   - an output rectification network comprising a plurality of switching elements electrically coupled to the fourth winding of the second magnetic coupling element, wherein the output rectification network is configured to direct a second induced current from the fourth winding to supply power to a load;

b) providing magnetic flux to the first magnetic coupling element from the AC source; and c) repeatedly and actively controlling the polarity of the first induced current via the primary switching network, thereby causing multiple magnetic desaturation of the second magnetic coupling element within one unit of a rectified AC cycle of the MEH system, and thereby providing multiple energy harvesting windows within the same one unit of the rectified AC cycle.

2. The method according to claim 1, wherein the plurality of switching elements of the output rectification network comprises at least two diodes.

3. A magnetic energy harvesting (MEH) system configured for mid-cycle desaturation of the MEH system, the system comprising:
   - a first magnetic coupling element comprising a first winding and a second winding, wherein the first winding is configured to receive magnetic flux from an alternating current (AC) source;
   - a primary switching network comprising a plurality of bidirectional switches electrically coupled to the second winding of the first magnetic coupling element, wherein the primary switching network is configured to control routing and polarity of a first induced current flowing from the second winding;
   - a second magnetic coupling element comprising a third winding and a fourth winding, wherein the third winding is electrically coupled to the primary switching network to receive the controlled first induced current; and
   - an output rectification network comprising a plurality of switching elements electrically coupled to the fourth winding of the second magnetic coupling element, wherein the output rectification network is configured to direct a second induced current from the fourth winding to supply power to a load, wherein the system is configured such that the controlled polarity of the first induced current via the primary switching network causes multiple magnetic desaturation of the second magnetic coupling element within one unit of a rectified AC cycle of the MEH system, and provides multiple energy harvesting windows within the same one unit of the rectified AC cycle.

4. The MEH system according to claim 3, wherein the plurality of switching elements of the output rectification network comprises at least two diodes.

* * * * *